(12) United States Patent
Ananthanpillai et al.

(10) Patent No.: US 10,546,122 B2
(45) Date of Patent: *Jan. 28, 2020

(54) RADIAL DATA VISUALIZATION SYSTEM

(71) Applicant: ENDERA SYSTEMS, LLC, Bethesda, MD (US)

(72) Inventors: Raj Ananthanpillai, Potomac, MD (US); Aaron Kilinski, Bethesda, MD (US)

(73) Assignee: ENDERA SYSTEMS, LLC, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,638

(22) Filed: Jan. 9, 2019

(65) Prior Publication Data
US 2019/0272372 A1 Sep. 5, 2019

Related U.S. Application Data

(63) Continuation of application No. 15/712,506, filed on Sep. 22, 2017, now Pat. No. 10,223,760, which is a (Continued)

(51) Int. Cl.
G06F 21/55 (2013.01)
G06F 3/0484 (2013.01)
G06T 11/20 (2006.01)

(52) U.S. Cl.
CPC ........ *G06F 21/554* (2013.01); *G06F 3/04842* (2013.01); *G06T 11/206* (2013.01); *G06T 2200/24* (2013.01)

(58) Field of Classification Search
CPC ... G06F 17/2705; G06F 21/552; G06N 5/048; G06Q 50/265; G06Q 10/0635; H04L 63/1433

See application file for complete search history.

(56) References Cited

U.S. PATENT DOCUMENTS

| 5,351,302 A | 9/1994 | Leighton | G06Q 20/346 235/379 |
| 5,798,760 A | 8/1998 | Vayda | G06F 3/0482 715/834 |
| 8,005,693 B2* | 8/2011 | Bonissone | G06Q 10/0635 705/4 |

(Continued)

OTHER PUBLICATIONS

Cheek et al. (WO 2013/173264 A2).
Aveni, Force Continuum Conundrum, Dec. 2003, Law and Order, vol. 51, Is. 12, pp. 1-6.

*Primary Examiner* — Joseph P Hirl
*Assistant Examiner* — Stephen T Gundry
(74) *Attorney, Agent, or Firm* — Browdy and Neimark, P.L.L.C.

(57) ABSTRACT

A computer-implemented method for interactive visualization of a risk assessment for an entity on a graphical user interface of a computer system includes receiving, by the computer system, unstructured risk data associated with an entity, parsing, by the computer system, the unstructured risk data to produce risk information elements during a time period, combining, by the computer system, the risk information elements that comprise a single event, categorizing, by the computer system, each event in a category, generating, by a computer processor, a risk assessment for the entity from the categorized events for each time period, and displaying, on the graphical user interface, the risk assessments for each time period on a risk timeline that includes a timeline and a numerical risk scale.

17 Claims, 42 Drawing Sheets

Related U.S. Application Data continuation of application No. 14/753,342, filed on Jun. 29, 2015, now Pat. No. 9,773,288.

(60) Provisional application No. 62/018,439, filed on Jun. 27, 2014.

(56) References Cited

U.S. PATENT DOCUMENTS

| | | | |
|---|---|---|---|
| 8,121,937 B2 | 2/2012 | Lawrence | G06Q 30/02 705/35 |
| 8,285,615 B2 | 10/2012 | Lawrence | G06Q 30/018 703/17 |
| 8,374,899 B1 | 2/2013 | Heuler | G06Q 10/06 705/7.11 |
| 8,401,893 B1 | 3/2013 | Heuler | G06Q 10/10 705/7.36 |
| 8,484,066 B2* | 7/2013 | Miller | G06Q 10/0635 705/7.28 |
| 8,548,934 B2 | 10/2013 | Lay | G06Q 10/0635 706/46 |
| 8,825,578 B2 | 9/2014 | Lay | G06F 21/577 705/38 |
| 9,122,851 B2 | 9/2015 | Wyn-Harris | H04L 63/0861 |
| 9,294,498 B1 | 3/2016 | Yampolskiy | H04L 63/1433 |
| 9,300,676 B2 | 3/2016 | Madhu | G06Q 50/265 |
| 9,558,524 B2 | 1/2017 | Madhu | G06Q 50/265 |
| 10,185,465 B1* | 1/2019 | Capano | G06F 21/552 |
| 2002/0184130 A1 | 12/2002 | Blasko | G06Q 40/00 705/35 |
| 2003/0055696 A1 | 3/2003 | Tsukishima | G06Q 10/06 705/7.28 |
| 2003/0135378 A1 | 7/2003 | Carlson | G06Q 10/10 705/323 |
| 2003/0144996 A1 | 7/2003 | Moore, Jr. | G06F 17/30864 |
| 2003/0195861 A1 | 10/2003 | McClure | H04L 41/12 |
| 2003/0229525 A1 | 12/2003 | Callahan | G06Q 10/0635 705/7.28 |
| 2005/0021360 A1 | 1/2005 | Miller | G06Q 10/0635 705/7.28 |
| 2006/0004719 A1* | 1/2006 | Lawrence | G06Q 30/00 |
| 2006/0004866 A1* | 1/2006 | Lawrence | G06Q 10/0635 |
| 2006/0034494 A1 | 2/2006 | Holloran | H04L 9/32 382/116 |
| 2006/0224409 A1 | 10/2006 | Leininger | G06Q 10/0637 705/1.1 |
| 2007/0288355 A1 | 12/2007 | Roland | G06Q 10/00 705/38 |
| 2008/0077474 A1* | 3/2008 | Dumas | G06Q 10/00 705/7.12 |
| 2008/0140514 A1 | 6/2008 | Stenger | G06Q 10/06 705/7.28 |
| 2008/0270203 A1* | 10/2008 | Holmes | G06Q 10/04 705/7.28 |
| 2009/0024663 A1 | 1/2009 | McGovern | G06F 21/577 |
| 2009/0030751 A1 | 1/2009 | Barve | G06Q 10/04 705/7.22 |
| 2009/0089107 A1 | 4/2009 | Angell | G06Q 10/00 705/7.28 |
| 2009/0216602 A1 | 8/2009 | Henderson | G06Q 10/00 705/7.41 |
| 2010/0031354 A1 | 2/2010 | Hudis | G06F 21/55 726/22 |
| 2010/0275263 A1* | 10/2010 | Bennett | G06F 21/577 726/25 |
| 2011/0054961 A1 | 3/2011 | DelZoppo | G06Q 10/10 705/7.28 |
| 2011/0112957 A1 | 5/2011 | Ingram | G06Q 40/02 705/38 |
| 2011/0119211 A1 | 5/2011 | Lay | G06Q 10/0635 706/12 |
| 2011/0119218 A1* | 5/2011 | Lay | G06F 21/577 706/46 |
| 2011/0131122 A1 | 6/2011 | Griffin | G06Q 40/00 705/35 |
| 2011/0131130 A1* | 6/2011 | Griffin | G06Q 40/00 705/38 |
| 2011/0191138 A1 | 8/2011 | Saraf | G06Q 10/00 705/7.28 |
| 2011/0219324 A1 | 9/2011 | Watanabe | G06F 3/048 715/771 |
| 2012/0004946 A1 | 1/2012 | Blackwood | G06Q 10/06 705/7.28 |
| 2012/0053981 A1 | 3/2012 | Lipps | G06Q 10/0635 705/7.28 |
| 2012/0053982 A1 | 3/2012 | Treacey | G06Q 10/0635 705/7.28 |
| 2012/0079272 A1 | 3/2012 | Tolle | G06F 3/04847 713/168 |
| 2012/0109802 A1 | 5/2012 | Griffin | G06Q 40/00 705/35 |
| 2012/0116839 A1 | 5/2012 | Akkiraju | G06Q 10/06 705/7.28 |
| 2012/0124027 A1 | 5/2012 | Hnatio | G16H 50/80 707/709 |
| 2012/0124520 A1 | 5/2012 | Samp | G06F 3/04886 715/834 |
| 2012/0180133 A1 | 7/2012 | Al-Harbi | H04L 63/1433 726/25 |
| 2012/0203590 A1 | 8/2012 | Deb | G06Q 10/04 705/7.28 |
| 2012/0226519 A1 | 9/2012 | Copeland | G06Q 10/0635 705/7.28 |
| 2012/0278325 A1 | 11/2012 | Jenkins | G06Q 50/265 707/737 |
| 2012/0330959 A1 | 12/2012 | Kretz | G06Q 40/08 707/739 |
| 2013/0013345 A1* | 1/2013 | Wallquist | G06Q 10/0635 705/4 |
| 2013/0085917 A1 | 4/2013 | Agarwal | G06Q 40/06 705/35 |
| 2013/0133048 A1 | 5/2013 | Wyn-Harris | H04L 63/0861 726/5 |
| 2013/0179215 A1 | 7/2013 | Foster | G06Q 10/00 705/7.28 |
| 2013/0211872 A1 | 8/2013 | Cherry | G06Q 10/04 705/7.28 |
| 2013/0275176 A1 | 10/2013 | Brown | G06Q 10/0635 705/7.28 |
| 2013/0290067 A1 | 10/2013 | Barton | G06Q 10/06 705/7.28 |
| 2013/0297376 A1 | 11/2013 | Miller | G06Q 10/0635 705/7.28 |
| 2014/0007244 A1 | 1/2014 | Martin | G06F 21/577 726/25 |
| 2014/0114962 A1* | 4/2014 | Rosenburg | G06Q 10/063 707/723 |
| 2014/0137257 A1 | 5/2014 | Martinez | H04L 63/1433 726/25 |
| 2014/0278730 A1* | 9/2014 | Muhart | G06Q 10/0635 705/7.28 |
| 2014/0278733 A1 | 9/2014 | Sabharwal | G06Q 10/0635 705/7.28 |
| 2014/0282977 A1* | 9/2014 | Madhu | G06Q 50/265 726/7 |
| 2014/0289808 A1 | 9/2014 | Blanke | G06Q 20/42 726/4 |
| 2014/0358627 A1 | 12/2014 | Miller | G06Q 10/0635 705/7.28 |
| 2014/0358805 A1 | 12/2014 | Cama | G06Q 50/265 705/319 |
| 2014/0358811 A1 | 12/2014 | Cama | G06Q 50/265 705/325 |
| 2014/0359749 A1 | 12/2014 | Rieke | H04L 63/02 726/11 |
| 2014/0365389 A1 | 12/2014 | Cheek | G06Q 10/105 705/320 |
| 2014/0375667 A1 | 12/2014 | Reville | G06Q 10/0635 345/589 |

(56) References Cited

U.S. PATENT DOCUMENTS

| | | | |
|---|---|---|---|
| 2015/0088597 A1 | 3/2015 | Doherty | G06Q 10/0635 705/7.28 |
| 2015/0127416 A1 | 5/2015 | Showalter | G06Q 10/0635 705/7.28 |
| 2015/0178647 A1 | 6/2015 | Wiggins | G06Q 10/0635 705/7.28 |
| 2015/0227868 A1 | 8/2015 | Saraf | G06Q 10/0635 705/7.28 |
| 2015/0227869 A1 | 8/2015 | Saraf | G06Q 10/0635 705/7.28 |
| 2015/0229664 A1 | 8/2015 | Hawthorn | H04L 63/1433 726/25 |
| 2015/0242632 A1* | 8/2015 | Lay | G06F 21/552 726/25 |
| 2015/0242856 A1* | 8/2015 | Dhurandhar | G06Q 50/01 705/44 |
| 2015/0309506 A1* | 10/2015 | Naduthota | G05B 23/0272 700/44 |
| 2015/0332184 A1* | 11/2015 | Osborn | G06Q 10/00 705/7.28 |
| 2015/0373020 A1* | 12/2015 | Hale | H04L 63/0861 713/170 |
| 2015/0381637 A1 | 12/2015 | Raff | H04L 63/0218 726/23 |
| 2016/0012235 A1 | 1/2016 | Lee | G06Q 10/0635 726/25 |
| 2016/0019668 A1* | 1/2016 | Kilinski | G06Q 50/265 705/325 |
| 2016/0117466 A1 | 4/2016 | Singh | G06Q 50/265 702/19 |
| 2016/0171415 A1 | 6/2016 | Yampolskiy | H04L 63/1433 705/7.28 |
| 2016/0196587 A1* | 7/2016 | Eder | G06Q 30/00 705/14.49 |
| 2016/0205126 A1* | 7/2016 | Boyer | H04L 63/1433 726/25 |
| 2016/0323308 A1 | 11/2016 | Boyer | H04L 63/1433 |
| 2016/0344758 A1* | 11/2016 | Cohen | G06F 3/04842 |
| 2017/0032129 A1 | 2/2017 | Linde | G06F 21/577 |
| 2017/0054750 A1 | 2/2017 | Ward | G06F 21/577 |
| 2017/0244746 A1* | 8/2017 | Hawthorn | H04L 63/1433 |
| 2019/0066020 A1* | 2/2019 | Allen | G06F 16/951 |

* cited by examiner

Risk Information

I Emotional/Mental Disorders

| Disqualifying Conditions | Condition Status | Total Issues | N/A | ⚠ | ➡ | 📚 | Edit |
|---|---|---|---|---|---|---|---|
| (a) Behavior that casts doubt on an individual's judgment, reliability, or trustworthiness that is not covered under any other guideline, including but not limited to emotionally unstable, irresponsible, dysfunctional, violent, paranoid, or bizarre behavior. | ○ | | | | | | Edit |
| (b) An opinion by a duly qualified mental health professional that the individual has a condition not covered under any other guideline that may impair judgement, reliability or trustworthiness. | ○ | | | | | | Edit |
| (c) The individual has failed to follow treatment advice related to a diagnosed emotional, mental, or personality condition, e.g., failure to take prescribed medication. | ○ | | 2 | | 1 | 1 | Edit |

J Criminal Conduct

| Disqualifying Conditions | Condition Status | Total Issues | N/A | ⚠ | ➡ | 📚 | Edit |
|---|---|---|---|---|---|---|---|
| (a) A single serious crime or multiple lesser offenses. | ○ | 3 | | | | | Edit |
| (b) Discharge or dismissal from the Armed Forces under dishonorable conditions. | ○ | | 1 | | | | Edit |
| (c) Allegation or admission of criminal conduct, regardless of whether the person was formally charged, formally prosecuted or convicted. | ○ | | | | | 1 | Edit |
| (d) Individual is currently on parole or probation. | ○ | | | | 1 | | Edit |
| (e) Violation of parole or probation, or failure to complete a court-mandated rehabilitation program. | ○ | | | | | | Edit |

Master Identity Hierarchy

| View | Category | Sub-Category | Description |
|---|---|---|---|
| Identifiers | Biographic | Name | Names used by the subject |
| | | Also Known As (AKA) | Other names by which the subject is known |
| | | Gender | Gender |
| | | DOB | Date of Birth |
| | | POB | Place of Birth |
| | | SSN | Social Security Number |
| | | SSN - Year of Issuance | SSN - Year of Issuance |
| | | Possible Other SSNs Associated with Subject | Other SSNs associated with the subject. Subjects are frequently linked to other SSNs. The most common reasons include the following: 1) Typographical errors, 2) Jointly filed public records that list the subject and the second name, 3) Father and son who have the same name, and 4) Fraudulent use of a SSN. |
| | | Possible Other Records and/or Names Associated with Subject's SSN | Other records and/or names associated with the subject's other SSN's found in the previous sections. |
| | | Height | Height |
| | | Weight | Weight |
| | | Hair Color | Hair Color |
| | | Eye Color | Eye Color |
| | Biometric | Facial | Facial biometric image |
| | | Fingerprint | Fingerprint biometric image |
| | | IRIS | IRIS biometric image |
| | | Voice | Voice biometric recording |
| | Residence | Possible Addresses Associated with Subject | The addresses and phone numbers listed in this section are reported by consumer reporting agencies, proprietary sources, and public records. Unlisted mobile, cell, or other "hard to locate" phone numbers may also be listed if reported by the subject. |
| | | Possible Evictions | Evictions reported by landlords and rental companies. |
| | Communication | Phone Listings for Subject's Addresses | Phone numbers reported at the given address by comparing possible addresses associated with the subject with listed phone numbers. |
| | | E-mail addresses for Subject | E-mails addresses associated with the subject. |
| | | User ID's for on-line accounts | Online accounts associated with the subject. |
| Fraud | Possible SSN & Current Address Fraud Alerts | | Possible fraud alerts associated with the subject's primary SSN and current address. Examples of an SSN fraud alert: SSN has not been issued; SSN reported as deceased. |
| | Possible Device Fraud Alerts | | Possible fraud alerts associated with the computer used to access the system (important for detecting potentially cyber security issues of fraudulent transactions. |
| | Possible Relatives | Mother | Person known as the subject's mother. |
| | | Father | Person known as the subject's father. |
| | | Brother | Person known as the subject's brother. |
| | | Sister | Person known as the subject's sister. |
| | | Son | Person known as the subject's son. |
| | | Daughter | Person known as the subject's daughter. |
| | Possible Marriages | | Marriage licenses associated with the subject. |

FIG. 26B

Master Identity Hierarchy

| View | Master Identity Hierarchy | | Description |
|---|---|---|---|
| | Category | Sub-Category | |
| Relationships | Possible Divorces | | Divorce certificates associated with the subject. |
| | Possible Associates | | Associates of the subject. An "Associate" is someone who is linked to one or more of the same addresses as the subject of the report, but has a different last name. |
| | Neighbors Listings for Subject's Addresses | | Neighbor Listings of the subject. Neighbor Listings will include the closest 30 neighbors to each of the subject's address based on a max radius of 10-miles. |
| | Education Associates | | Possible school affiliations with the subject. These records are derived from multiple sources to include business and professional sources as well as self reported consumer sources. |
| | Business Associates | | Possible work affiliations with the subject. These records are derived from multiple sources to include business and professional sources as well as self reported consumer sources. |
| Background | Criminality | Possible Criminal Records & Traffic Citations | Information derived from State court filings, State Departments of Corrections and Departments of Public Safety, Sex Offender Registries, U.S. District Court filings and the Office of Foreign Assets Control. Information included may vary by agency with some providing only records of felony convictions, while others include records pertaining to felonies, misdemeanors and infractions (including traffic and parking violations), whether convicted, acquitted or not prosecuted. |
| | | Possible Infractions | Infractions information can help to verify possible high-risk identity data in compliance with the USA Patriot Act, which can include a person on the OFAC (Office of Foreign Assets Control) who may have been identified as a possible terrorist or money launderer, or who has been debarred or sanctioned by the US Government. |
| | | Possible Arrests | Arrest records from the various county departments/agencies that collect this information. Typically the record department/agency is the county level department/agency though the arrest may have been made by a city/town/village Police Department. |
| | | Possible Real-Time Incarcerations & Arrest Records | Real-time records related to local jails and departments of correction information. |
| | Financial History | Possible Accounts | Accounts associated with the subject. |
| | | Possible Bankruptcies | Bankruptcies associated with the subject. |
| | | Possible Foreclosures | Pre-foreclosure proceedings on real property. |
| | | Possible Liens & Judgments | Liens and judgments associated with the subject. |
| | Lawsuits | Possible Lawsuits | Civil lawsuits associated with the subject. Civil filings may include domestic relations, probate, common pleas, municipal, or judgment filings. |
| | Dockets | Possible Dockets | State and federal docket information on cases filed in State Courts, U.S. District Courts, U.S. Courts of Appeal, U.S. Bankruptcy Courts and the U.S. Supreme Court. |
| | Employment History | Possible Work Affiliations | History of employment. |
| | Education History | Possible Grade School | Grade schools attended. |
| | | Possible High School | High schools attended. |
| | | Possible Higher Education | Higher education institutions attended |
| | | Possible Degrees | Degrees earned from higher education institutions. |
| | Military | Possible Military Records | Military data associated with the subject. |

FIG. 26C

Master Identity Hierarchy

| View | Master Identity Hierarchy | | Description |
|---|---|---|---|
| | Category | Sub-Category | |
| Social Media | Networking | Social Networking | Social networks (Facebook, MySpace, Bebo, Hi5, Orkut...), niche social networks (LinkedIn, Boompa...) and tools for creating social networks (Ning) |
| | | Geosocial Networking | Geosocial networks (Foursquare, Urbanspoon, tripadvisor) |
| | | Dating Network Websites | Dating Network Websites (match.com, eHarmony, chemistry.com ...) |
| | | Chat Rooms | TBD |
| | Communication | Discussion Forums | Discussions tools like forums (PHPbb, vBulletin, Phorum...) |
| | | Video Forums | Video forums (Seesmic) |
| | | Instant Messaging | Instant messaging (Yahoo! Messenger, Windows Live Messenger, Meebo...) |
| | | VoIP | VoIP (Skype, Google Talk...) |
| | | Livecasting - Hosting | Platforms for livecast hosting (Justin.tv, BlogTV, Yahoo! Live, UStream...) |
| | | Livecasting - Mobile | Platforms for mobile livecast platforms (Qik, Flixwagon, Kyte, LiveCast...) |
| | | Podcasts | TBD |
| | Publication | Message Boards | Publication tools with message boards (...) |
| | | Wikis | Publication tools with wikis (Wikipedia, Wikia, Wetpaint..) |
| | | Citizen Journalism | Publication tools with citizen journalism portals (Digg, Newsvine...) |
| | | News and Media Websites | News and Media Websites (CNN, WSJ, The NY Times..) |
| | | Blogging | Publication tools with blogs (Typepad, Blogger...) |
| | | Micro Blogging | Micropublication tools (Twitter, Pownce, Jaiku, Plurk, Adocu,...) and alike (twitxr, tweetpeek) |
| | | Product Reviews | Sharing tools for products reviews (Crowdstorm Stylehive...) or products feedbacks (Feedback 2.0, GetSatisfaction...) |
| | Sharing Tools | Link Sharing | Sharing tools for links (del.icio.us, Ma.gnolia...) |
| | | Slide Sharing | Sharing tools for slideshows (Slideshare) |
| | | Music Sharing | Sharing tools for music (Last.fm, iLike...) |
| | | Photo Sharing | Sharing tools for pictures (FlickR...) |
| | | Video Sharing | Sharing tools for videos (YouTube...) |
| | On-line Commerce | On-line Commerce | Online Commerce Websites (Ebay, Amazon.com, Epinions.com) |
| | Virtual Worlds | Virtual Worlds | Virtual worlds (Second Life, Entropia Universe, There...) |
| | | 3D chats | 3D chats (Habbo, IMVU ..) |
| | | Teen dedicated virtual universes | Teens dedicated virtual universes (Stardoll, Club Penguin...) |
| | MMO | | MMO (Neopets, Gaia Online, Kart Rider, Drift City, Maple Story and MMORPG (World of Warcraft, Age of Conan...) |
| | Other | | Mugshots.com, Chesterville. |
| Utility Services | Possible Utility Services | | Utility services associated with the subject. |
| Licenses | Possible Driver's Licenses | | Driver license information associated with the subject. |
| | Possible Licensed Drivers at Subject's Addresses | | Licensed drivers at the subject's addresses. |
| | Possible Licenses (Professional) | | Professional licenses associated with the subject. |
| | Possible Licenses (Recreational) | | Recreational licenses associated with the subject. |
| Real Property | Possible Real Property & Deed Transfers | | Most recent tax roll information and associated deed transfer to properties where the subject is the listed as the owner of the property. |
| | Possible Waterfront Residency | | Properties that have direct access to the ocean or to the Great Lakes. Results in this section could be an indication of rental properties and/or thresholds. |

FIG. 26D

Master Identity Hierarchy

| View | Category | Sub-Category | Description |
|---|---|---|---|
| Assets | | Possible Property Owners of Subject's Addresses | Most recent tax roll information and associated deed transfer to addresses where the subject has lived but is not listed as the owner. This section is often helpful in providing landlord information. |
| | | Possible Real Time Vehicles | Vehicle registrations returned from a live gateway that match the subject's last name and most current address. |
| | | Possible Vehicles Registered to the Subject | Vehicles registered to the subject. |
| | Vehicles | Possible Vehicles Registered at Subject's Addresses | Vehicles by the subject's addresses. |
| | | Possible FAA Aircraft Registrations | US Civil aircraft associated with the subject that is registered with the FAA, including air carrier and general aviation aircraft. |
| | | Possible Watercraft | State registrations from various government agencies and merchant and recreational vessels documented under the laws of the United States by the US Coast Guard. |
| | Other Assets | Possible Unclaimed Assets | Unclaimed property associated with the subject currently held by state agencies. Unclaimed Property is defined as money and other personal assets considered lost or abandoned after a specified period of time. |
| Business Affiliation | Possible Business Affiliations | | Business affiliations associated with the subject. |
| | Possible Businesses Registered at Subject's Addresses | | Addresses associated with the subject that are listed as a business address indicating that the address is not a residential location. |
| | Possible Significant Shareholders | | Significant shareholder information, which can include subject identification information and affiliated companies. |
| | Possible UCC Filings | | UCC stands for Uniform Commercial Code, which governs commercial transactions. UCC Filings associated with the subject can include debtor and secured party information. |
| Political Affiliation | Possible Voter Registrations | | Voter registration associated with the subject. The data will be compiled at the State or County level and will vary by jurisdiction. Voter identification numbers and voting history may also be included. The availability of voter history varies by jurisdiction. |
| | Possible Political Donors | | Historical political contribution information, which may include the political party to which the donation was made and the amount of the contribution. |
| Death Records | Possible Death Records | | Death records from the Social Security Administration (SSA) based on the subject's SSN and deceased records provided for state health departments. |
| IT Policy & Security | Network ID | | User-id used on the network(s) related to the subject |
| | Authorized Applications | | Applications that the subject has access to |
| | Application Usage | | Application usage history for the subject |
| | Internet Usage | | Internet usage history for the subject |
| | Email Usage | | E-mail usage history for the subject |
| | File Usage | | File usage history for the subject |
| | IP Phone Usage | | IP Phone usage for the subject |
| | Salary History | | Salary history for the subject |

FIG. 26E

Master Identity Hierarchy

| View | Master Identity Hierarchy | | Description |
|---|---|---|---|
| | Category | Sub-Category | |
| Human Resources | Review History | | Review history for the subject |
| | Incident History | | Incident history for the subject |

FIG. 30C

RADIAL DATA VISUALIZATION SYSTEM

TECHNICAL FIELD

The present disclosure relates to a system and method for assessing risk and more particularly, to systems and methods of risk visualization.

BACKGROUND

Current security threat assessment and fraud detection programs are moving towards a risk-based approach to ensure that entitlement programs, infrastructures, data, and systems are protected from improper use or criminal activity. This risk-based approach requires a significant amount of automation of the threat assessment and fraud detection process and a solid quality assurance process that tracks the quality of a risk assessment process.

However, current risk assessment processes present several major challenges. Unstructured data sources used in the assessment process are hard to convert into a format suitable for an automated assessment. Additionally, non-standard data vocabulary and complicated data semantics are difficult to use by traditional systems such as rule-based engines. Given these challenges, much of the risk assessment processes are manually operated, accuracy rates are less than optimal, and therefore the likelihood of fraud, criminal activity, and other types of risk, increase.

SUMMARY

Embodiments of the present disclosure provide an automated accurate risk assessment process. Additional features and utilities are set forth and/or are obvious from the description provided below.

One or more embodiments of the present disclosure are related to a system or a method of assessing risk using a computer. According to one aspect, a computer-based system of assessing risks includes an enrollment module to receive, at a computer, personal information regarding at least one entity, a data aggregation module to receive, at the computer, risk information regarding the at least one entity according to the personal information from at least one data source, a risk assessment module to automatically convert the risk information to assessment information, and a memory to store the personal information, the risk information, and/or the assessment information on the computer.

According to another aspect, a method of assessing risks using a computer includes receiving personal information regarding at least one entity at the computer, gathering risk information regarding the at least one entity according to the personal information from at least one data source, automatically converting the risk information to assessment information, and storing the personal information, the risk information, and/or the assessment information in a memory on the computer.

According to another aspect, a computer-readable recording medium containing computer-readable codes provides commands for computers to execute a process including receiving personal information regarding at least one entity at the computer, gathering risk information regarding the at least one entity according to the personal information from at least one data source, automatically converting the risk information to assessment information, and storing the personal information, the risk information, and/or the assessment information in a memory on the computer.

The system, method and/or computer-readable recording medium may include one or more of the following features. The risk information may include criminal history, civil history, terrorist watch lists, traffic violations, loan or debt delinquencies, outstanding wants or warrants, academic disciplinary history, and/or immigration status. In another embodiment, the risk information includes infraction information, punishment information, and disposition information that correspond to the personal information of the at least one entity.

The infraction information, punishment information, and disposition information may be automatically converted to standardized codes by assigning numerical values including an infraction code that corresponds to the infraction information, a punishment code that corresponds to the punishment information, and a disposition code that corresponds to the disposition information.

An adjudication module may be used to determine a level of risk corresponding to the at least one entity according to the assessment information. The level of risk corresponding to the at least one entity may be determined according to adjudication parameters received by the adjudication module. The adjudication parameters may be received from a user and input into the computer or received from a client over a network.

The standardized infraction code may be derived from infraction information by pre-processing the infraction information and using a predictive model to classify the infraction information into the infraction code along with a confidence factor for the classification. The standardized punishment code may be derived from punishment information by pre-processing the punishment information and using the predictive model to classify the punishment information into the punishment code along with a confidence factor for the classification. The standardized disposition code may be derived from disposition information by pre-processing the disposition information and using the predictive model to classify the disposition information into the disposition code along with a confidence factor for the classification.

As another feature, pre-processing of the infraction information, the punishment information, and/or the disposition information may be performed. For example, a number of text-string substitutions may be performed to normalize the language of the infraction information, the punishment information, and/or the disposition information. Unnecessary text may be removed from the infraction information, the punishment information, and/or the disposition information. In addition, specific phrases may be created that are based on the proximity of two or more words.

In one embodiment, the predictive model is a statistical pattern learning model which is trained to predict classifications by using examples of text already classified.

One or more embodiments of the present disclosure are related to a system or a method of determining an entity's identity and assessing risks related to the entity's identity. According to one aspect, a computer-based system of determining an entity's identity and assessing risks related to the entity's identity includes a tracking module to record encounters of the entity with the computer-based system and to generate encounter information relating to the recorded encounters, an information module to gather biographic information and biometric information relating to the entity's identity and to detect changes in the biographic information and the biometric information based on previously recorded encounters, a risk assessment module to evaluate risks associated with the entity according to the previously recorded encounters and assessment parameters, and a memory to store the biographic information and the biometric information, the detected changes in the biographic information and the biometric information, and the encounter information.

According to another aspect, a method of determining an entity's identity and assessing risks related to the entity's identity using a computer including gathering biographic information and biometric information relating to the entity's identity during a first encounter, recording encounter information regarding the first encounter, detecting changes in the biographic information and the biometric information by comparing the biographic information and the biometric information from the first encounter with second biographic information and biometric information from a second encounter, determining risks associated with the entity according to the encounter information and assessment parameters, and storing the first biographic information and biometric information, the encounter information, and the second biographic information and the biometric information in a memory on the computer.

According to another aspect, a computer-readable recording medium containing computer-readable codes provides commands for computers to execute a process including gathering biographic information and biometric information relating to an entity's identity during a first encounter, recording encounter information regarding the first encounter, detecting changes in the biographic information and the biometric information from the first encounter with second biographic information and biometric information from a second encounter, determining risks associated with the entity according to the encounter information and assessment parameters, and determining the identity of the entity according to the first and second biographic information and the biometric information, the encounter information, and the determined risks associated with the entity.

In one general aspect, a method of risk assessment for an entity includes converting one or more element of risk information into a character string and combining the character string of each element of risk information into a continuous character string to produce a signature containing the risk information for the entity.

The method may include one or more of the following or above features. For example, the risk information may be parsed to produce the one or more element of risk information. As another example, the character string may include a numeric code such that converting one or more element of risk information into a character string comprises converting one or more element of risk information into a numeric code.

The risk information may be, for example, a criminal history record which may be separated into arrest cycles. Each arrest cycle is parsed to produce one or more field that includes risk data. The risk data is parsed and/or translated into fields that include an offense code, severity code and disposition code.

The method may also include obtaining risk information about the entity and normalizing the risk information to produce risk data in a common format. In this embodiment, the normalized risk data is converted into one or more character string or numeric code.

The signature can be compared to another signature for the same entity. For example, a signature for the entity produced at a first time can be compared to a signature produced at a second time. The signature comparison can detect and identify any changes so that any differences between in the risk profile of an entity can be easily detected and reported by a reviewer, who may be a case manager, screening manager or other authorized reviewer. Another signature comparison may be performed by obtaining risk information from the same time period but from different sources of risk information.

As another feature, the detected changes in signatures can be categorized according to a level of importance. For example, the detected change may be categorized as being of low, medium or high importance. In another embodiment, the detected changes are assigned a numeric value and or may be color coded on a visual report.

Once a level of importance is established it can be compared to a threshold to determine if further action is warranted. For example, the change in signatures may identify a minor motor violation that occurred in which case the reviewer may not be prompted to take further action. On the other hand, the change could identify a felony conviction or an outstanding warrant that exceeds a risk threshold in which case the reviewer would be prompted to initiate or perform an immediate follow-up investigation.

A signature comparison may be performed based on a variety of circumstances. For example, a policy may establish a periodic update or scheduled risk assessment. In that case, the system requests updated risk assessment information from a source of risk information. As another example, the signature comparison is performed any time that new information is provided from the source of risk information (also referred to as a data push). In some cases, the entity may voluntarily provide updated risk information and a signature comparison may be warranted.

The signature may be encrypted to address security and privacy concerns. Once the signature is encrypted it may be stored to perform future comparisons in which case it would be decrypted.

In another general aspect, computer-based system for assessing a change in a risk level includes a data aggregation module to receive, at a computer, biographic information regarding at least one entity and receive, at the computer, risk information regarding the at least one entity according to the personal information from at least one data source, a parsing module to separate the risk information into one or more element of risk information, a signature module combine the one or more element of risk information into a continuous character string to produce a signature containing the risk information for the entity, a storage device to store the signature and a second signature produced during a different time period, a comparison module to compare the signature to the second signature and to categorize differences between the signature and the second signature as being of low, medium or high importance, and a reporting module to produce a report of the signature comparison when the differences between the signature and the second signature are categorized as high importance.

In still another general aspect, computer-readable recording medium containing computer-readable codes providing commands for computers to execute a process includes retrieving, from one or more data source, biographic information and a criminal history report for an entity, normalizing the criminal history report to produce a normalized report in a common format, separating the normalized report into one or more arrest cycle, parsing each arrest cycle to produce separate fields of risk information for each arrest cycle, converting the separate fields of risk information into a set of coded values for each arrest cycle, combining the coded values for each arrest cycle into a character string, and aggregating the biographic information and the character string for each arrest cycle into a risk signature for the entity.

The risk assessment may be performed by one or more of issue flagging, categorization or ranking. The issue flagging risk evaluation identifies potential issues related to an entity that can impact the level of risk. These issues are generalized to represent specific potential concerns, such as reliability, trustworthiness, program eligibility, etc. There are multiple configurations available for issue flagging, which is described below:

***1. Number of Decision Tree hierarchy levels—enables the screener to define the drill-in depth (number of levels of drill-in) for decision tree. Each level "rolls-up" to the next higher level by aggregating the number of potential issues related to the lower levels;

2. Number of Guidelines\Disqualifying Conditions, per risk hierarchy level—this enables the screener to define the number of risk factors that contribute to the "roll-up" to the next higher level of risk. It also allows for adding descriptions of "Concern" and "Description" to define each of these;

3. Weight of each Guideline\Disqualifying Condition, per risk hierarchy level—enables the customer to define the relative importance of each of the contributing factors. For instance, a specific risk type may have three contributing risk factors, but that they may be configured to weight their contribution to the higher level risk (60/20/20; 60/30/10; 30/30/30; etc.);

4. Mitigating Factors—enable customer to define a list of factors that can mitigate a known issue so that it is cancelled out; and 5. Data Assessment Rules—enables customer to define specific data conditions that result in an impact to the lowest level risk factors. The lack of the specific data condition may mean there is no contribution to the risk assessment for this factor.

Customers use Issue Flagging to assess risk in a variety of contexts and some examples are provided below.

Issue flagging can be used by government security offices to flag potential issues related to granting a security clearance where these issues are reviewed by trained adjudication staff to assess eligibility for a security clearance. For example, the Issue Types may be Allegiance to US Government, Criminality, etc. The adjudication staff can be provided with risk evaluation rules such that if the applicant has criminal history, then an Issue is created for the applicant to flag the criminal history rap sheet. As another example, Transportation Security Administration (TSA) may flag potential eligibility issues that are reviewed by trained adjudication staff to assess eligibility for participation on Government Credentialing Programs. In this case, the Issue Types may include: Immigration Status, Criminality, Mental Stability, etc. The adjudication staff can be provided with risk evaluation rules such that if the applicant has criminal history, then an Issue is created for the applicant to flag the criminal history rap sheet.

The Ranking risk evaluation type determines a numerical value (score) to associate with an entity. There are multiple configurations available for Ranking, which are described below:

1. Number of risk hierarchy levels—enables the screener to define the drill-in depth (number of levels of drill-in) for a risk assessment. Each level "rolls-up" to the next higher level by aggregating the contributing risk factors into a higher level risk concept;

2. Number of risk contributions, per risk hierarchy level—enables the screener to define the number of risk factors that contribute to the "roll-up" to the next higher level of risk;

3. Weight of each risk contribution, per risk hierarchy level—enables the screener to define the relative importance of each of the contributing factors. For instance, a specific risk type may have three contributing risk factors, but that they may be configured to weight their contribution to a higher level risk (60/20/20; 60/30/10; 30/30/30; etc.);

4. Data Assessment Rules—enables customer to define specific data conditions that result in an impact to the lowest level risk factors. Lack of the specific data condition may mean there is not contribution to the risk assessment for this factor.

Ranking can be used to assess risk in a variety of contexts. For example, traveler pre-screening may assign a numerical risk value to each entity to be used to assess travel eligibility. The Risk Rank Range may be 0-100. The system may be provided with certain Risk Evaluation Rules:

1. If potential match to Denied Persons List (watch list), then add 50 points to the Disqualifying Condition "Person is on Denied Person List;

2. If rejected match to Denied Persons List (watch list), then subtract 40 points from the Disqualifying Condition "Person is on Denied Person List"; and 3. If confirmed match to Denied Persons List (watch list), then add 100 points to the Disqualifying Condition "Person is on Denied Person List.

Based on the Risk Evaluation Rules and the information available from a Master Identity Hierarchy, the person is given a risk score from 0-100 and any traveler with a rank of 100 or more is automatically denied travel privileges.

As another example, Ranking may be used by private industry employers to evaluate employment risk. A Risk Rank Range is established from 0-10. The system applies the following Risk Evaluation Rules:

If criminal history includes 1-2 violent criminal offenses, then add 3 points to the "Propensity for Violence" category;

If criminal history includes >3 violent criminal offenses, then add 6 points to the "Propensity for Violence" category;

If human resources incident includes "threat of violence", then add 5 points to the "Propensity for Violence" category; and If human resources incident includes "physical harassment", then add 8 points to the "Propensity for Violence" category.

Potential employees are rank ordered from 0-10 and any applicant that receives a rank of 10 or more may be automatically rejected from the applicant pool.

In still another general aspect, a computer-implemented method for interactive visualization of a risk assessment for an entity on a graphical user interface of a computer system includes receiving, by the computer system, unstructured risk data associated with an entity from one or more source, parsing, by the computer system, the unstructured risk data to produce one or more risk information element during a time period, combining, by the computer system, each risk information element that comprises a single event, categorizing, by the computer system, each event in a category, generating, by a computer processor, one or more risk assessment for the entity from the one or more categorized event for each time period, displaying, on the graphical user interface, the one or more risk assessment for each time period on a risk timeline that includes a timeline and a numerical risk scale.

Embodiments may include one or more of the above or following features. For example the risk assessment may be displayed as shapes such as vertical columns or circular rings. Each event and category in a time period may be displayed as segments or sectors of the vertical columns or circular rings.

The user may be prompted or may have an option to display the vertical columns or circular rings.

The risk assessment may include a risk score that is generated by assigning a numerical value to each event and the appearance of the risk assessment may change based on the numerical value. A risk score for a time period may include the numerical value of each event in the time period. The risk score for the time period may be represented as a node on the risk timeline. The nodes may be connected by a reference line on the risk timeline.\

The user may decide to position a cursor or mouse over a node or may select a node in order to get a more detailed view of the risk assessment for that time period. For example, the risk assessment may be displayed by vertical columns or concentric rings that represent the categories and events.

In a further general aspect, one or more storage devices storing instructions that are executable on a computer system to perform operations include receive, by the computer system, unstructured risk data associated with an entity from one or more source, parse, by a processor, the unstructured risk data to produce risk information elements that comprise an event, assign a numerical value to each event, generate, by the processor, one or more risk assessment with a risk score that includes the numerical value of each event during a time period, display, on a graphical user interface, the one or more risk assessment with the risk score on a risk timeline that includes a timeline and a numerical risk scale.

Each event may be assigned to a category, and the events and categories corresponding to each time period may be displayed and a more detailed view of the time period may be selected by a user.

BRIEF DESCRIPTION OF THE DRAWINGS

The drawings are meant to illustrate certain principles of the invention and are not therefore to be considered to limit its scope. The above-mentioned features and objects of the present disclosure will become more apparent with reference to the following description taken in conjunction with the accompanying drawings wherein like reference numerals denote like elements in which:

FIGS. 13-22 are a screen shots viewable by a screening assessment manager.

FIGS. 26A-26E illustrates data that is mapped to a Master Identity Hierarchy.

FIGS. 28, 29A-29B, and 30A-30E illustrate multiple risk assessment visualizations.

DETAILED DESCRIPTION

Examples are provided in the information below and are illustrated in the accompanying drawings. For ease of reference, like numerals refer to like elements throughout the specification and the drawings. The embodiments are described below so as to explain the present disclosure by referring to the figures. Repetitive descriptions with respect to like elements of different exemplary embodiments may be omitted for the convenience of clarity.

Embodiments of the present disclosure provide an automated accurate risk assessment process. The present disclosure addresses major challenges regarding risk assessment, such as: unstructured data sources which are hard to convert into a format conducive to an automated assessment; non-standard data vocabulary and complicated data semantics which make the interpretations of the data by computer systems difficult; and complex and changing program policies which require computer systems to adapt to rapid policy changes.

Figure 1:
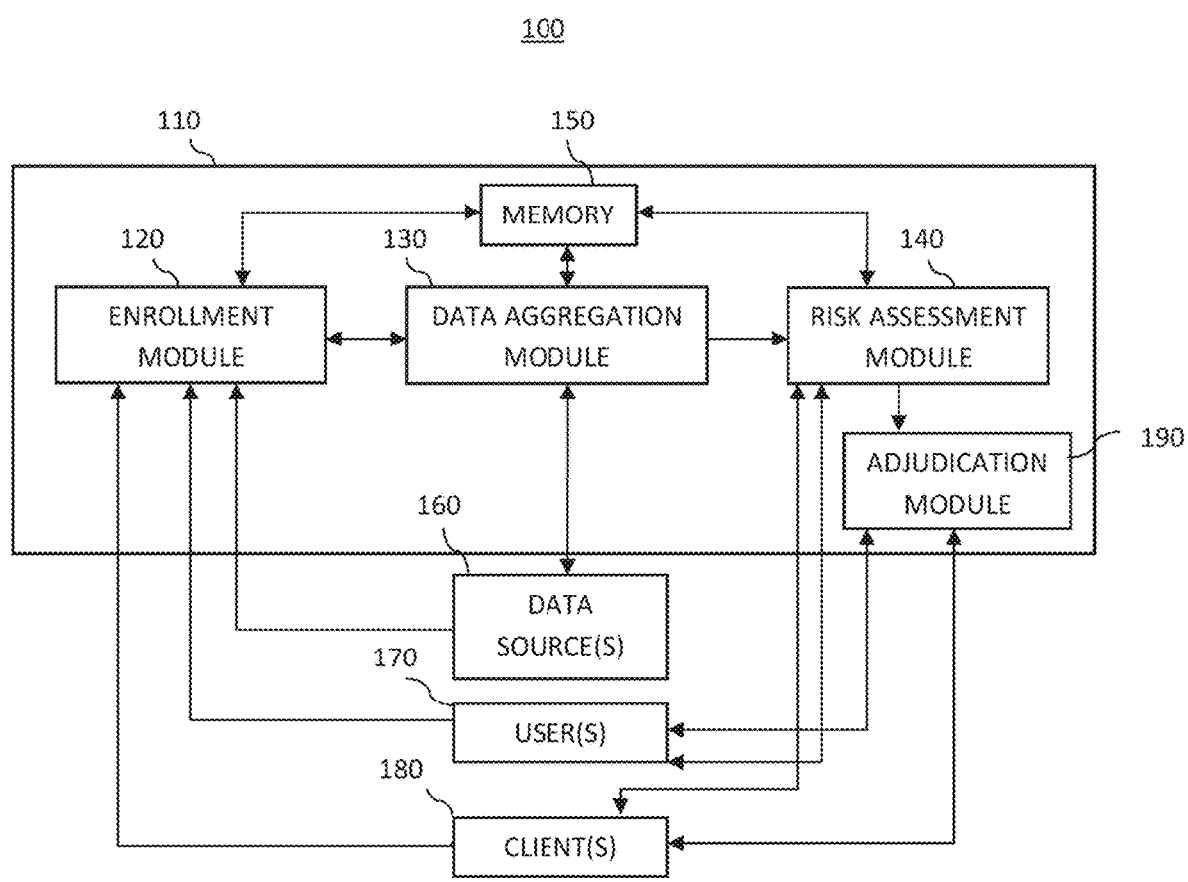
FIG. 1 is a block diagram illustrating a computer system to assess risk according to one or more embodiments of the present disclosure.

The present disclosure provides systems and methods of assessing risk using a computer. According to one embodiment, a computer-based system 100 is provided for assessing risks. As illustrated in FIG. 1, the computer-based system 100 includes a computer 110. As discussed above, a computer 110 can be a server computer. A server computer should be understood to refer to a service point which provides processing, database, and communication facilities. By way of example, and not limitation, the term server can refer to a single, physical processor with associated communications and/or data storage and/or database facilities, or it can refer to a networked or clustered complex of processors and associated network and/or storage devices, as well as operating software and one or more database systems and/or applications software systems (which can be implemented as modules and/or engines) which support the services provided by the server.

Several non-limiting examples of a computer 110 are a personal computer (e.g., desktop computers or laptop computers), personal digital assistants (PDAs), wireless devices, cellular telephones, internet appliances, media players, home theater systems, media centers, and the like. The computer 110 may also include a plurality of computers connected to teach other through a network. For the purposes of this disclosure, a computing device includes a processor and memory for storing and executing program code, data and software, and may be provided with an operating system that allows the execution of software applications in order to manipulate data. The computer 110 can include one or more input devices, e.g., keyboard, keypad, mouse, etc. and input device interface, for example: a display, such as a screen or monitor, which can be specified using any of a number of languages, including without limitation, a markup language such as Hypertext Markup Language, scripts, applets and the like.

Additionally, the computer 110 may receive and/or transmit personal information, risk information, assessment information, and/or adjudication information from one or more users 170 and/or clients 180 through storage media, wired connections, wireless connections, the internet, Internet, or any other type of communication network using transmission control protocol (TCP) and Internet Protocol (IP). Users 170 may utilize the computer via an input device, such as a keyboard or a mouse. Clients 180 may be computers connected to computer 110 through a network. For example, the computer 110 may receive or transmit these types of information through a flash memory drive, disc media (i.e., CD, DVD, Blu-Ray), a wired network connection (i.e., the internet), or a wireless connection.

The computer 110 may include an enrollment module 120, a data aggregation module 130, a risk assessment module 140, an adjudication module 190, and a memory 150. The modules are not required to be on a single computer 110. The modules may each be located on the computer 110, or may be located on separate computers connected to the computer 110 over a network, such as the Internet. The memory 150 may be a fixed disk where an operating system, application programs, and/or data may be stored. For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application and implemented by at least one processor of a computing device.

The enrollment module 120 may receive, at the computer, personal information regarding at least one entity. As used herein, the term "entity" refers to any person, company, group of people, organization, government entity, and the like, that may pose any kind of risk. For example, an entity may be a person, a group of people, an organization, a corporation, a co-operation, an association, a country, a state, a city, a municipality, etc. As used herein, the term "personal information" refers to any information that can uniquely identify an entity. For example, if the entity is a single person, personal information may include biographic information (e.g., name, address, phone number, social security number, birth date, company's stock symbol, etc.), biometric information (e.g., fingerprints, face recognition, DNA, hand and palm geometry, iris recognition, odor/scent, etc.), and the like. Personal information may refer to an single unique identifier, such as a fingerprint, or several pieces of information that when taken together can refer only to a single entity, i.e., a name, birth date, and address. Additionally, personal information may refer to biographic information and biometric information.

The data aggregation module 130 may receive, at the computer, risk information regarding the entity according to the personal information from at least one data source 160. As used herein, the term "risk information" refers to any quantifiable information that may be considered as indicative of risk. For example, risk information may include criminal history, civil history, terrorist watch lists, traffic violations, loan or debt delinquencies, outstanding wants or warrants, academic disciplinary history, and/or immigration status. Risk information may also include accusations relating to the previously mentioned types of risks. For example, a security company may want to know whether potential employees have a criminal record. In this example, risk information would include any information that relates to the criminal history of a job applicant. In another example, the federal government may want to know what health care companies have unacceptably high levels of fraud, or accusations of fraud, relating to insurance claims. In this example, risk information may include any information that relates to fraud claims or accusations relating to the health care companies. In another example, a company may want to know whether a country poses a risk for investment purposes. In this example, risk information may include inflation or deflation rates, debt amount, debt to GDP ratio, interest rates, etc.

For example, the data source 160 may be a database, electronic documents, the internet, paper files, and the like. The risk assessment module 140 may convert the risk information to assessment information. The term "assessment information" as used herein refers to risk information that has been quantified. For example, if a job applicant has a criminal background, each criminal charge, disposition, and punishment may be quantified. The conversion from risk information to assessment information may be manual or automatic. Risk information may be converted from unstructured data sources using a non-standard data vocabulary and complicated data semantics to assessment information using standardized vocabulary and values. The memory 150 may store the personal information, the risk information, and/or the assessment information on the computer 110.

According to another embodiment, the system 100 may also include an adjudication module 190 to determine a level of risk corresponding to the at least one entity according to the assessment information. The adjudication module 190 may be accessible to a user 170 or a client 180 through storage media, wired connections, wireless connections, the internet, Internet, or any other type of communication network using transmission control protocol (TCP) and Internet Protocol (IP). The computer 100 may include the adjudication module 190, or the adjudication module 190 may be on storage media, the internet, flash drives, external hard drives, and the like.

The risk information may be converted to assessment information using an algorithm. The algorithm may use logical expressions to automatically convert unstructured text into numeric values. The algorithm may be developed in the following manner in a criminal background context. Criminal backgrounds are usually obtained using rap sheets that may contain information spanning several decades, jurisdictions, states, etc. Each jurisdiction may add information to the rap sheets in an unstructured non-standardized manner. For example, each jurisdiction may have a unique way of classifying the same crime, the classifications and crimes may change over time, there may be typographical errors that are never fixed, and other various differences or errors that cause inconsistencies in the data.

Figure 5:
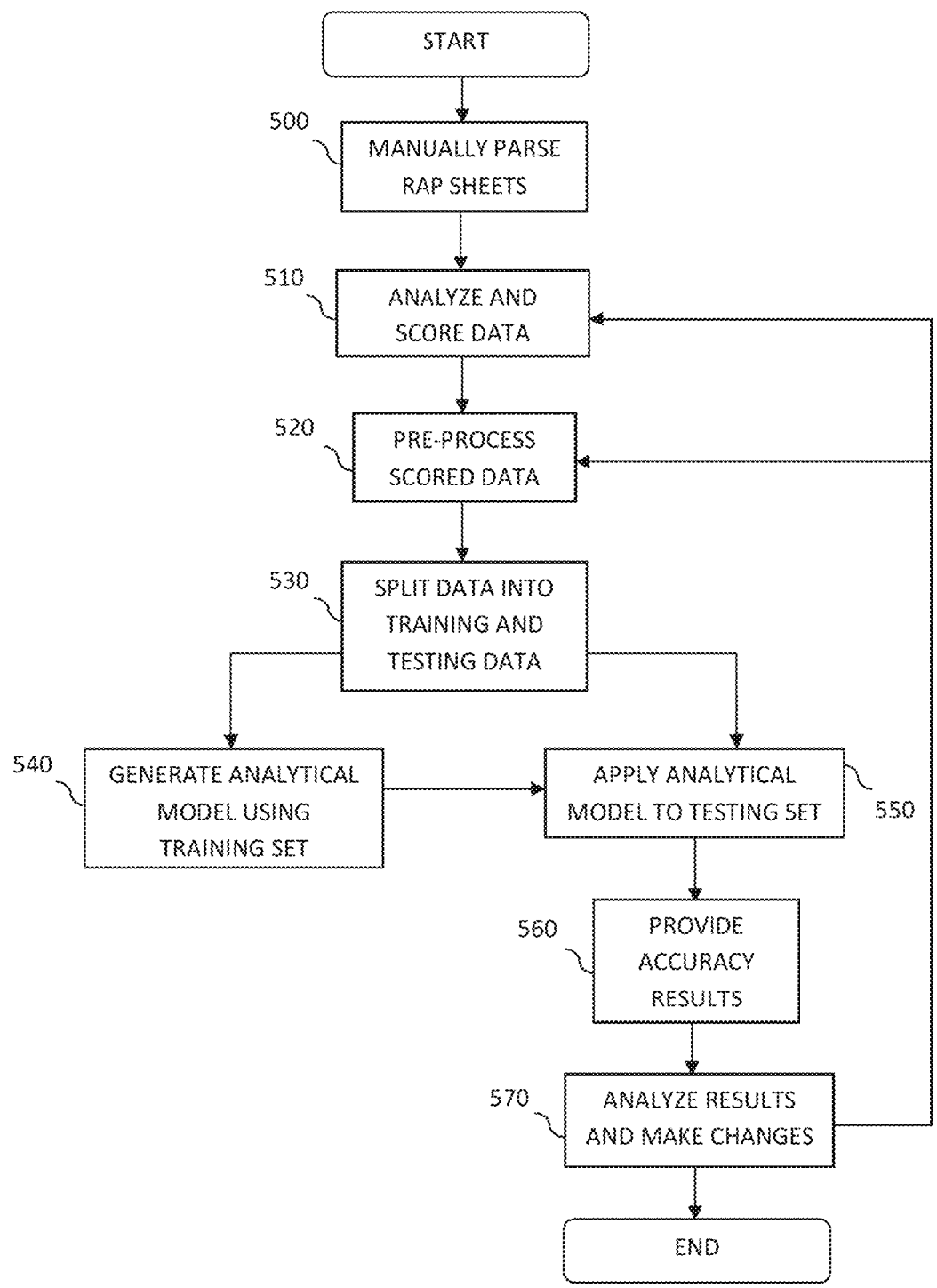
FIG. 5 is a flow chart illustrating the creation of a predictive model from which the algorithm is developed.

To develop the algorithm to automatically convert the inconsistent data (risk information) to standardized assessment information, a training model may be built. FIG. 5 is a flow chart illustrating the creation of a predictive model from which the algorithm is developed. The predictive model may be a statistical pattern learning model which is trained to predict classifications by using examples of text already classified. The predictive model may be built by parsing a number of rap sheets manually to extract the following pieces of data: charges, arrest dates, court dates, disposition, sentences, etc (operation 500). This data may then be analyzed and scored, i.e., standardized to account for any inconsistencies (operation 510). The scoring may be done by an expert in the subject matter. In the present example, involving rap sheets, a subject matter expert may be a retired police officer, FBI agent, corrections officer, and the like. The expert may go through rap sheets, line by line, standardizing the unstructured data. The scored data may then be pre-processed to remove extraneous information from the standardized data (operation 520). The pre-processing may include replacing specific words, tokens, or phrase with more text-minding friendly words, tokens, and phrases. The rap sheets may be split into a testing set and a training set (operation 530). Logical expressions may be developed as an analytical model based on the manual scoring and pre-processing of the rap sheets as part of the development of the predictive model (operation 540). The algorithm may utilize these logical expressions to convert the risk information to assessment information.

Once the predictive model is developed, new rap sheets may be automatically processed by the algorithm using the logical expressions of the predictive model to produce testing data. The predictive model may then process new rap sheets to produce testing data to predict the assessment information according to the logical expressions (operation 550). The accuracy of the prediction of the assessment information may be provided to a user based on the predictive model's confidence in the accuracy of the automatic conversion from risk information to assessment information (operation 560). The accuracy may be provided as a confidence factor, which refers to the predictive model's confidence that the automatic version is accurate. The testing data may be manually reviewed by the experts to determine the accuracy of the training model and to adjust the logical expressions to improve accuracy (operation 570). The process may return to operations 510 and 520 in order to improve the accuracy of the predictive model using additional rap sheets. The more testing data the predictive model processes, the more accurate the predictions become due to improved logical expressions. The predictive model may be part of the risk assessment module 140 and may be updated to improve the accuracy of the predictive model when the risk assessment module 140 is utilized.

The computer system 100 may be used to assess risk or as a quality check for manual risk assessment. Risk information that has been manually processed for adjudication may be fed into the computer system 100 to automatically determine the level of risk using the predictive model. The manually generated risk assessment may be compared against the automatically generated risk assessment. The accuracy level of the manual risk assessment may be determined by this comparison. The person making the manual risk assessment may then learn from the differences between the manual risk assessment and the automatic risk assessment thereby improving the quality of the manual risk assessment.

According to another embodiment, the risk information may include at least one of the following: infraction information, punishment information, and disposition information. The infraction information, punishment information, and disposition information may all correspond to the personal information of the at least one entity. As used herein, the term "infraction information" refers to any information that may be indicative of risk. As used herein, the term "punishment information" refers to the severity of the infraction. As used herein, the term "disposition information" refers to a resolution of the infraction information, such as guilt or innocence. For example, in a criminal setting, infraction information may correspond to criminal charges that may be classified using the National Crime Information Center (NCIC) codes. In this example, punishment information may correspond to the severity of the charge, i.e., whether the criminal charges constitute misdemeanors or felonies. Additionally, disposition in a criminal setting may include whether the charge resolved with a finding of convicted, not convicted, or if the resolution is unknown. The risk information may include different types of information that correspond to the type of risk. For example, infraction information, punishment information, and disposition information may apply to criminal information. Additionally, the risk information may include travel information which may include countries visited and dates of those visits.

The risk information can include additional information. For example, in a criminal setting the risk information may include whether a person has served any jail time, whether any probation is part of the sentence, if any fines or restitution requirements have been levied, etc. This type of risk information may be used by the computer 110 to infer disposition information and punishment information. For example, if the person has served jail time and punishment information indicates the person was charged with a felony, but the disposition information is unknown, the computer 110 can infer that the person was convicted based on the fact the person served jail time for the felony. Additionally, if the person has been convicted and fined over $500, but the punishment information relating to the severity of the charge is unknown, the computer 110 can infer that the person was charged with a felony based on the amount of the fine.

According to another embodiment, the infraction information, punishment information, and disposition information may be converted to standardized quantifiable values based on the risk information gathered from the at least one data source 160. The conversion to standardized quantifiable values may be manual or automatic. The computer 110 may automatically convert the infraction information, punishment information, and disposition to standardized quantifiable values using an algorithm in the risk assessment module 140. The algorithm may be specifically programmed to correspond to the type of risk information, i.e., criminal history, civil history, terrorist watch lists, traffic violations, loan or debt delinquencies, outstanding wants or warrants, academic disciplinary history, and/or immigration status. The algorithm may use logic expressions to convert the risk information to assessment information. For example, a logic expression to convert infraction information, in this example a criminal charge, to "SEXUAL_ASSAULT" or NCIC code "11" may be "SEX(UAL)?\s+ASS(UA|AU)LT." The logic expression may include other alternative or potential spellings or phrases that convey a similar charge, such as "forcible sexual intercourse." Additionally, a logic expression may convert punishment information to "FELONY," "MISDEMEANOR," or "UNKNOWN." Additionally, a logic expression may convert disposition information to "CONVICTED," "NOT CONVICTED," or "UNKNOWN."

Additionally, punishment information or disposition information may be determined according other portions of the risk information. For example, the risk information regarding a criminal charge may include jail time, which can be converted into punishment information and disposition information. In this example, punishment information may be determined according to a punishment length. The punishment length may be converted to standardized format using the following logic expression: "(DAS?IDAYS?)(?:\s|\p[Punct]|S)." This logical expression may be interpreted as: find any substring beginning with the letters "DA" optionally followed by the letter "S" or beginning with the letters "DAY" optionally followed by the letter "S" where following letters must be either a "whitespace" character, some punctuation character, or the end of the string. When the text indicating punishment length falls within the parameters of the logical expression, the first group of characters is replaced by a standardized code corresponding to a punishment length. The standardized punishment length is then converted to punishment information. Additionally, if jail time has been served, the disposition information may be inferred as "CONVICTED."

The computer-based system 100 may assess more than one risk or assess different types of information simultaneously. More than one computer-based system 100 may assess one or more risks in tandem with one another. For example, if a risk assessment takes more than one type of risk information, such as criminal history and immigration status, a computer-based system 100 may include multiple risk assessment modules to convert both types of risk information into assessment information. Alternatively, a first computer-based system may process the criminal history risk information, and a second computer-based system may process the immigration status risk information.

According to another embodiment, the assessment information may include a standardized infraction code that corresponds to the infraction information, a punishment code that corresponds to the punishment information, and a disposition code that corresponds to the disposition information. According to another embodiment, the assessment information may be quantified by assigning numerical values as the standardized infraction code, the punishment code, and the disposition code.

For example, in a criminal setting, person A may have been charged with "intimidating a witness." This infraction information may be automatically converted to standardized infraction code "THREATS" which corresponds to NCIC code 16. If person A faces more than 1 year (365 days) in prison for such a criminal charge, the punishment information may be automatically converted to standardized punishment code "FELONY." If person A is found guilty, the disposition information is converted standardized disposition code "CONVICTED." Therefore, in this example, person A has been charged with "intimidating a witness," faces over 365 days in prison, and has been "convicted." Accordingly, the system 100 may automatically convert the infraction information "intimidating a witness" to "THREATS," the punishment information from ">365 days" to "FELONY" and from "guilty" to "CONVICTED." Furthermore, the system 100 may automatically convert the infraction information from "THREATS" to "16" to correspond to the NCIC code, the punishment information from "FELONY" to "1" as a ternary value, and "CONVICTED" to "2" as a ternary value. Depending on a potential sentence length, the punishment information may be converted to "MISDEMEANOR" or "0," and if the punishment information is not clear, the punishment information may be converted to "UNKNOWN" or "2." Additionally, if person A is found not guilty, the disposition information may be converted to "NOT CONVICTED" or "1," and if the disposition information is not clear, the disposition information may be converted to "UNKNOWN" or "0."

According to another embodiment, the level of risk may correspond to the at least one entity is determined according to adjudication parameters received by the adjudication module 190. For example, a client 180 may be a security company looking to hire a new employee. The client 180 may assess the risk of job applicants by setting adjudication parameters by which to judge the applications. The adjudication parameters may be easily changeable logical expressions that correspond to the standardized vocabulary and values of assessment information. The adjudication parameters can rapidly adapt to complex and frequently changing policies of the user 170 or the client 180. The level of risk may be a threshold where if a job applicant fails to conform to the adjudication parameters set by the client 190, the level of risk is above the threshold. If a job applicant conforms to the adjudication parameters set by the client 190, the level of risk is at or below the threshold. The adjudication parameters may include a period of time elapsed from when a particular infraction occurred. If the job applicants exceed the adjudication parameters the security company is willing to accept, than the level of risk corresponding to those applicants. Additionally, the level of risk may be quantified according to the adjudication parameters. For example, the client 190 may set adjudication parameters where a felony is 10 points and a misdemeanor is 5 points. Accordingly, the client 190 may set an acceptable risk level at 24 points, thus any job applicant whose criminal record totals more than 25 points exceeds the quantified risk threshold. In this example, risk information that exceeds the risk threshold may be either a temporary or a permanent disqualifying offense. For example, the client 190 may determine that, for example, a felony that occurred over 10 years ago should not be counted in adjudicating the risk because of the lapse of time since the infraction.

According to another embodiment, the adjudication parameters may be received from a user 170 and may be manually input into the computer 110 or received from a client 180 over a network. The network include wired connections, wireless connections, the internet, Internet, or any other type of communication network using transmission control protocol (TCP) and Internet Protocol (IP).

Figure 2:
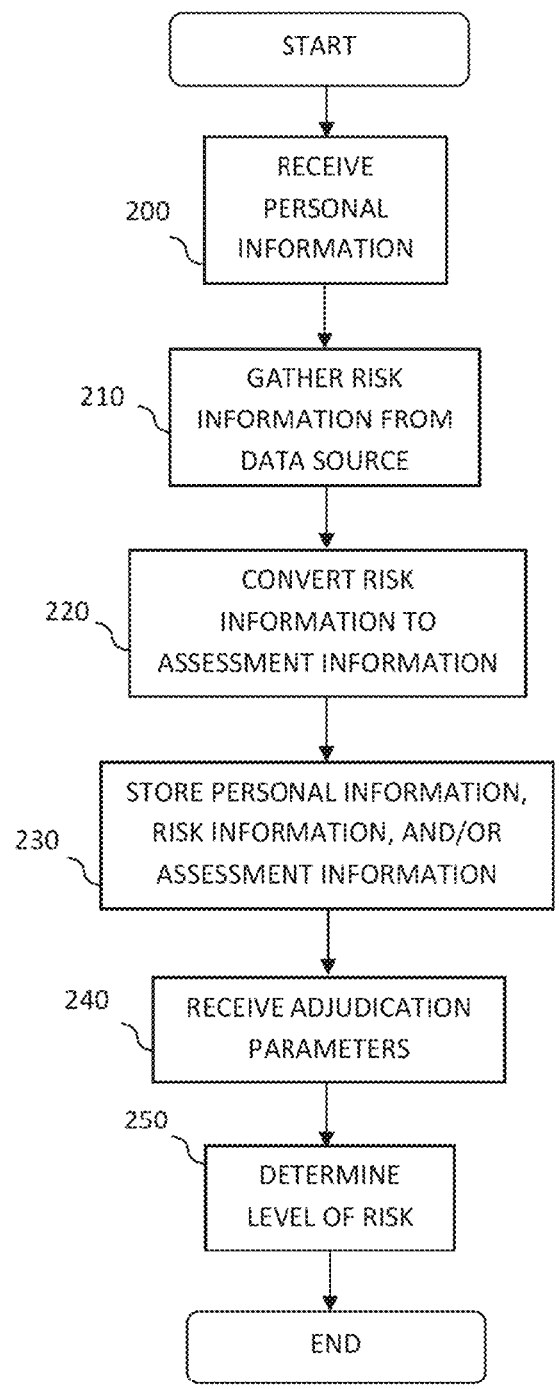
FIG. 2 is a flow chart illustrating a method of assessing risk according to one or more embodiments of the present disclosure.

FIG. 2 illustrates a method of assessing risks using a computer. In operation 200, personal information regarding at least one entity is received at the computer. In operation 210, risk information regarding the at least one entity is gathered according to the personal information from at least one data source 160.

The risk information and the personal information are assembled and/or categorized in a Master Identity Hierarchy. On the highest level, information can be obtained from a variety of sources and mapped to a hierarchy that includes: Identifiers; Fraud; Relationships; Background; Social Media; Utility Services; Licenses; and Assets. The Master Identity Hierarchy utilizes categories and sub-categories to store information for later retrieval. For example, the categories may include, but are not limited to the following: Biographic; Biometric; Residence; Communication; Possible SSN & Current Address Fraud Alerts; Possible Device Fraud Alerts; Possible Relatives; Possible Marriages; Possible Divorces; Possible Associates; Neighbors Listings for Subject's Addressess; Education Associates; and, Business Associates.

Sub-categories for Biographic Information may include: Name, Also Known As (AKA), Gender, DOB, POB, SSN, SSN—Year of Issuance, Possible Other SSNs Associated with Subject, Possible Other Records/Names Associated with Subject's SSN, Height, Weight, Hair Color, and Eye Color. FIGS. 26A-26E provide a more detailed outline of the categories, sub-categories and descriptive information that is included in the Master Identity Hierarchy.

Depending on the application, various categories of information may be used or may be deemed not necessary or may be off limits. For example, a high level security clearance may require scrutiny of all categories of information. On the other hand, a routine employment screening may be configured to prevent access to categories such as Relationships, Political Affiliations and/or Social Media. In operation 220, the risk information is converted to assessment information. In operation 230, the personal information, the risk information, and/or the assessment information are stored in a memory 150 on the computer 110. The conversion of risk information to assessment information may be manual or automatic.

Figure 3A:
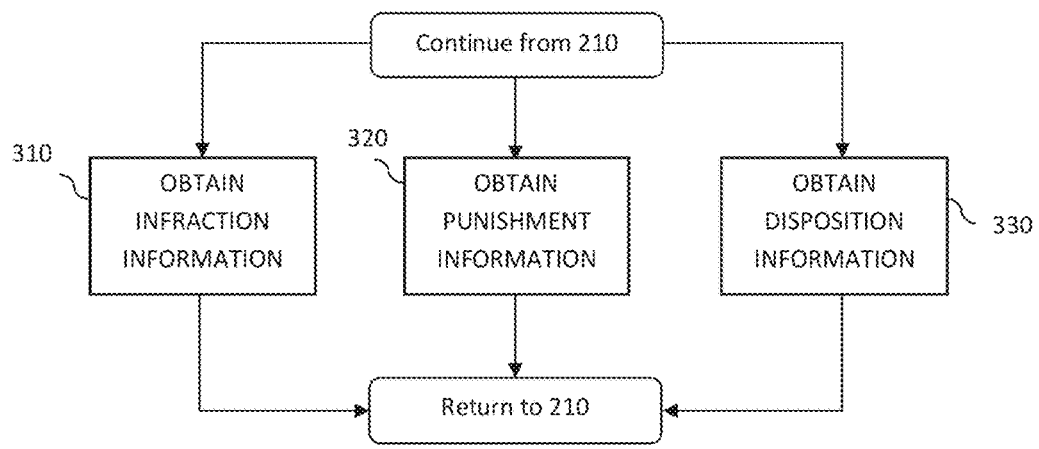
FIG. 3A is a flow chart illustrating a method of gathering risk information according to one or more embodiments of the present disclosure.

FIG. 3A illustrates a method of gathering of the risk information (operation 210). The gathering of risk information in operation 210 may include obtaining infraction information (operation 310), punishment information (operation 320), and disposition information (operation 330) that correspond to the personal information of the at least one entity.

Figure 3B:
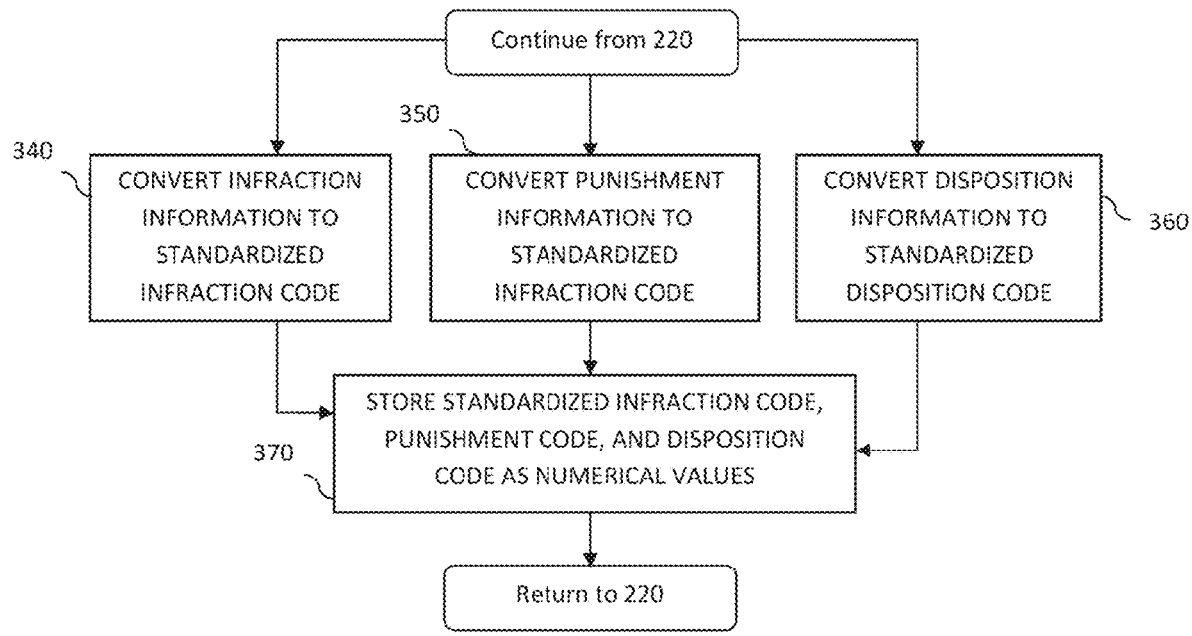
FIG. 3B is a flow chart illustrating a method of converting risk information to assessment information according to one or more embodiments of the present disclosure.

According to another embodiment, the conversion of the risk information to assessment information (operation 220) may include converting the infraction information, punishment information, and disposition information to standardized quantifiable values based on the risk information gathered from the at least one data source 160. FIG. 3B illustrates a method of converting risk information to assessment information (operation 220). The conversion of risk information to assessment in operation 220 may include converting the risk information into assessment information may include a standardized infraction code that corresponds to the infraction information (operation 340), a punishment code that corresponds to the punishment information (operation 350), and a disposition code that corresponds to the disposition information (operation 360).

According to another embodiment, the method may further include storing the standardized infraction code, the punishment code, and the disposition code on the computer 110 as numerical values (operation 370). According to another embodiment, the risk information may include criminal history, civil history, terrorist watch lists, traffic violations, loan or debt delinquencies, outstanding wants or warrants, academic disciplinary history, and/or immigration status.

According to another embodiment, the method may further include determining a level of risk (operation 250) corresponding to the at least one entity according to the assessment information. The risk assessment may be performed by issue flagging, categorization or ranking.

Issue flagging identifies potential issues related to an entity that can impact (positively or negatively) the level of risk. These issues are generalized to represent specific potential concerns, such as reliability, trustworthiness, program eligibility, etc.

The categorization risk evaluation type determines which category to associate an entity with. The ranking risk evaluation type determines a numerical value (score) that is assigned to the entity.

According to another embodiment, the level of risk corresponding to the at least one entity may be determined according to adjudication parameters. According to another embodiment, the method may further include receiving the adjudication parameters (operation 240) by inputting the adjudication parameters into the computer 110 or receiving the adjudication parameters from a client 180 over a network. The adjudication parameters may be received at the computer 110 before the process illustrated in FIG. 2 begins.

Figure 4:
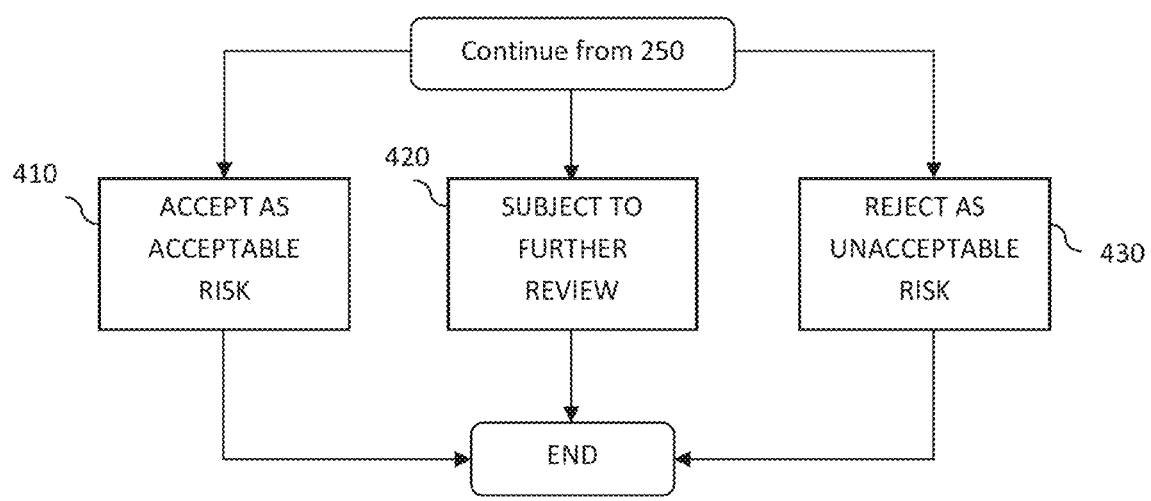
FIG. 4 is flow chart illustrating a method of determining a level of risk according to one or more embodiments of the present disclosure.

According to another embodiment, a method of assessing risks using a computer 110 is provided. The method includes receiving biographical information (operation 200) regarding at least one person at the computer 110. In operation 210, criminal information regarding the at least one person according to the biographical information is gathered from at least one data source 160, wherein the criminal information includes information relating to infractions, punishments for the infractions, and dispositions of the infractions. In operation 220, criminal information is automatically converted to assessment information, wherein a standardized numerical value is assigned to each infraction, a value of misdemeanor or felony is assigned to the punishment for each infraction, and a value of convicted, not convicted, or unknown is assigned to the disposition of each infraction. In operation 230, the biographical information, the criminal information, and the assessment information is stored on the computer 110. In operation 250 a level of risk corresponding to the at least one person according to the assessment information is determined. FIG. 4 illustrates a method of determining a level of risk (operation 250). In operation 410, the at least one person is accepted, in operation 420 the at least one person is subjected to further review, and in operation 430 the at least one person is rejected based on the level of risk. With regard to operation 420, the at least one person may be provisionally rejected based on a felony conviction, however the at least one person may subsequently be accepted in operation 410 if the felony that occurred over 10 years ago and the adjudication parameters do not disqualify applicants for felony convictions that occurred more than 10 years ago.

According to another embodiment, the method of assessing risks can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, Blu-Rays, flash drives, magnetic tapes, floppy disks, and optical data storage devices. The computer-readable recording medium can also be distributed over network coupled computer systems so that the computer-readable code is stored and executed in a distributed fashion. Also, functional programs, codes, and code segments to accomplish the present disclosure can be easily construed by programmers skilled in the art to which the present disclosure pertains.

EXAMPLES

Risk Assessment

The following examples are put forth so as to provide those of ordinary skill in the art with a complete disclosure and description of how to make and use the present disclosure, and are not intended to limit the scope of what the inventors regard as their invention.

Example 1

Criminal Risk Assessment

The system of assessing risk may be used to perform the method of assessing risk in a criminal background check setting. For purposes of this example, Company A is a security company looking to hire new employees. Company A, which corresponds to client 180 in this example, wants to do a background check on the following job applicants Person A and Person B. Company A sends personal information regarding each of the job applicants to the computer 110. In this example, Company A sends Person A and Person B's names and social security numbers to the computer 110. Computer 110 then searches various data sources 160 for pertinent risk information. In this example, the computer 110 gathers Criminal History Record Checks (CHRC) files containing the criminal history, or rap sheets, for Person A and Person B that correspond to their personal information. The rap sheet for Person A includes a charge for "rape" with a sentence length of "10 yrs" and a disposition of "glty." The rap sheet for Person B includes a charge for "forcible sexual intercourse" with a sentence length of "3650 days" and a disposition of "G." The charges on the rap sheets are infraction information, the sentence lengths are punishment information, and the dispositions are disposition information.

The computer 110 may run an algorithm in the risk assessment module 140 to convert the risk information on the rap sheets of Person A and B to assessment information. With regard to Person A, the infraction information "rape" is converted to a standardized infraction code "SEXUAL_ASSAULT" or NCIC code "11," which corresponds to this charge; the punishment information "10 yrs" is converted to a standardized punishment code "FELONY" or "1"; and the disposition information "glty" is converted to a standardized disposition code "CONVICTED" or "2." With regard to Person B, the infraction information "forcible sexual intercourse" is converted to a standardized infraction code "SEXUAL_ASSAULT" or NCIC code "11," which corresponds to this charge; the punishment information "3650 days" is converted to a standardized punishment code "FELONY" or "1"; and the disposition information "G" is converted to a standardized disposition code "CONVICTED" or "2." The standardized infraction code, punishment code, and disposition code are stored on computer 110 as assessment information in either a text format (i.e., "SEXUAL_ASSAULT," "FELONY," "CONVICTED) or in a numerical format (i.e., "11," "1," "2").

Company A (client 180) sets adjudication parameters to determine the level of risk associated with Persons A and B via an adjudication module on the client 180 or the computer 110. For purposes of this example, Company A has set adjudication parameters on the computer 110 before the risk information was gathered. In this example, Company A has determined that any job applicant that has been convicted of a felony will be excluded from being considered for a position with the company. Both conditions, conviction and that the crime is a felony, need to be satisfied in order for Persons A or B to be excluded from consideration. Therefore, when the computer 110 determines the level of risk based on the adjudication parameters, the computer 110 finds that the level of risk associated with Person A and Person B is above a risk threshold. Therefore, the computer 110 rejects Person A and Person B's job applications for Company A. Company A is then informed of the results of the risk assessment regarding Person A and Person B. If Person A was not convicted of a felony, Person A would be accepted as an acceptable risk. If it was unknown as to whether Person A was convicted or not, then Person A's application would be subjected to further review.

Example 2

Airport Security Risk Assessment

The system of assessing risk may be used to perform the method of assessing risk in an airport security setting. For purposes of this example, Person A and Person B are trying to board an international flight from Europe to the United States. The Airport Security (AS) may send personal information regarding Persons A and B to the computer 110. In this example, AS sends Person A and Person B's names, social security numbers (if applicable), and passport numbers to the computer 110. Computer 110 then searches various data sources 160 for pertinent risk information. In this example, the computer 110 gathers Criminal History Record Checks (CHRC) files containing the criminal history, or rap sheets, for Person A and Person B that correspond to their personal information. The computer 110 also gathers files relating to Person A and B's nationality, immigration status, and travel history. The rap sheet for Person A includes a charge for "carrying a concealed explosive on an airplane" with a sentence length of "5 y" and a disposition of "sentenced." Person B does not have a rap sheet. Person A is a United States citizen whose only travel has been to Europe. Person B is a Yemeni national who has traveled to Afghanistan and Pakistan in the last 12 months.

The computer 110 may run an algorithm in the risk assessment module 140 to convert the risk information relating to the criminal history of Person A and B to assessment information. With regard to Person A, the infraction information "carrying a concealed explosive on an airplane" is converted to a standardized infraction code "WEAPON_OFFENSES" or NCIC code "52," which corresponds to this charge; the punishment information "5y" is converted to a standardized punishment code "FELONY" or "1"; and the disposition information "sentenced" is converted to a standardized disposition code "CONVICTED" or "2." With regard to Person B, no conversion is necessary since Person B does not have a criminal history. AS sets adjudication parameters to determine the level of risk associated with Persons A and B via an adjudication module on the client 180 or the computer 110. For purposes of this example, AS has set adjudication parameters on the computer 110 before the risk information was gathered. In this example, AS has determined that any traveler who has been convicted of bringing unauthorized weapons on a plane is to be prevented from boarding the plane. AS has also determined that any traveler who is from Yemen and has visited Afghanistan or Pakistan in the past year is to be prevented from boarding the flight. When the computer 110 determines the level of risk based on the adjudication parameters, the computer 110 finds that the level of risk associated with Person A and Person B is above a risk threshold. Therefore, the computer 110 rejects Person A and Person B, and AS is then informed of the results of the risk assessment regarding Person A and Person B. AS then prevents Person A and Person B from boarding the plane.

Example 3

Police Office Application

The system of assessing risk may be used to perform the method of assessing risk in a criminal background check setting. Police Department (PD), which corresponds to client 180 in this example, wants to do a background check on the following job applicants: Person A and Person B. The PD sends personal information regarding each of the job applicants to the computer 110. In this example, Company A sends Person A and Person B's names and social security numbers to the computer 110. Computer 110 then searches various data sources 160 for pertinent risk information. In this example, the computer 110 gathers Criminal History Record Checks (CHRC) files containing the criminal history, or rap sheets, for Person A and Person B that correspond to their personal information. The rap sheet for Person A includes a charge for "rape" with a sentence length of "10 yrs" and a disposition of "afgh." The rap sheet for Person B includes two charges for "grand theft auto" with a sentence length of "days" and a disposition of "con." The charges on the rap sheets are infraction information, the sentence lengths are punishment information, and the dispositions are disposition information.

The computer 110 may run an algorithm in the risk assessment module 140 to convert the risk information on the rap sheets of Person A and B to assessment information. With regard to Person A, the infraction information "rape" is converted to a standardized infraction code "SEXUAL_ASSAULT" or NCIC code "11," which corresponds to this charge; the punishment information "10 yrs" is converted to a standardized punishment code "FELONY" or "1"; and the disposition information "afgh" is converted to a standardized disposition code "UNKNOWN" or "0." With regard to Person B, the infraction information "grand theft auto" is converted to a standardized infraction code "STOLEN VEHICLE" or NCIC code "24," which corresponds to this charge; the punishment information "days" is converted to a standardized punishment code "UNKNOWN" or "2"; and the disposition information "con" is converted to a standardized disposition code "CONVICTED" or "2." The standardized infraction code, punishment code, and disposition code are stored on computer 110 as assessment information in either a text format or in a numerical format.

The PD sets adjudication parameters to determine the level of risk associated with Persons A and B via an adjudication module on the client 180 or the computer 110. For purposes of this example, The PD has set adjudication parameters on the computer 110 before the risk information was gathered. In this example, the PD has determined that any job applicant that has been convicted of more than one charge of brand theft auto will be excluded from being considered for a position as a police officer with a cruiser. Both conditions, conviction and that the crime is a felony, need to be satisfied in order for Persons A or B to be excluded from consideration. Therefore, when the computer 110 determines the level of risk based on the adjudication parameters, the computer 110 finds that the level of risk associated with Person B is above a risk threshold. Therefore, the computer 110 rejects Person B's job applications to be a police officer with a cruiser at the PD. However, Person B may still be able to be accepted for another job in the PD. The PD is then informed of the results of the risk assessment regarding Person A and Person B. Person A may be accepted for the job as a police officer with police cruiser, and Person B may be accepted for a desk job with the PD.

According to another embodiment, a computer-based system 600 is provided for determining an entity's identity and assessing risks related to the entity's identity. The computer-based system 600 may include a tracking module 610, an information module 620, a risk assessment module 630, a memory 640, an identity determination module 660, and/or a web-based module 670. The modules may each be located on a computer or may be located on separate computers connected via the computer-based system 600 over a network, such as the Internet. The memory 640 may be a fixed disk where an operating system, application programs, and/or data may be stored. The identities of entities 650 may be compiled and stored as a data source 680. The computer-based system 600 may track all processes of the computer-based system in a log that may be stored on the memory 640.

Figure 6:
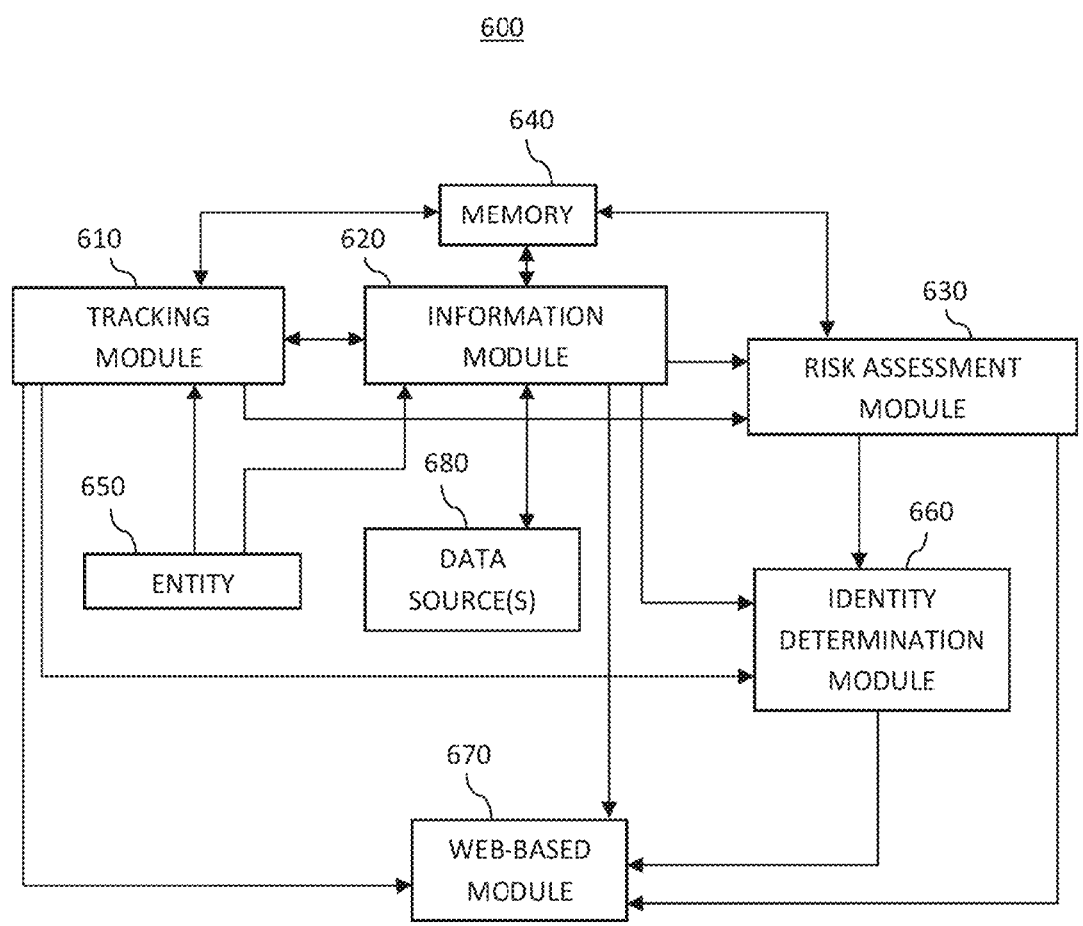
FIG. 6 is a block diagram illustrating a computer system to determine an entity's identity and assess risks related to the entity's identity according to one or more embodiments of the present disclosure.

As illustrated in FIG. 6, the computer-based system 600 may receive and/or transmit biographic information and/or biometric information from one or more entities 650 or data sources 680 through storage media, wired connections, wireless connections, the internet, Internet, or any other type of communication network using transmission control protocol (TCP) and Internet Protocol (IP). Entities 650 may utilize the computer-based system 600 via an input device, such as a keyboard or a mouse. Data sources 680 may be computers connected to computer-based system through a network. For example, the computer-based system 600 may receive or transmit these types of information through a flash memory drive, disc media (i.e., CD, DVD, Blu-Ray), a wired network connection (i.e., the internet), or a wireless connection. Multiple computer-based systems 600 may be connected to receive or transmit information through the above means.

The tracking module 610 may record, at a computer, encounters an entity 650 has with the computer-based system 600. As used herein, the term "encounter" refers to any interaction between an entity and the computer-based system 600. The tracking module 610 of the computer-based system 600 may record consecutive recurring encounters that may be constantly triggered by interactions between the entity 650 and the computer-based system 600. The tracking module 610 may keep track of previous encounters the entity 650 has with more than one computer-based system 600. The tracking module 610 may keep a record of all previous encounters with the entity 650 that may be used to detect patterns of encounters that may suggest risks, such as potential fraud or security threats. When an entity 650 encounters the computer-based system 600, the tracking module 610 may record the encounter and generate encounter information regarding the recorded encounter. During each encounter, the tracking module 610 collects personal information relating to the entity 650, information relating to the nature of the encounter, and information regarding which computer-based system 600 the entity 650 encounters. The personal information of the entity 650 may include biographic information and biometric information relating to the entity 650. For example, if the computer-based system 600 is used to verify the identity or assess the risk associated with an airline passenger (entity 650) checking in for a flight, the encounter information may include that the entity 650 tried to board a plane as well as any details about the entity's interaction with an airport representative. In this example, an airport representative (such as a ticketing agent)

may record any information about the encounter that may be pertinent to assessing risk or verifying the entity's identity.

The information module 620 may gather, at a computer, biographic information and biometric information relating to the entity's 650 identity. The information module 620 may receive the biographic information and the biometric information from the tracking module 610. The information module 620 may detect changes in the biographic information and the biometric information based on previously recorded encounters. Changes in the biographic information and the biometric information may be detected by comparing this information in a present encounter with that of a previous encounter. Any discrepancy between these sets of information between encounters qualifies as a change and is detected by the information module 620. If either the biographic information or the biometric information has changed between encounters, the information module 620 generates an event relating to the present encounter during which change information is detected. As used herein, the term "event" refers to a detection of a change in the biographic information or biometric information. An event may be classified according to the level of importance. The classifications event can range in seriousness and may be expressed as numerical rankings, color coded rankings, termed rankings, etc. The classifications may be expressed as numerical rankings with a range of 1 through 10, where 1 refers to a mild event that is mostly insignificant whereas 10 refers to a serious event that deserves immediate attention. The classifications may be expressed as color coded rankings with a range of white to red where white refers to a mild event and red refers to a serious event. The classifications may be expressed as termed rankings, such as "mild" referring to a non-serious event and "serious" referring to a serious event. For example, if the biographic information of an entity 650 includes an address, and the address of the entity 650 has changed between encounters, this may result in a ranking of 1 or mild or yellow, depending on how the classifications are expressed.

The risk assessment module 630 may, at a computer, evaluate risks associated with the entity 650 according to previously recorded encounters and assessment parameters. As used herein, the term "assessment parameters" refers to any information that can be utilized to assess a risk. The risk assessment module 630 may use discrepancies between previous encounters to evaluate the risks associated with the entity 650. For example, if the biometric information of an entity 650 changes between encounters, the risk assessment module 630 may determine that the entity 650 presents a high risk. The risk assessment module 630 may confirm the identity of the entity 650 and assess the risk associated with the entity 650 whether the identity of the entity 650 determined by a present counter matches or does not match that of previous encounters. The risk assessment module 630 may determine the entity's 650 propensity for fraud based on the assessment parameters. The assessment parameters may include: configurable business rules, predictive models, debarment lists, etc. Each computer-based system 600 may utilize different assessment parameters based on the particular types of risks that the computer-based system 600 is targeting. As with the adjudication parameters of the adjudication module 190, the assessment parameters may be easily changeable logical expressions so that they can be rapidly adapted or configured according to complex and frequently changing policies or environments depending on what person or organization is utilizing the computer-based system 600. The memory 640 may store the personal information, the detected changes in the personal information, and the encounter information.

The computer-based system 600 may provide fraud and deceit related measures, such as opening investigations on selective entities 650, suggesting vetting sources that should be consulted (or re-consulted), updating specific data sources 680. The computer-based system 600 may signal the person or organization utilizing the computer-based system 600 to initiate an investigation in to an entity's 650 identity if the information module 620 detects changes in the biographic information or the biometric information based on previously encounters recorded by the tracking module 610. The computer-based system 600 may generate a list of sources for the person or organization utilizing the computer-based system 600 to consult to determine whether the information module 620 is accurate in detecting a change in the biographic information or the biometric information of the entity 650. The tracking module 610 may be updated with new biographic information and/or biometric information if it is determined that the change in the biographic information and/or the biometric information is accurate and reflects a change in the entity's 650 personal information without changing the entity's 650 identity. For example, the information module 620 may detect a change in biometric information relating to an entity 650, such as an iris scan. A change in an entity's 650 iris pattern may or may not be an indication of identity fraud. If, for example, an entity 650 has had corrective laser eye surgery, the iris scan of the present encounter may not match up with an iris scan of a previous encounter. Therefore, upon verification that the identity of the entity 650 has not changed between encounters, the iris scan of the entity 650 may be updated so that future encounters use the post-surgery iris scan to detect any changes in the biometric information.

The identity determination module 660 may, at a computer, determine the identity of the entity 650 according to the biographic information and the biometric information, the encounter information, and the evaluated risks of the risk assessment module 630. If the personal information has not changed between encounters, the identity determination module 660 may conclude that the entity 650 is who the identity claims to be. If the personal information has been changed between encounters, the identity determination module 660 may verify that while the personal information has changed, the identity of the entity 650 has not.

The web-based module 670 may, at a computer, display encounter information, biological information and biometric information, changes in the biological information and the biometric information, the evaluation of the risks, and the determined identity of the entity 650. The web-based module 670 may display these types of information on a computer through storage media, wired connections, wireless connections, the internet, Internet, or any other type of communication network using transmission control protocol (TCP) and Internet Protocol (IP). The web-based module 670 may also display a log of events relating to an entity 650 and its interaction with the computer-based system(s) 600. The web-based module 670 may allow a person or organization to search through encounters to find information regarding a particular encounter or a particular entity 650. The web-based module 670 may also allow a person or organization utilizing the computer-based system 600 to manage debarment lists. For example, a person or organization utilizing the computer-based system 600 may add an entity 650 to a debarment list based on an encounter using the web-based module 670. The web-based module 670 may package all the above information in XML to contain all details about a current encounter, previous encounters, and fraud assessments. Once the web-based module 670 packages all the above information, the encounter of the entity 650 with the computer-based system 600 ends.

Figure 7:
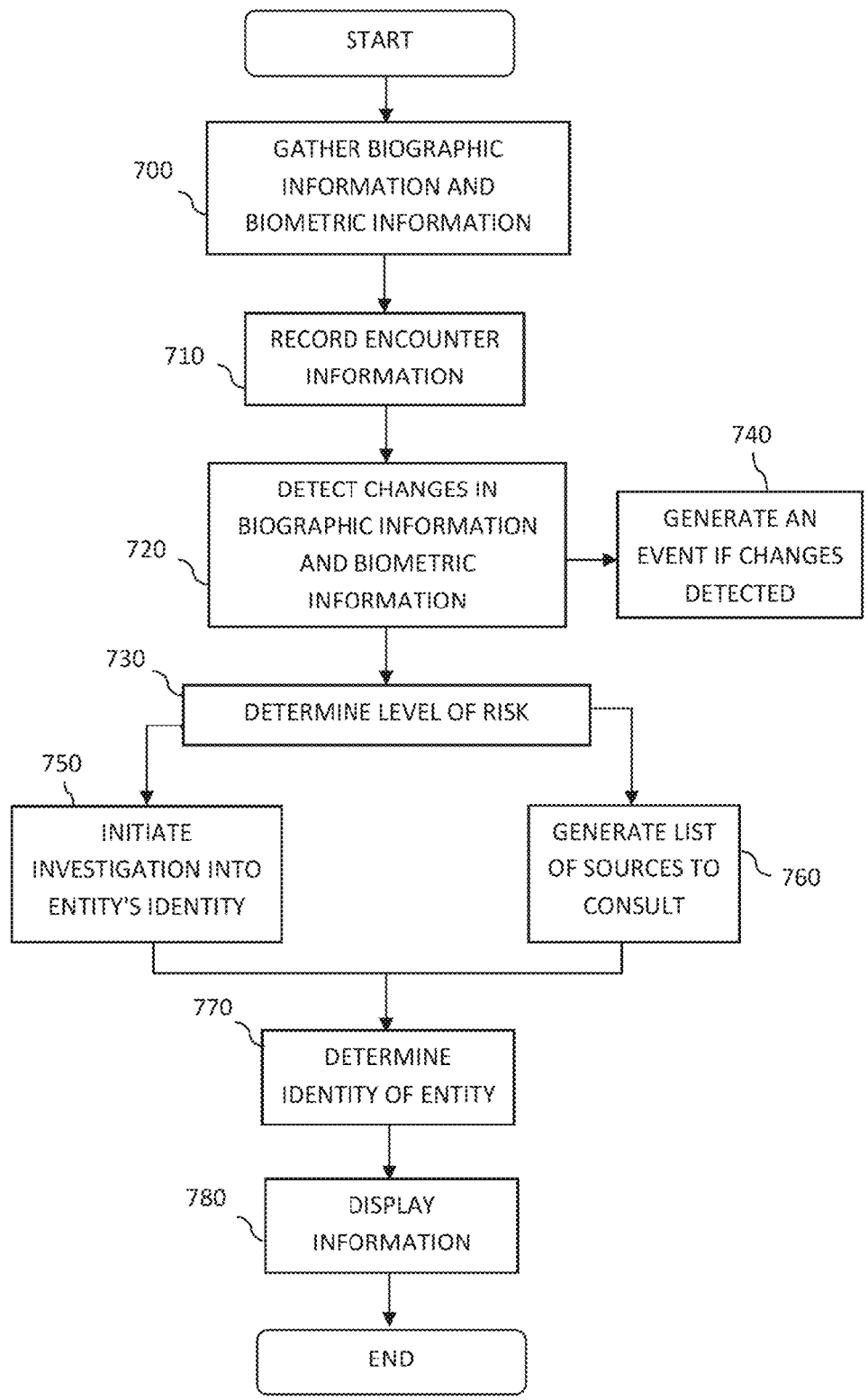
FIG. 7 is a flow chart illustrating a method of determining an entity's identity and assessing risks related to the entity's identity according to one or more embodiments of the present disclosure.

FIG. 7 illustrates a method determining an entity's identity and assessing risks related to the entity's identity using a computer. In operation 700, personal information, in the form of biographical information and biometric information, relating to the entity's 650 identity is gathered during a first encounter. In operation 710, encounter information regarding the first encounter is recorded. In operation 720, changes in the biographic information and the biometric information are detected by comparing the biographic information and the biometric information from the first encounter with second biographic information and biometric information from a second encounter. In operation 730, risks, or a level of risk, associated with the entity are determined according to the encounter information and assessment parameters. The first biographic information and the biometric information, the encounter information, and the second biographic information and the biometric information may be stored in memory 640 (not illustrated).

In operation 740, an event may be generated if the biographic information or the biometric information of the second encounter is different from that of the first encounter. The event may be classified according to a level of importance. After risks associated with the entity are determined in operation 730, the method proceeds to either operation 750 or operation 760. In operation 750, an investigation into an entity's 650 identity is initiated if changes in the biographic information or the biometric information are detected. In operation 760, a list of sources to consult is generated to determine whether the detected changes in the biographic information or the biometric information are accurate. The encounter information may be updated if the accuracy of the second biographic information and the biometric information has been verified (not illustrated). The determination of the risks associated with the entity 650 in operation 730 may include determining the entity's 650 propensity for fraud based on the assessment parameters. The assessment parameters may include: configurable business rules, predictive models, debarment lists, etc. Debarment lists include, but are not limited to, tenor watch lists, do not fly lists, sex offender registries, Medicare/Medicaid exclusion lists, and the like.

In operation 770, the identity of the entity 650 may be determined according to the first and second biographic information and the biometric information, the encounter information, and the determined risks associated with the entity 650. In operation 780, the encounter information, the first and/or second biological information and biometric information, the determined risks, and the determined identity of the entity 650 may be displayed using a web-based module.

According to another embodiment, the method of determining an entity's identity and assessing risks related to the entity's identity can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, Blu-Rays, flash drives, magnetic tapes, floppy disks, and optical data storage devices. The computer-readable recording medium can also be distributed over network coupled computer systems so that the computer-readable code is stored and executed in a distributed fashion. Also, functional programs, codes, and code segments to accomplish the present disclosure can be easily construed by programmers skilled in the art to which the present disclosure pertains.

Examples of Biometric/Biographic Risk Assessment

The following examples are put forth so as to provide those of ordinary skill in the art with a complete disclosure and description of how to make and use the present disclosure, and are not intended to limit the scope of what the inventors regard as their invention.

Example 4

Debarment Rule Set

The computer-based system 600 may include a rule set regarding a debarment lists where risk associated with an entity 650 may be determined according to the debarment list. For example, when an entity 650 encounters the computer-based system 600, the computer-based system 600 may determine that an entity 650 is on a debarment list and therefore the entity 650 may be prevented from engaging in a prohibited activity. The debarment lists are composed of entities 650 whose identities have been confirmed and verified. The computer-based system 600 confirms an entity's 650 identity, and then compares the entity's 650 identity with the identities included in the debarment lists.

For example, debarment list rules may include the following. When the confirmed identity of an entity 650 during an encounter can be found on any debarment list, create a negative (red score) risk or fraud assessment result. When the confirmed identity of an entity 650 during an encounter can be found on a "sexual predator" debarment list, create a negative (red score) risk or fraud assessment result that indicates fraud. When the confirmed identity of an entity 650 during an encounter matches more than two debarment lists, score the risk or fraud assessment result as a negative (red score). When the confirmed identity of an entity 650 during an encounter matches 1 or 2 debarment lists, score the risk or fraud assessment result as potentially fraudulent (yellow). When the confirmed or unconfirmed identity of an entity 650 during an encounter matches any one on a debarment list, the fraud assessment should be potentially fraudulent (yellow).

As illustrated above, the debarment list rules are configurable according to the specific needs and goals of the person or organization utilizing the computer-based system 600.

Example 5

Encounter Rule Set

In this example, two organizations in separate states utilize computer-based systems 600 to monitor driver license entitlement systems. The following rules may be exercised in such a scenario.

When the confirmed identity of an entity 650 during an encounter is found within previous encounters related to different computer-based systems 600, then a negative fraud assessment should be made. When the confirmed identity of an entity 650 during an encounter is found within previous encounters with an overall negative assessment then the overall assessment of the present encounter should also be negative.

As illustrated above, the encounter rules are configurable according to the specific needs and goals of the people or organizations utilizing the computer-based systems 600.

Example 6

Identity Mismatch Rule Set

In this example, the computer-based system 600 can generate scores for matching biographic information of an entity 650 to a previous encounter, biometric information of an entity 650 to a previous encounter, etc. The following fraud detection rules may be utilized.

When the matching scores on any of the components of the personal information of previous encounters regarding an entity's 650 identity differs from the present encounter by more than 40%, the entity's 650 identity in the present encounter is flagged as potentially fraudulent (yellow). When the matching scores on any of the components of the personal information of previous encounters regarding an entity's 650 identity differs from the present encounter by more than 60%, the entity's 650 identity in the present encounter is flagged as definitely fraudulent (red).

The rules can be developed to be as complicated or as simple as the organization or person utilizing the computer-based system 600 wishes. For example, take a hypothetical scenario where entity A applies to a security-sensitive program that uses both fingerprints and biographical information. The security-sensitive program utilizes a computer-based system (System X) to record entity A's encounter. Since entity A has not encountered system X before, entity A's fingerprints and biographical information are recorded and presumed to be accurate. System X then runs a risk assessment on entity A, and concludes that entity A should be denied access to the security-sensitive program because of a criminal record. Subsequently, entity A reapplies to a similar program, and to avoid rejection, uses his brother, entity B, to encounter the computer-based system 600. In this scenario, entity B exactly resembles entity A in all physical attributes and has been previously approved to access the security-sensitive program. Entity A has entity B provide entity A's biographic information and entity B's fingerprints so that the criminal background check will come back clean.

In this scenario, the following rule may be utilized to catch the attempted fraud. When the biographic information and the biometric information of a entity 650 matches two different entities on the computer-based system 600 with a confidence factor greater than 70%, the identity of entity 650 is flagged as fraudulent (red).

Figure 8:
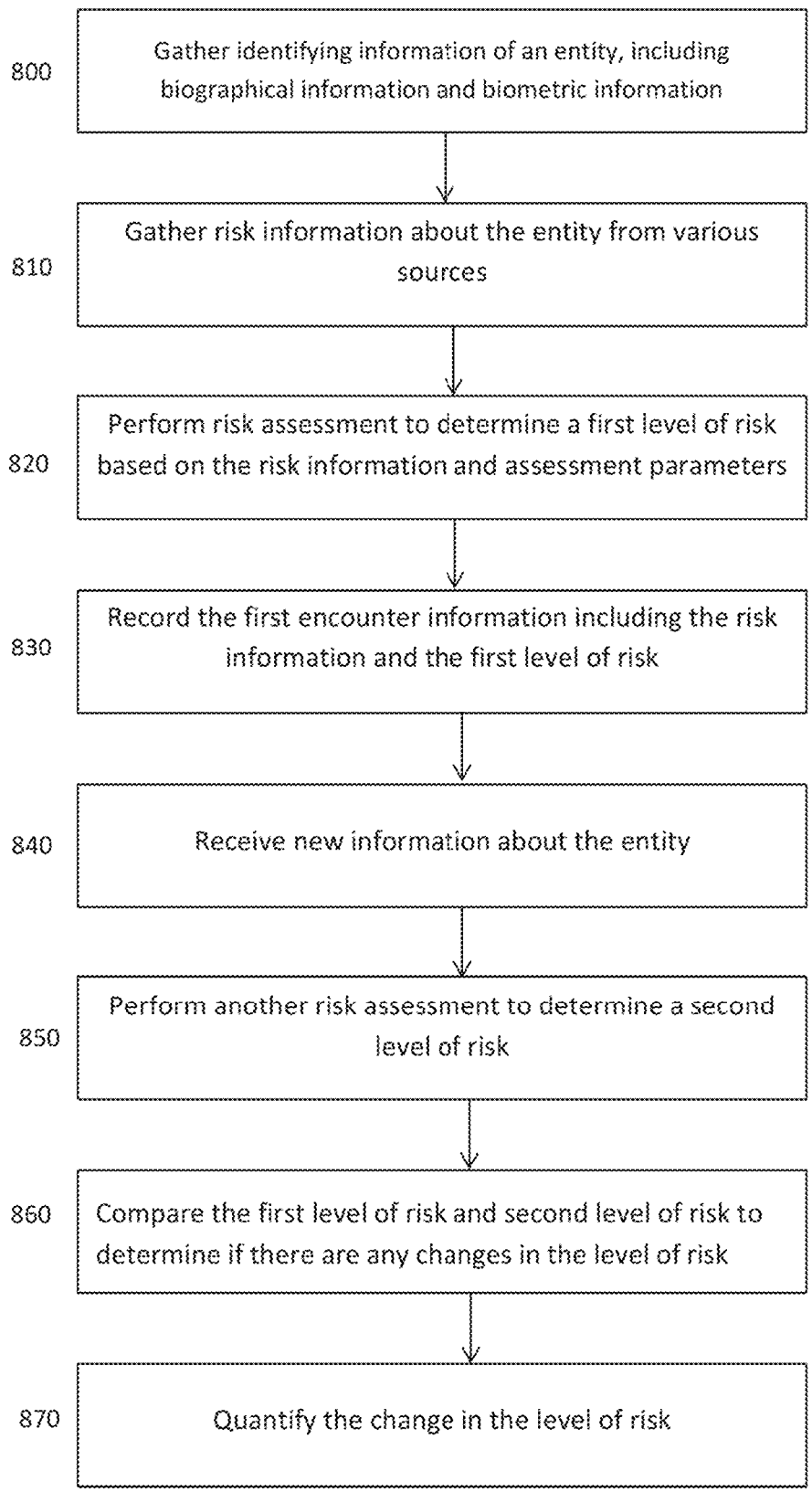
FIG. 8 is a flow chart illustrating a method of measuring a change in risk of an entity.

FIG. 8 illustrates a method determining assessing changes in risks related to the entity using a computer. In operation 800, personal information, in the form of biographical information and biometric information, relating to the entity's identity is gathered during a first encounter. In operation 810, risk information about the entity is collected from various sources. In operation 820, a risk assessment is performed to determine a first level of risk based on the risk information and assessment parameters. In operation 830, the encounter information regarding the first encounter, the risk information and the first level of risk are recorded.

In operation 840, new information about the entity is received. The new information can be from a second encounter with the entity, such as, for example, an airport or visa screening. The new information may also be voluntarily provided by the entity. Alternatively, the system can be designed so that it queries sources of risk information on a routine or periodic basis depending on the preference of the user. In a further embodiment, new information can be "pushed" to the system any time the risk information from a source is updated.

In operation 850, the method performs another risk assessment to determine a second level of risk. The second level of risk takes into account the original risk information along with the updated risk information. In operation 860, the first level of risk and second level of risk are compared to determine if there are any changes in the level of risk.

In operation 870, the change in the level of risk is quantified. For example, the change in the level of risk may be in a numeric format from, for example, 1-10 with 1 as the lowest and 10 as the highest change in risk information. As another example, the quantification may be a color coded such as green, yellow or red or a term such a low, moderate or high change in risk profile.

In operation 880, the quantified change in level of risk is used to determine if further action may be necessary. For example, if the change in risk level is low, the result may be stored in memory with no further action taken. If the change in risk level is moderate, the entity may be reviewed for a renewed security clearance prior to expiration of the credential.

Table 1 illustrates a criminal history record of an entity. The criminal history report is provided in a number of arrest cycles and one of eight arrest cycles is illustrated in Table 1. The criminal history record includes biographic information such as name and date of birth and each arrest cycle identifies the legal jurisdiction, police jurisdiction, arrest date, offense date, criminal charges and the disposition of the case.

TABLE 1

| CRIMINAL HISTORY |
|---|
| ARREST 001 OF 008 |
| ARRESTED Apr. 12, 2002 AGENCY CASE NO: nnnn |
| AGENCY: NJ0090400 HARRISON PD HUDSON |
| NAME USED: xxxxxxx xxxx x. DOB USED: nn/nn/nnnn |
| OFFENSE DATE: Apr. 12, 2002 |
| 001 CNT 2C:12-1B(5) (A) ASSAULT ONPOLICE |
| 001 CNT 2C:20-3A THEFT OF MOVABLE PROPERTY |
| 001 CNT 2C:21-6C CREDIT CARD THEFT |
| 001 CNT 2C:29-2A RESISTING ARREST |
| SUMMONS/WARRANT PROMIS/GAVEL NO: W 20020001220904 |
| DISPOSITION DATE: Apr. 29, 2002 |
| AGENCY: NJ009041J MUNICIPAL COURT HARRISON |
| DISPOSITION: DISMISSED |
| 001 CNT: 2C:29-2A(1) DEG: RESISTING ARREST |
| SUMMONS/WARRANT PROMIS/GAVEL NO: W 20020001230904 |
| DISPOSITION DATE: Apr. 29, 2002 |
| AGENCY: NJ009041J MUNICIPAL COURT HARRISON |

TABLE 1-continued

CRIMINAL HISTORY

DISPOSITION: DISMISSED
001 CNT: 2C:20-3A DEG: THEFT OF MOVABLE PROPERTY
SUMMONS/WARRANT PROMIS/GAVEL NO: NO: W 20020001240904
DISPOSITION DATE: Apr. 29, 2002
AGENCY: NJ009041J MUNICIPAL COURT HARRISON
DISPOSITION: GUILTY
001 CNT: 2C:12-1A(1) DEG: SIMPLE ASSAULT DISPOSITION: GUILTY
001 CNT: 2C:20-7A DEG: RECEIVING STOLEN PROPERTY
AGGREGATE SENTENCE DATE: Apr. 29, 2002
COURT: NJ009041J MUNICIPAL COURT HARRISON
JAIL TIME CREDIT 17D AMOUNT ASSESSED $ 1 028
AGGREGATE RESENTENCE DATE: Apr. 19, 2002
COMMITTED IN LIEU OF FEES/FINE
COURT: NJ009041J MUNICIPAL COURT HARRISON
INCARCERATION: HUDSON CTY JAIL
CONFINEMENT 35D AMOUNT ASSESSED $ 0

As mentioned above, each jurisdiction may include information on criminal history or "rap" sheets in an unstructured non-standardized manner. For example, each jurisdiction may have a unique way of classifying the same crime, the classifications and crimes may change over time, there may also be typographical errors that are never fixed, and other various differences or errors that cause inconsistencies in the data. Thus, predictive analysis may perform text substitutions to normalize the criminal history.

Table 2 shows parsed results of the first arrest cycle:

TABLE 2

PARSED RESULTS - FIRST ARREST CYCLE

```
<signature>
  <arrestDate>2002/04/10</arrestDate>
  <courtDate>2002/04/24</courtDate>
  <chargeDescriptionCount>8</chargeDescriptionCount>
  <offenseCode>2300</offenseCode>
  <severityCode>3</severityCode>
  <dispositionCode>0</dispositionCode>
  <offenseCode>0</offenseCode>
  <severityCode>3</severityCode>
  <dispositionCode>3</dispositionCode>
  <offenseCode>1300</offenseCode>
  <severityCode>3</severityCode>
  <dispositionCode>3</dispositionCode>
  <offenseCode>4800</offenseCode>
  <severityCode>3</severityCode>
  <dispositionCode>0</dispositionCode>
  <offenseCode>1300</offenseCode>
  <severityCode>3</severityCode>
  <dispositionCode>0</dispositionCode>
  <offenseCode>4800</offenseCode>
  <severityCode>3</severityCode>
  <dispositionCode>0</dispositionCode>
  <offenseCode>2300</offenseCode>
  <severityCode>3</severityCode>
  <dispositionCode>0</dispositionCode>
  <offenseCode>2600</offenseCode>
    <severityCode>3</severityCode>
    <dispositionCode>0</dispositionCode>
  </signature>
```

The parsed arrest cycle information includes an arrest date, court date and a charge description count. Each charge is translated to an offense code, severity code and disposition code.

Table 3 shows the signature for the arrest cycle identified in Table 1:

TABLE 3

SIGNATURE

08078a07c60204b0040004b00400075407560208fc030008fc0300073e073e020dac

The signature is a compact character string that includes all of the information provided in the criminal history report. The signature is computer readable and can be used to generate a standardized criminal history report.

The signature can be stored for later comparison with a signature from a later time period. If the signature is to be stored, the information can be encrypted to prevent unauthorized access.

Figure 9A:
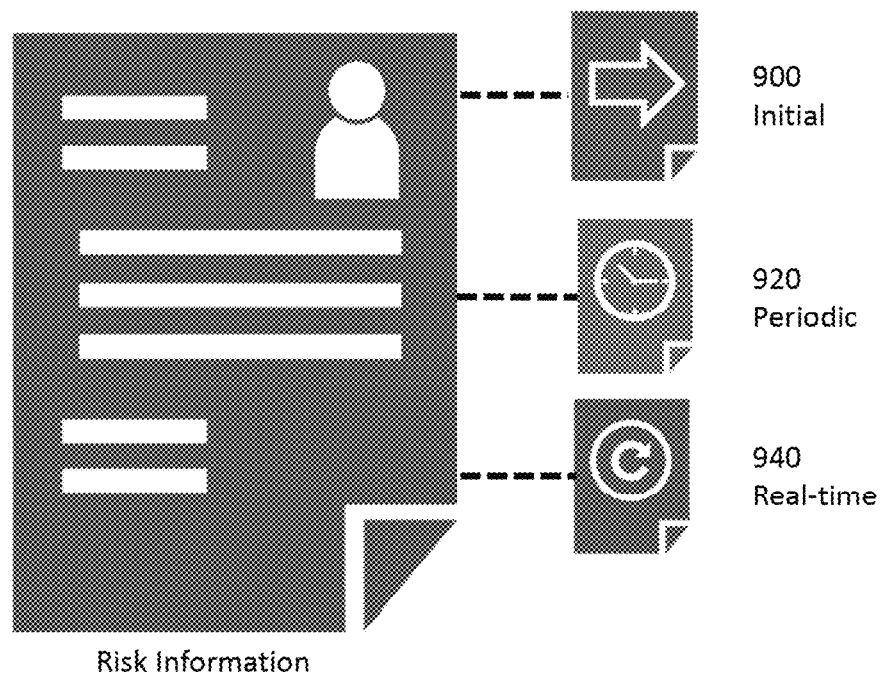
FIGS. 9A and 9B show method of performing periodic risk evaluations.
Figure 9B:
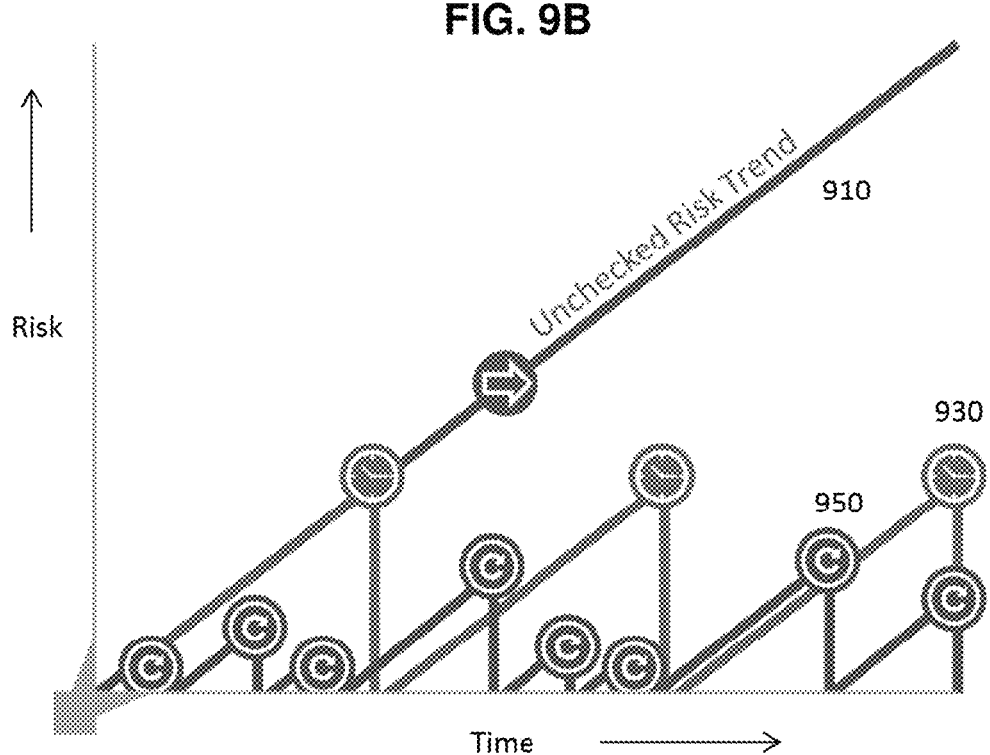

The advantages of risk evaluation on a periodic basis are shown in FIGS. 9A and 9B. Typically, a risk assessment is made when a security credential is issued (900). As shown in FIG. 9B, the risk 910 that the result of an initial risk assessment could be inaccurate increases over time. Thus, if the security credential is only reviewed upon expiration or renewal, important risk assessment information could be overlooked.

As shown in the diagram, risk evaluations can be scheduled 930 or they can occur as new risk data is received 950. The risk evaluations appear as circular nodes 930, 950 on a diagram with a timeline and a risk level. Thus, the screening manager can immediately evaluate the risk levels over time by reviewing the series of nodes 930, 950 which may be connected by reference lines. The screening manager may also select one of the nodes 930, 950 to display more detail about the risk evaluation. The additional detail may be displayed adjacent to the timeline or it may open up a separate window to display the additional detail.

As mentioned above, a policy can be implemented to establish a periodic update or scheduled risk assessment 920. The scheduled risk assessment reduces the risk that there could be signification changes in risk information that may change the result of a security or risk review. Risk assessments may also be performed through randomly on demand as needed.

The system can also perform a real-time risk assessment 940. Sources of risk information are instructed to provide new risk information for particular entities as it is produced. For example, a watch list or other data source may be updated. The updated risk information can be incorporated into new risk assessments 950 as the information is received. For example, an updated credit score or financial rating can be forwarded as soon as it is generated. This information can then be directly compared to a previous risk assessment.

Additional process triggers may be used, such as, for example, based on watch list updates or by on demand of the reviewer.

Figure 10:
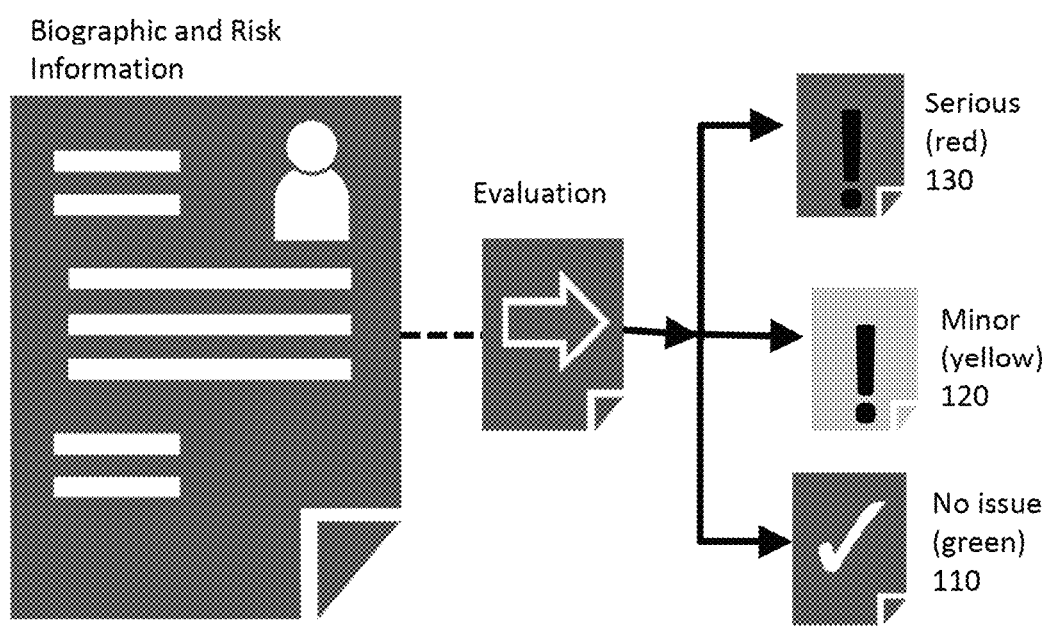
FIG. 10 shows a ranking system for measuring risk.

The updated risk assessment can also be used to produce a new signature that contains the risk information. The new signature is compared to an original or previous signature. As shown in FIG. 10, if a change in risk level is detected the classifications for change in risk may be may be expressed as termed rankings, such as no issue 110, minor issue 120 or serious issue 130. referring to a non-serious event and "serious" referring to a serious event. These rankings may use visual indicators such as green for no issue, yellow for minor issues 120 and red for serious issues.

Figure 11:
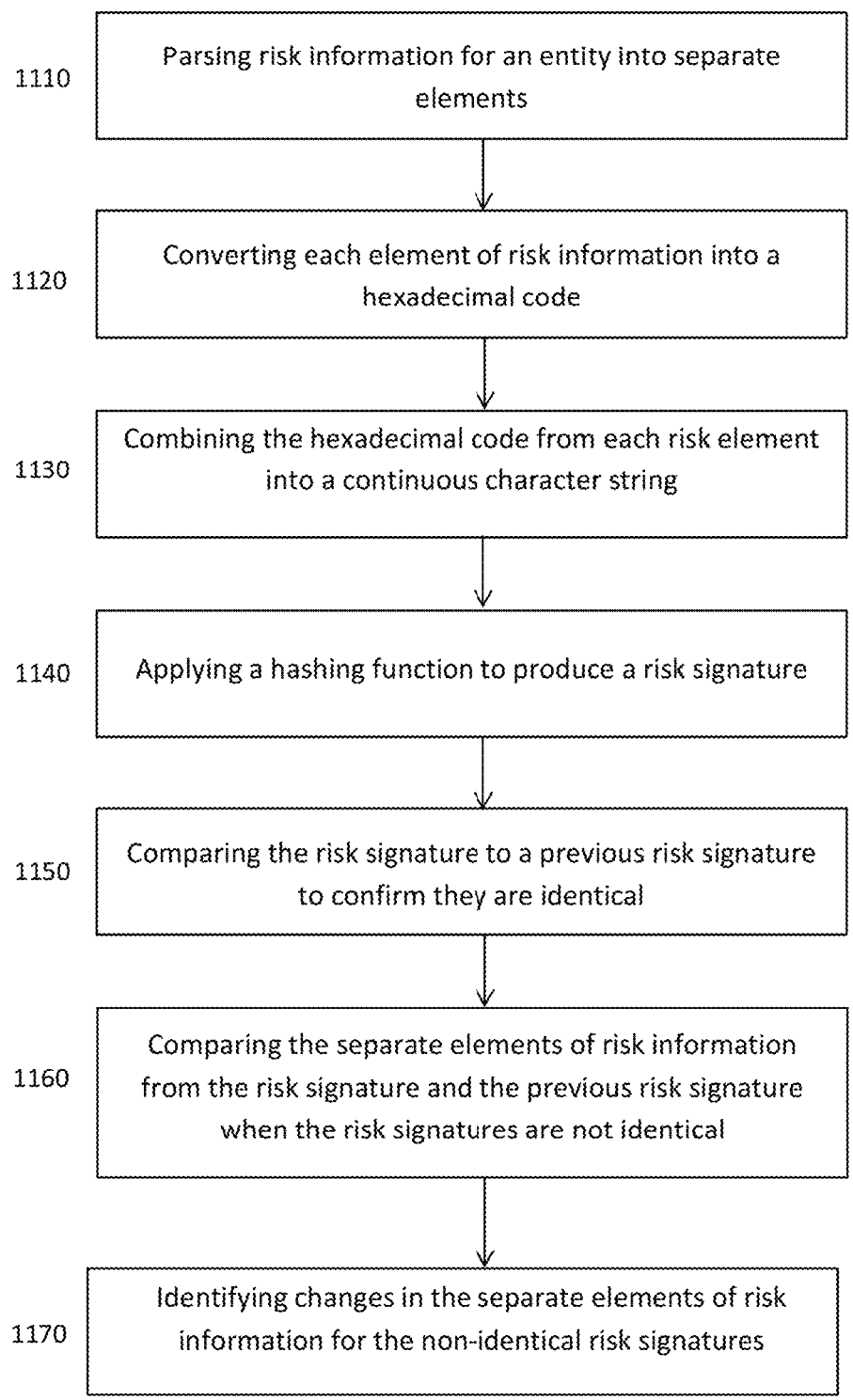
FIG. 11 illustrates a method of generating and compare risk signatures.

FIG. 11 illustrates a method of identifying changes in risk information. In operation 1110, risk information, such as, for example, the criminal history report in Table 1 above, is parsed to produce separate elements. In operation 1120 the parsed elements are converted to numerical values and/or a hexadecimal code. In one embodiment, the hexadecimal code may have a "weighted" significance. For example, more serious events in the criminal history can have a higher numerical value or a letter code indicating the severity.

In another embodiment, the code appears to be a random sequence of characters, however, the random sequence corresponds to weighted values that are not disclosed without a particular authorization level. Thus, the record of coded characters can be stored and/or distributed while the underlying values remain confidential.

In operation 1130, the hexadecimal code for each separate element is combined into a continuous character string. In operation 1140, a hashing function is applied to produce a risk signature. In one embodiment, the hashing function is applied to encrypt the data. In another embodiment, the hash function generates fixed-length output data that shortens reference to the continuous character string.

In one embodiment, the hashing function of operation 1140 is a one way function or not invertible such that it is not possible to reconstruct the continuous character string from the risk signature.

In operation 1150, the risk signature is compared to a previously generated risk signature. Any changes in the separate elements of risk data will be apparent as a change in the risk signatures.

In operation 1160, the separate elements of risk information are compared when there is a change in the risk signatures. In operation 1170, changes in risk information are identified. These changes in risk information and/or a complete risk information report can be forwarded to an authorized user for further evaluation. In one embodiment, the hashing is omitted to produce the risk signature. Instead, the continuous character string is the risk signature that is used for comparison.

Figure 12:
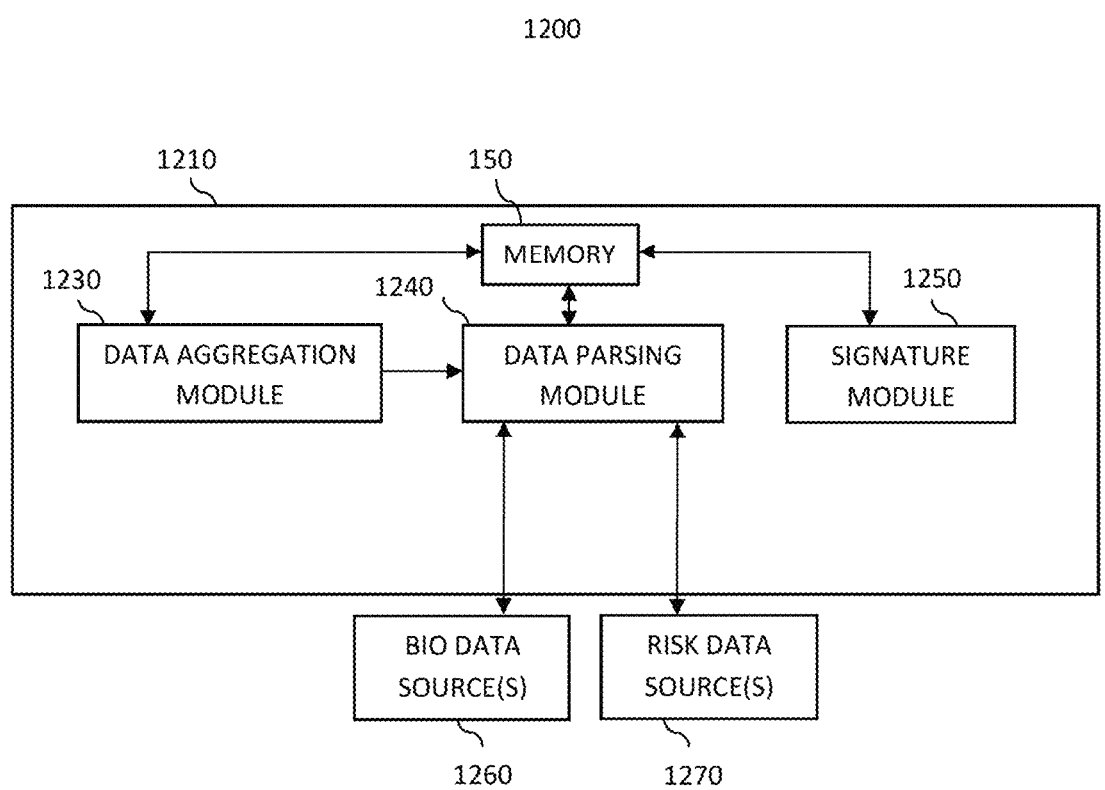
FIG. 12 is a block diagram illustrating a computer system to produce and compare risk signatures.

The method described in FIG. 11 may be embodied in a computer system as illustrated in FIG. 12. The computer-based system includes a computer 1210, which may be a computer server as described above.

The computer 1210 may include a data aggregation module 1230, a data parsing module 1240, a signature production module 1250, and a memory 150. The modules are not required to be on a single computer.

The data aggregation module 1230 may receive, at the computer, biographic information and risk information regarding the entity according to from biographic and risk data sources 1260 and 1270.

The data aggregation module 130 may receive, at the computer, risk information regarding the entity according to the personal information from biographic and risk data sources 1260 and 1270.

The system 1200 may also include a data parsing module 1240 to separate the risk information into discrete elements. A signature module 1250 produces a continuous character string from the parsed risk information. The signature module 1250 and/or a comparison module may also be used to compare the continuous character string to another continuous character string produced at a different time period.

Figure 13:
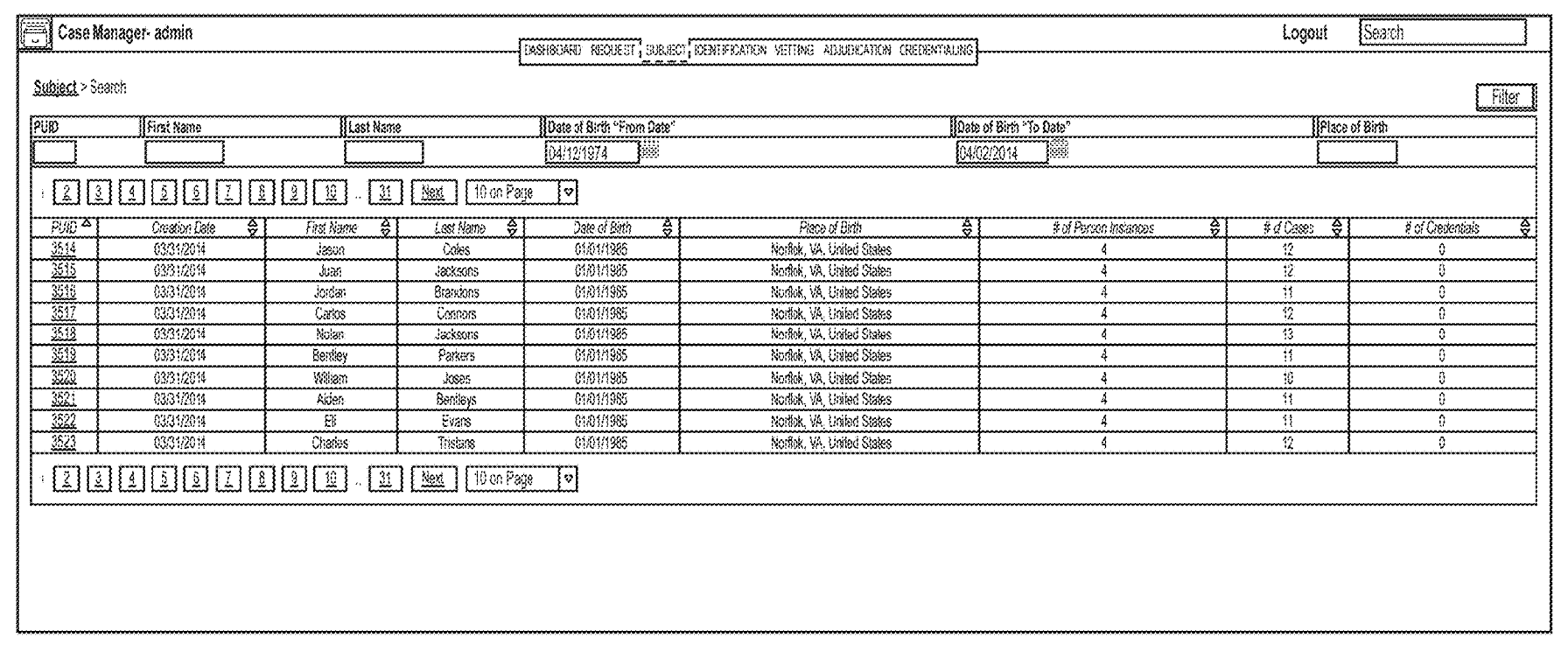
Figure 14:
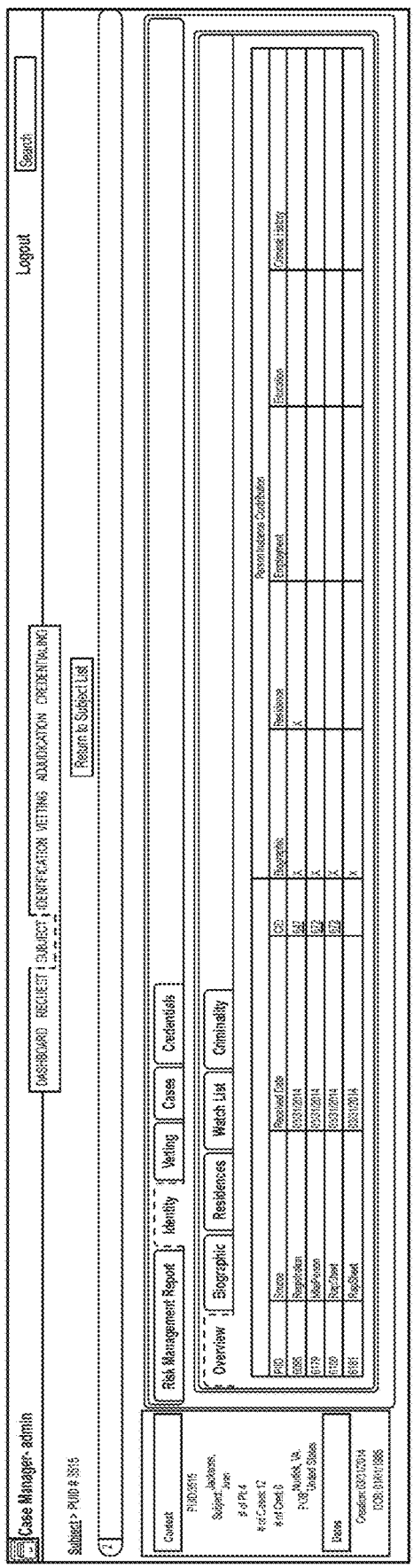

As shown in the screenshot of FIGS. 13-22, a reviewer, such as, for example, a case manager, can view a profile for a subject, such as a person, in order to perform a risk assessment. Referring to FIG. 13, the reviewer can begin the initial screening based on the name and date of birth of the subject. A personal unique identification (PUID), the number of instances of recorded data, number of cases and number of credentials is displayed for a selected subject. Each instance of recorded data has a "citation" for purposes of data attribution such that every unique identity fact can be traced back to the raw risk information, a unique identity, and to any related cases/decisions/credentials that were based upon it. As shown in FIG. 14, "Juan Jacksons" may be selected as the subject by the case manager. Information about the subject is provided according to the format of the Master Identity Hierarchy. A number of tabs about the subject may be viewed by the reviewer, including a risk management report, identity, vetting, cases and credentials. The reviewer can then select a sub-category, essentially drilling into the Master Identity Hierarchy to view information, such as, overview, biographic, residence, watchlist and criminality information.

In FIG. 14, the reviewer can select the overview tab to identify the records available for the subject. These include initial registration, a personal record and criminal records (rap sheets) that are linked to the subject.

Figure 15:
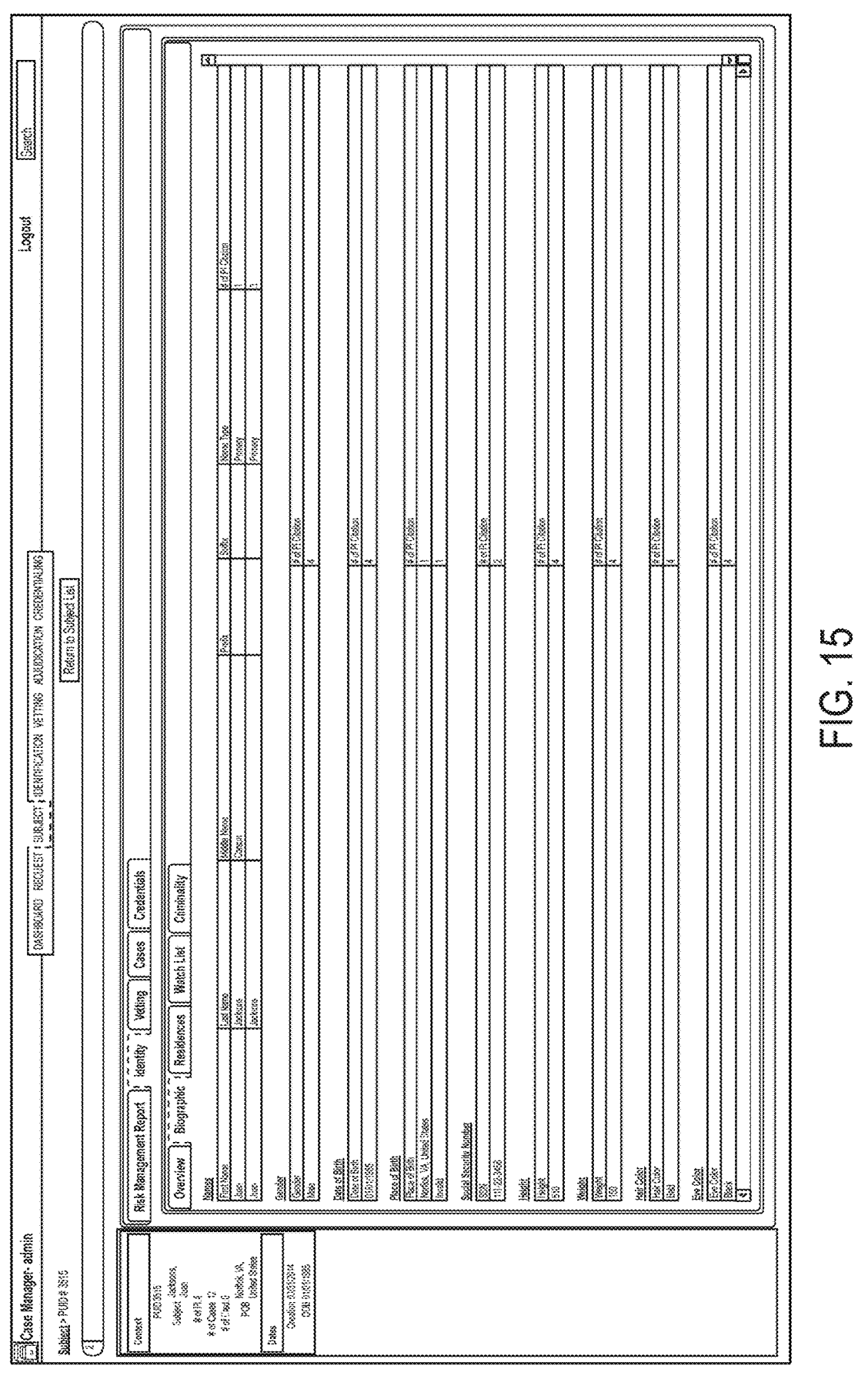

In FIG. 15, the reviewer may select the biographic information tab for the subject. In the example shown, the subject has four (4) instances of biographic records with one of the records including a middle name (Carson). Data for the subject can be displayed to the case manager, including gender, date of birth, place of birth, social security number, height, weight, hair color and eye color. Each identity fact has a citation so that it can be traced to raw risk information. For example, information from a specific rap sheet may be cited in Biographic, Criminality and Citizenship categories.

Figure 16:
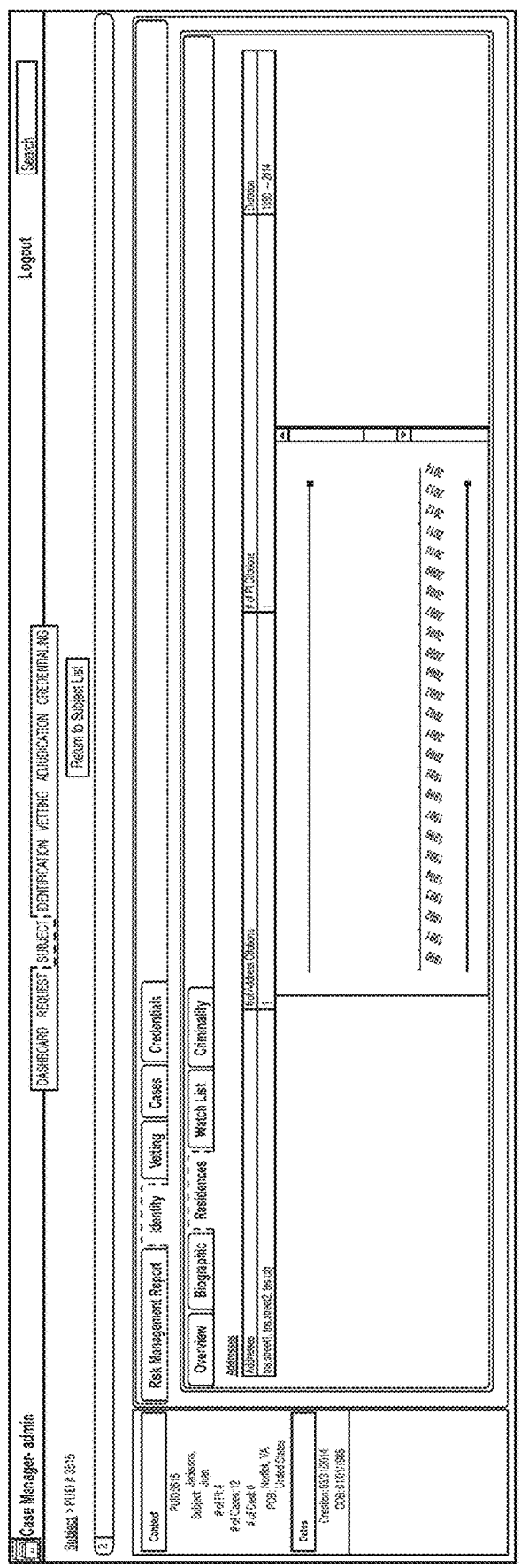

In FIG. 16, the reviewer may select the residence tab to identify street addresses for the subject along with dates that the subject lived at each address. The reviewer can move along a timeline to get an address for the subject at any given. The reviewer can also identify gaps in the recorded address based on any given time period.

Figure 17:
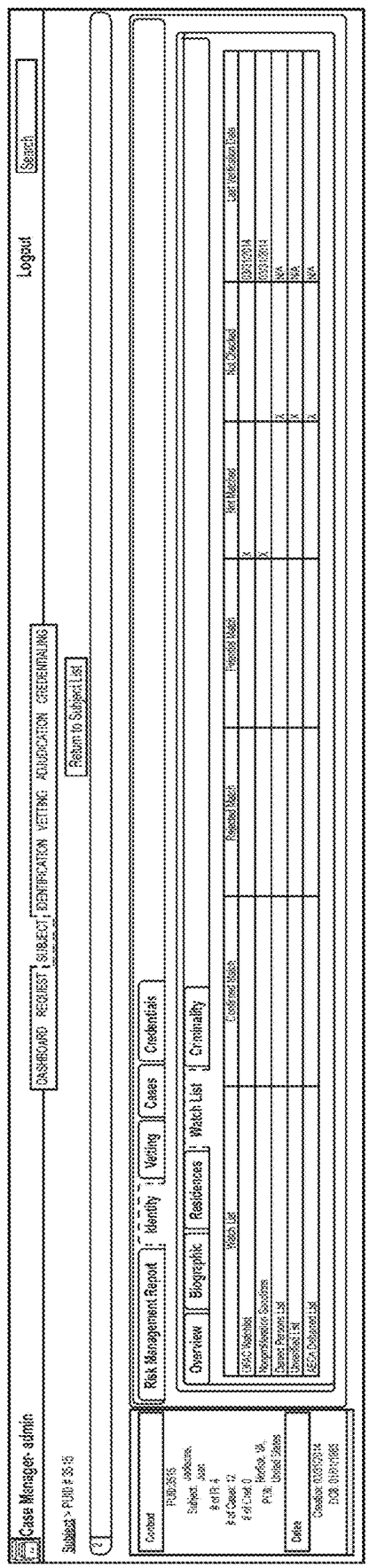

In FIG. 17, the case manager may select the watchlist tab to view watchlist information for the subject. Watchlist information may include lists relating to Office of Foreign Assets Control (OFAC), nonproliferation sanctions, denied persons, unverified entities, and Arms Export Control Act (AECA) debarment.

Figure 18:
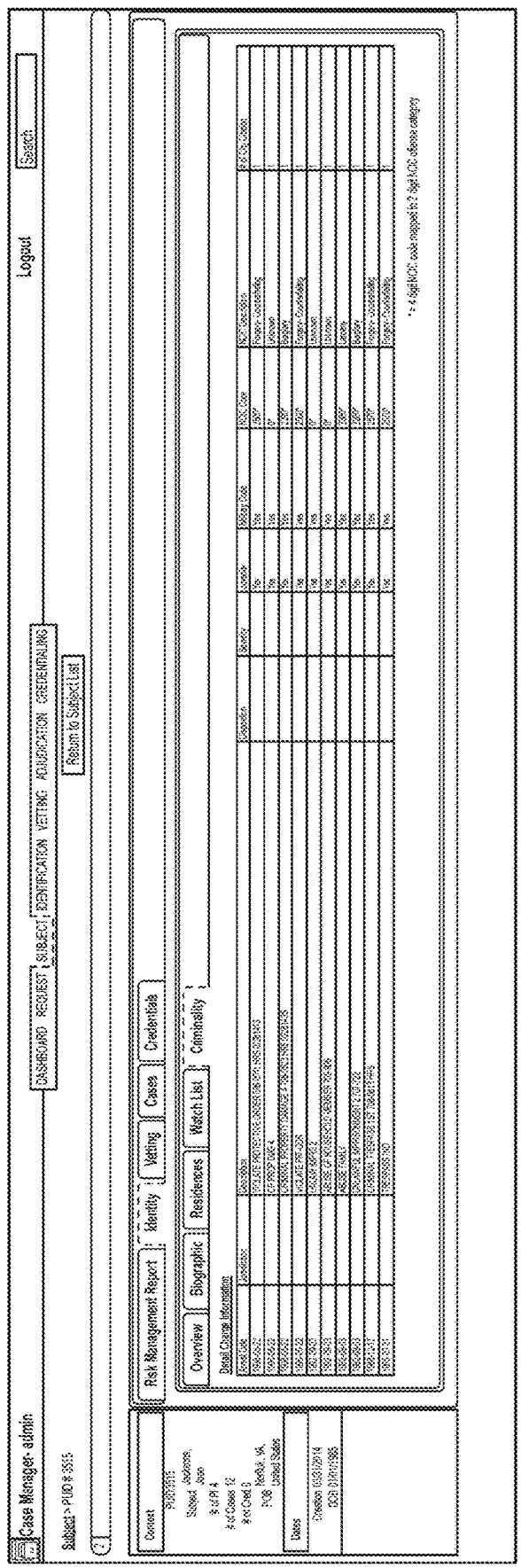

In FIG. 18, the case manager may access criminal record information by selection of the criminality tab. The criminal record information may include criminal history reports from multiple sources. In the example, ten (10) separate criminal charge records are associated with the subject, with multiple charges on some dates for a total of four different dates for listed offenses.

Figure 19:
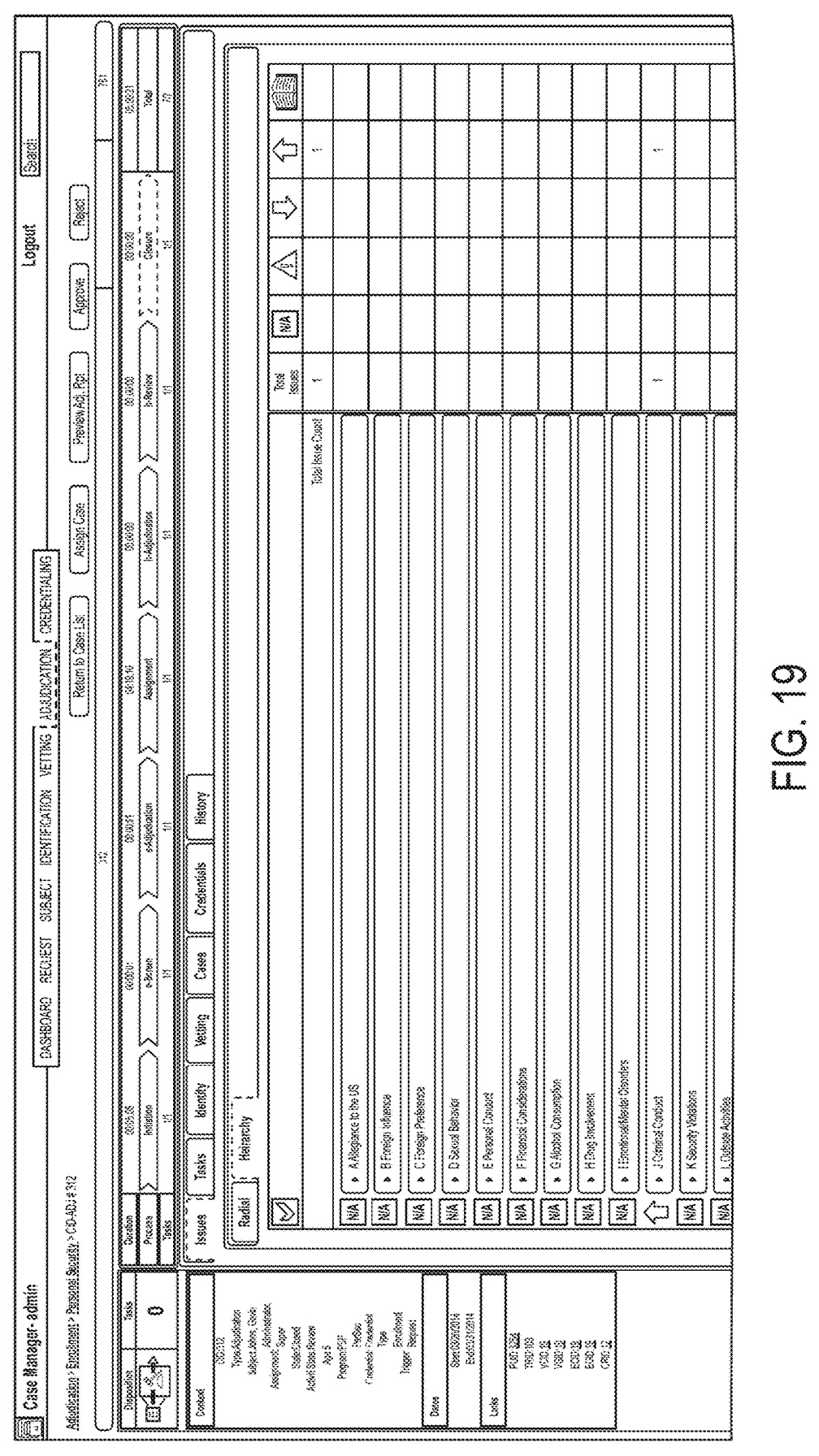

The screening manager has several options for visualizing the hierarchy view: expandable sections (FIGS. 19 & 20), the radial diagram (FIG. 21-24), horizontal hierarchy (link chart that spans left to right), and vertical hierarchy (link chart that spans top to bottom). As shown in FIG. 19, the case manager can review an adjudication process for a person. For example, the case manager may select a hierarchy view of issues related to the adjudication, including the following: Allegiance to the U.S.; Foreign Influence; Foreign Preference; Sexual Behavior; Personal Conduct; Financial Considerations; Alcohol Consumption; Drug Involvement; Emotional/Mental Disorders; Criminal Conduct; Security Violations and Outside Activities.

The hierarchy view provides the screening manager with status information about the adjudication, which can show the following steps: Initiation; e-Screen; e-Adjudication; Assignment; h-Adjudication; h-Review; and Closure. The duration of each step and the number of tasks in each step can also be displayed. The result of the adjudication is also displayed in red, yellow or green colors as rejected, unresolved issues or approved, respectively. For example, the unresolved category is represented by an exclamation point inside a triangle colored yellow. The approved category is represented by a green arrow with the tip pointed upward. The rejected category is represented by a red arrow with the tip pointed downward.

In FIG. 20, the case manager can open categories of issues to review specific disqualifying conditions. For example, the screening manager can review guidelines for (I) emotional/mental disorder issues that may include disqualifying conditions, such as, for example, (a) behavior that casts doubt on reliability, (b) mental health opinions, and (c) failure to follow medical treatment advice.

The total number of issues is displayed and the condition status can be displayed in colors of red, yellow, green or grey. Each of the issues listed as disqualifying conditions may be displayed as issue types that include not applicable, pending, disqualifying, mitigated or historical which are color coded as grey, yellow, red, green and light green, respectively.

In the illustration shown in FIG. 20, there are two issues for condition c for failure to follow medical treatment under guideline I for emotional/mental disorders. One of the issues is displayed as rejected under the rejected symbol and the issue is displayed as unresolved under the unresolved symbol. The condition status symbol is colored red.

There are also three issues identified as condition c which includes allegations or admissions of criminal conduct regardless of whether the person was formally charged, prosecuted or convicted under guideline J for allegations of criminal conduct. One incident is identified as not applicable under the N/A symbol, one incident is identified as approved under the green up-arrow symbol and one incident is identified as requiring further research under the "book" symbol. The overall condition status is identified as a green circle to indicate that the subject is approved. The other condition status circles are greyed out since no issue is present for those disqualifying conditions.

Figure 21:
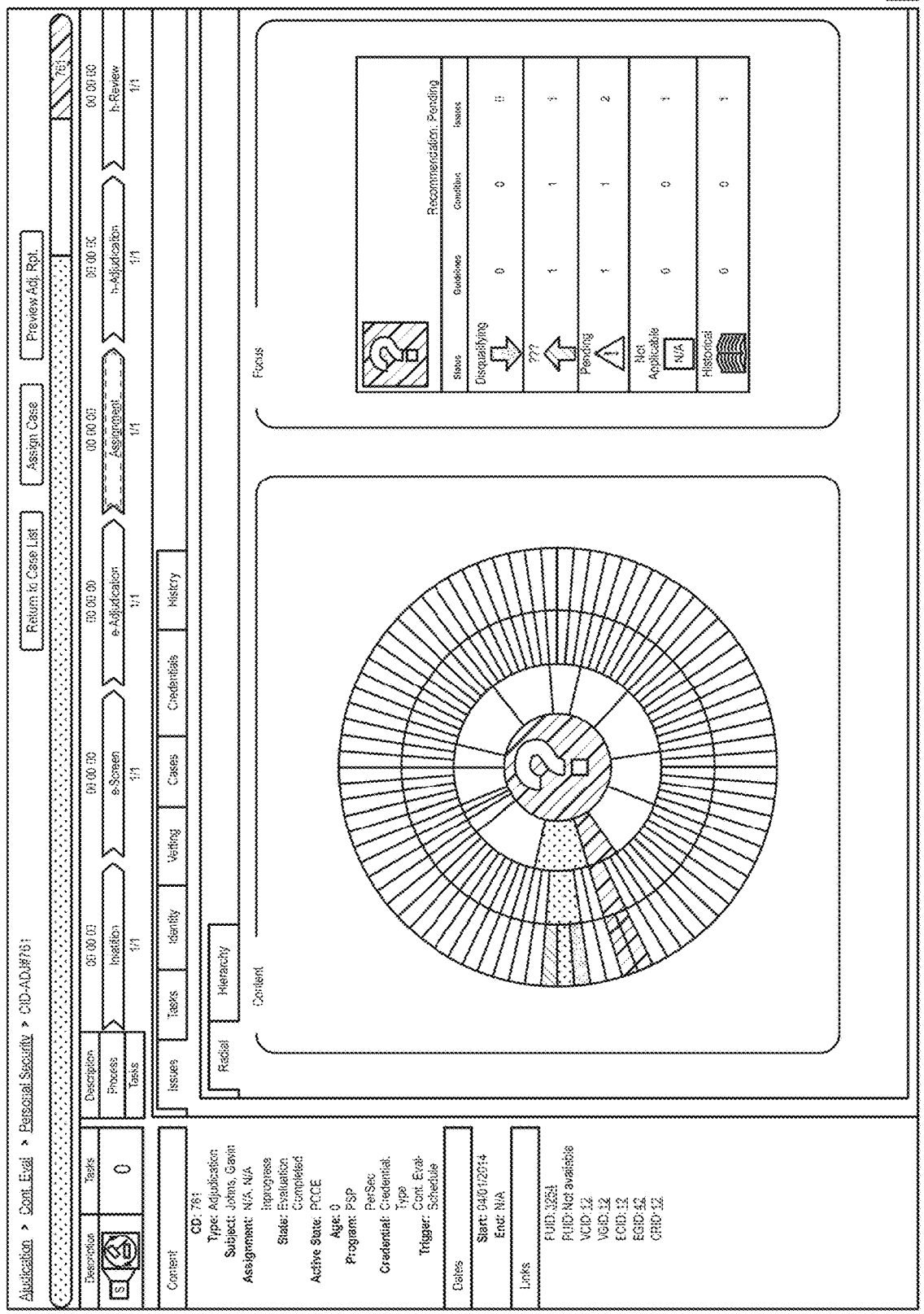

Referring to FIG. 21, the risk evaluation can be presented to the screening manager as a polar graph with a series of concentric circles. The illustrated graph includes four concentric circles with radial lines emanating from the center to produce a series of partial circular sectors.

As explained in more detail below, the center circle acts as a visual indicator of the overall risk evaluation results as unresolved, rejected or approved with a center that is yellow with a question mark, red with a large X mark, or green with a check mark, respectively. Thus, the operator gets an immediate sense of the case from the center circle and then can "drill down" to review specific issues. For reference to the drawings the colors red, green, light green, yellow and grey are represented by the symbols R, G, Lg, Y and Gr, respectively.

Figure 22:
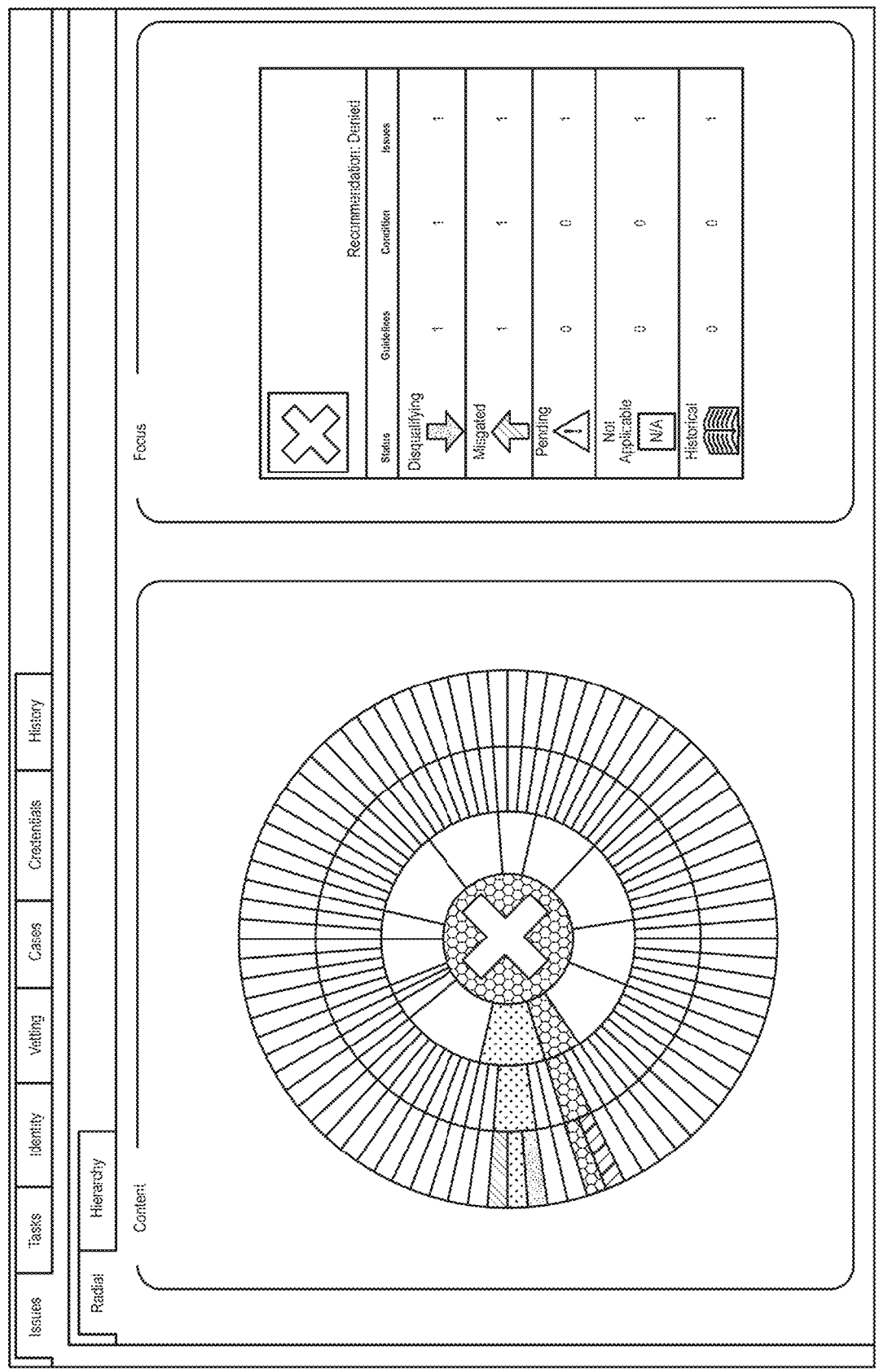
Figure 23:
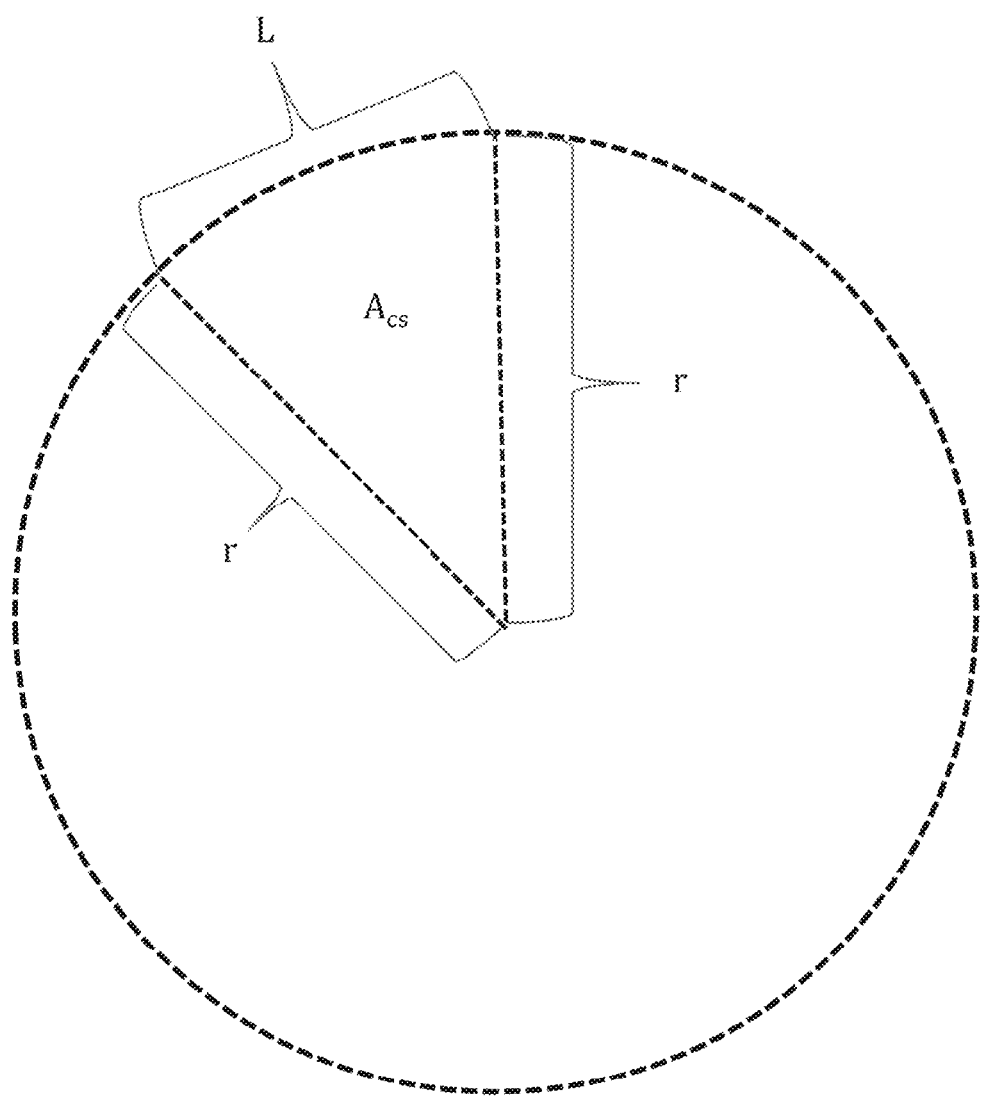
FIGS. 23-25 illustrate the components of a radial visualization diagram.
Figure 24:
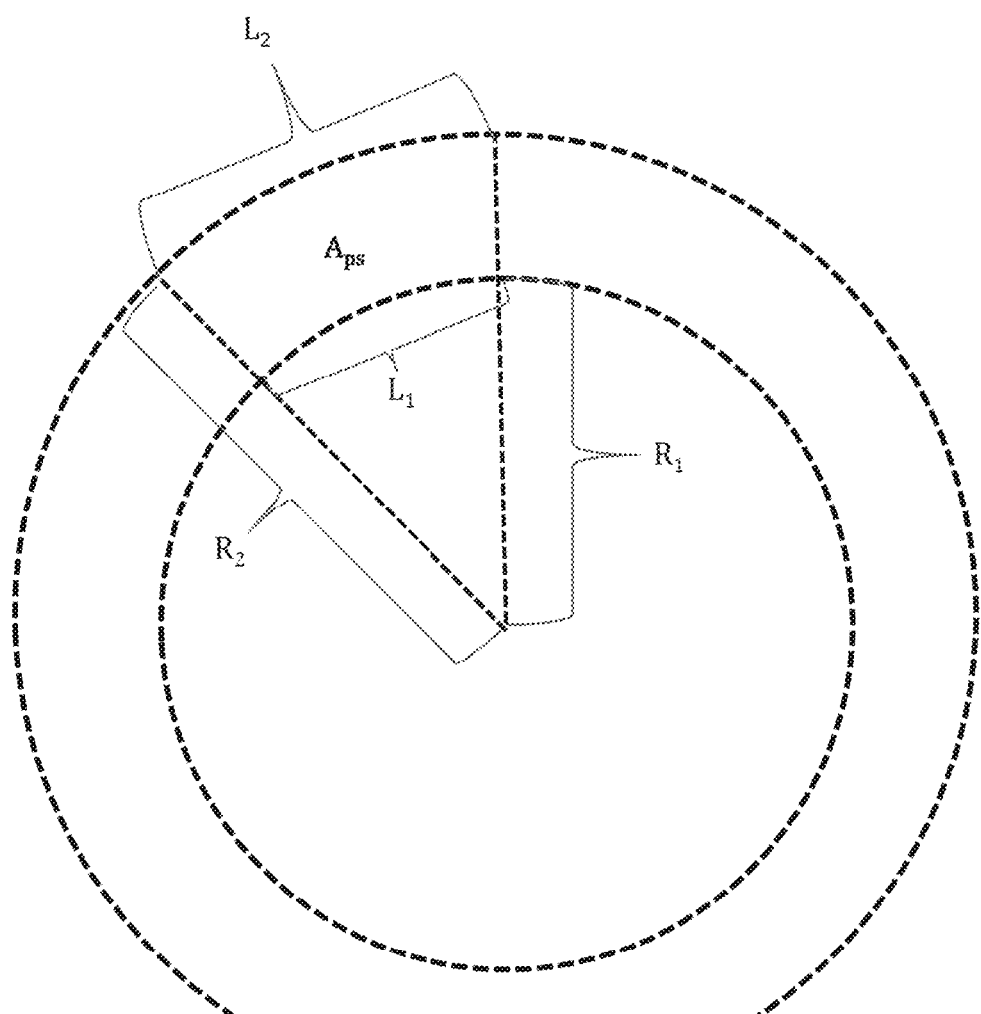
Figure 25:
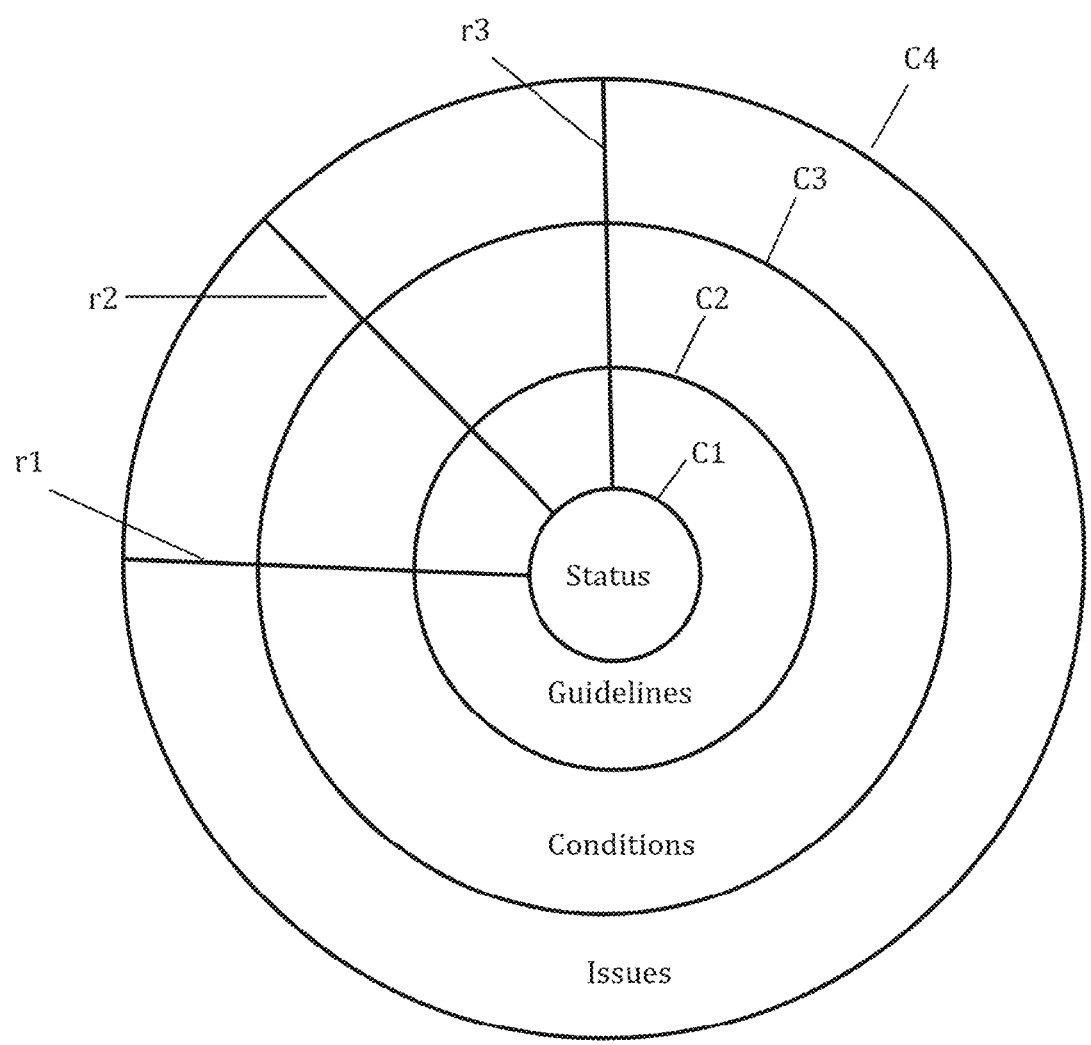

For ease of explanation, components of FIGS. 21 and 22 are broken down and shown in FIGS. 23-25. In FIG. 21, the circular sector or circle sector (symbol: c), is the portion of a circle enclosed by two radii and an arc. If theta is the central angle in radians and r is the radius of the circle, then the area of a circular sector can be obtained by multiplying the total area by the ratio of the arc length L to the total perimeter.

Referring to FIGS. 23 and 24, a partial circular sector (or partial annulus) $A_{ps}$ is the area of a circular sector $A_{cs}$ bounded by the inner arc $L_1$ and outer arc $L_2$ of concentric circles.

Referring to FIG. 25, the inside of the first circle C1 represents a status indicator. The circular sectors between circles C2 and C1 represent guidelines, the circular sectors between circles C3 and C2 represent conditions and the circular sectors between circles C4 and C3 represent issues. The position of the guidelines, conditions and sectors may also be in reverse order with guidelines on the outermost circular sectors.

Referring again to FIG. 21, the status indicator C1 or case roll-up can be colored or a symbol can be added to indicate status to the screening manager. For example, green indicates that the subject is approved, yellow indicates that a decision is pending and red indicates that the subject is rejected. In terms of symbols, an "X", "?" and " " can indicate rejected, pending and approved, respectively.

The status indicator represented by the inner or first circle (inside C1 of FIG. 25) shows the screening manager that the case is currently pending or unresolved with yellow shading in the inner ring and a "?" symbol. In the next set of circular sectors between the first ring and the second ring (between C1 and C2 of FIG. 25), two guidelines that are relevant to the subject are represented by circular sectors that are colored green G and yellow Y. As a subset of the guideline (conditions), there is circular sector between the second ring and the third ring (between C2 and C3 of FIG. 25) that is green G and as a subset of the yellow guideline there is a yellow Y sector representing an unresolved status of a condition.

On the outermost set of circular sectors (between C3 and C4 of FIG. 25) there are light green, green G and yellow circular sectors displayed as issues relevant to the green colored guideline. Yellow circular sectors Y are displayed as issues related to the yellow colored guideline.

FIG. 22 shows an example of a subject that has been denied a credential under particular risk assessment criteria. The status indicator represented by the inner or first circle (inside C1 of FIG. 25) shows the screening manager that the subject has been denied a credential by virtue of a red color R in the inner ring and an "X" symbol.

In the next set of circular sectors between the first ring and the second ring (between C1 and C2 of FIG. 25), two guidelines that are relevant to the subject are represented by circular sectors that are colored green G and red Y. As a subset of the guideline, there is circular sector between the second ring and the third ring (between C2 and C3 of FIG. 25) that is green G and as a subset of the red colored guideline there is a colored circular sector R representing a rejected condition status.

On the outermost set of circular sectors (between C3 and C4 of FIG. 25) there are light green Lg, green G and grey Gr circular sectors displayed as issues relevant to the green colored guideline. Yellow Y and red R circular sectors are displayed as issues related to the red colored guideline.

Figure 27A:
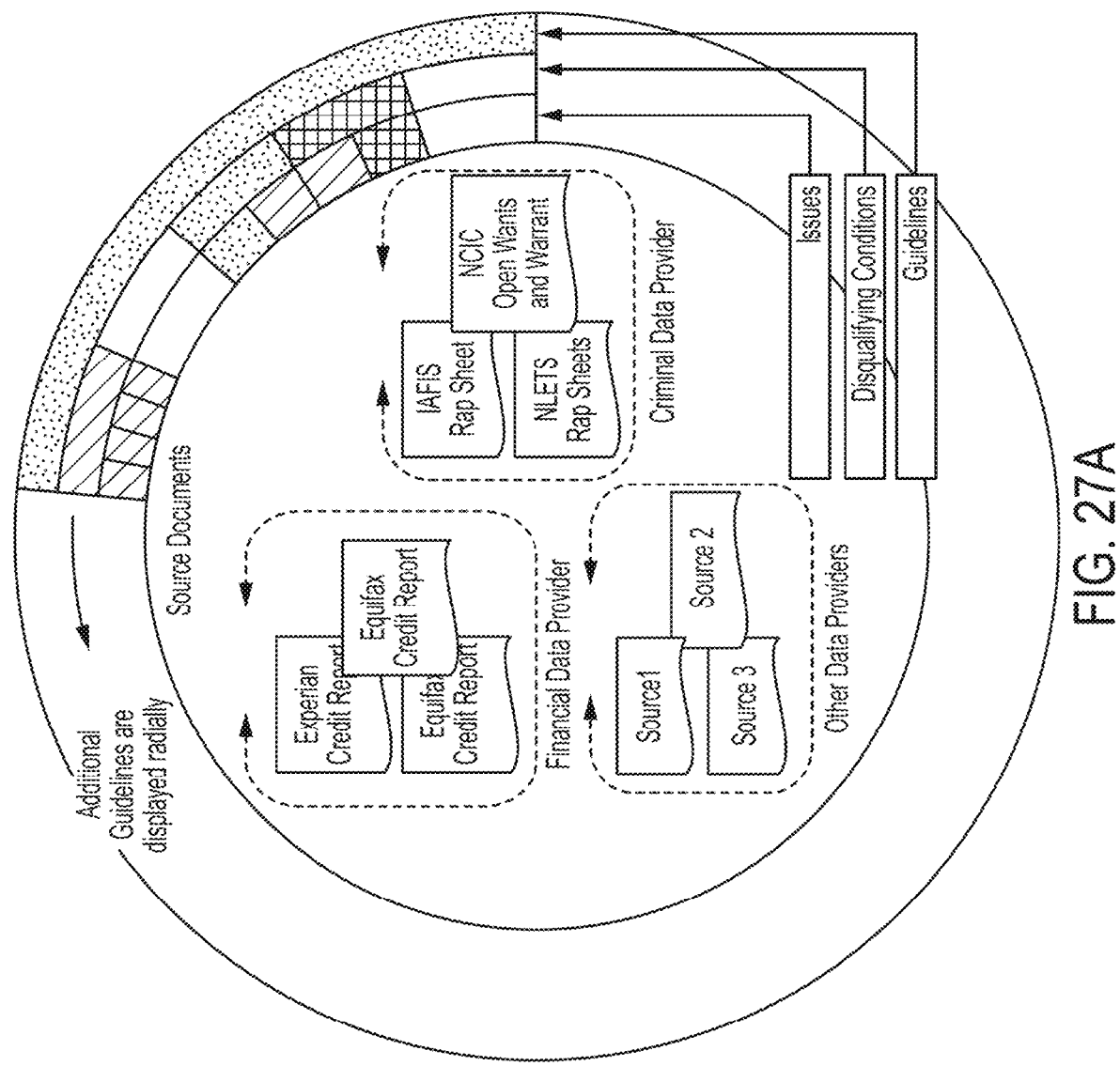
FIGS. 27A and 27B illustrate visualization of source documents.
Figure 27B:
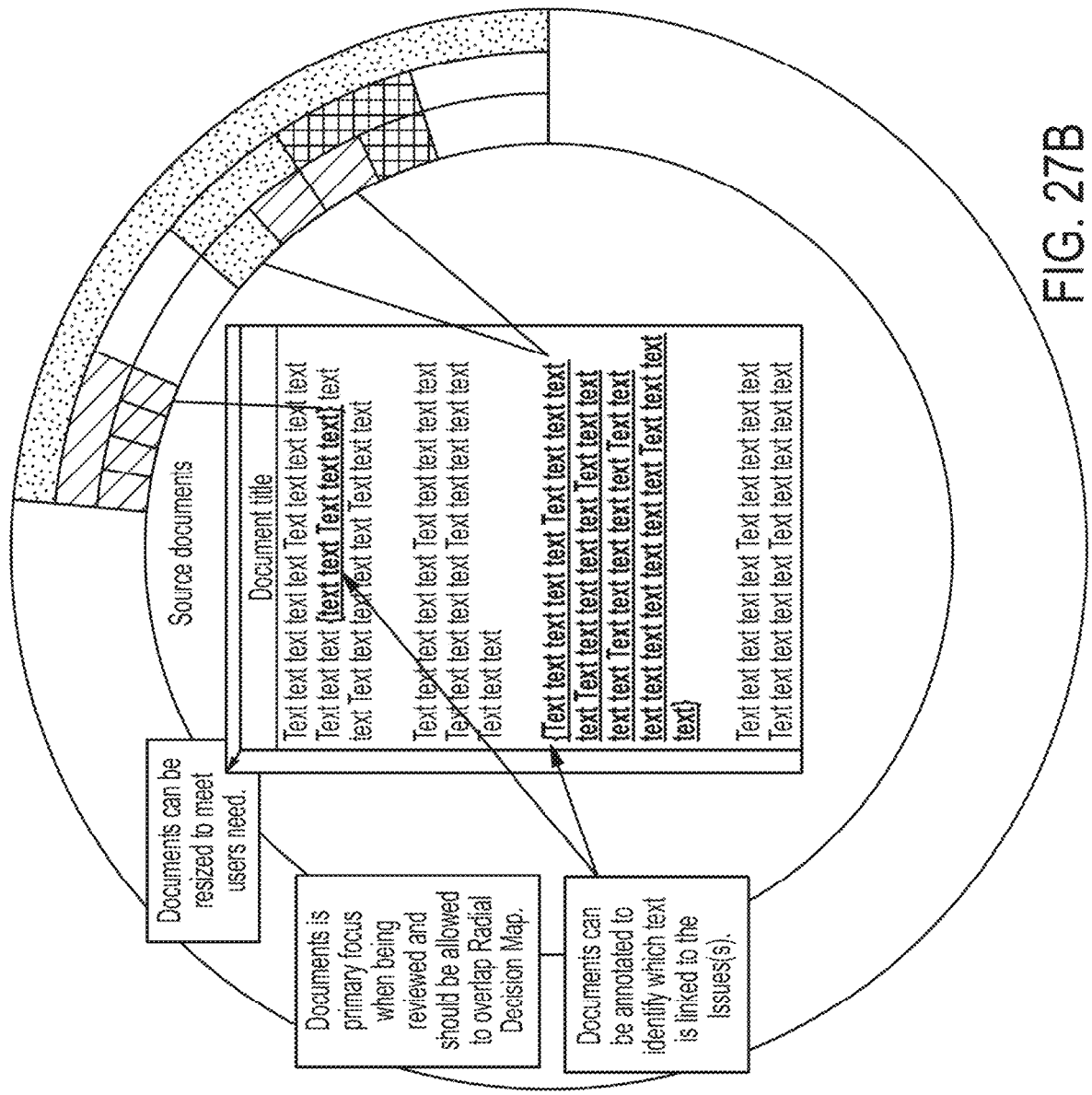

Referring to FIGS. 27A and 27B, the screening manager can move a pointer or mouse over the colored sectors to display detailed information or a drop down menu associated with the particular guideline, condition or issue which are represented by three sets of concentric rings. The outer ring represents guidelines, the middle ring represents conditions (disqualifying conditions) and the inner ring represents issues associated with the guidelines. The colors red, yellow and green are represented by dotted, cross hatched and diagonal lines, respectively.

The screening manager can place the pointer on the guideline colored red to display that the sector represents guidelines concerning various aspects of criminal conduct. The screening manager can move in toward the middle to look at any disqualifying conditions. The screening manager can then move to the inner most radial sectors to look at issues or events of criminal conduct. The screening manager can select the radial sector to bring up a source document from a criminal data provider. For example, the source documents about the entity may be provided by the National Crime Information Center (NCIC), the National Law Enforcement Telecommunications System (NLETS), or the Integrated Automated Fingerprint Identification System (IAFIS). As another feature, when the screening manager may select an issue to make a text box appear with more detailed information about the entity and several links to original source documents.

Figure 30A:
Figure 30B:
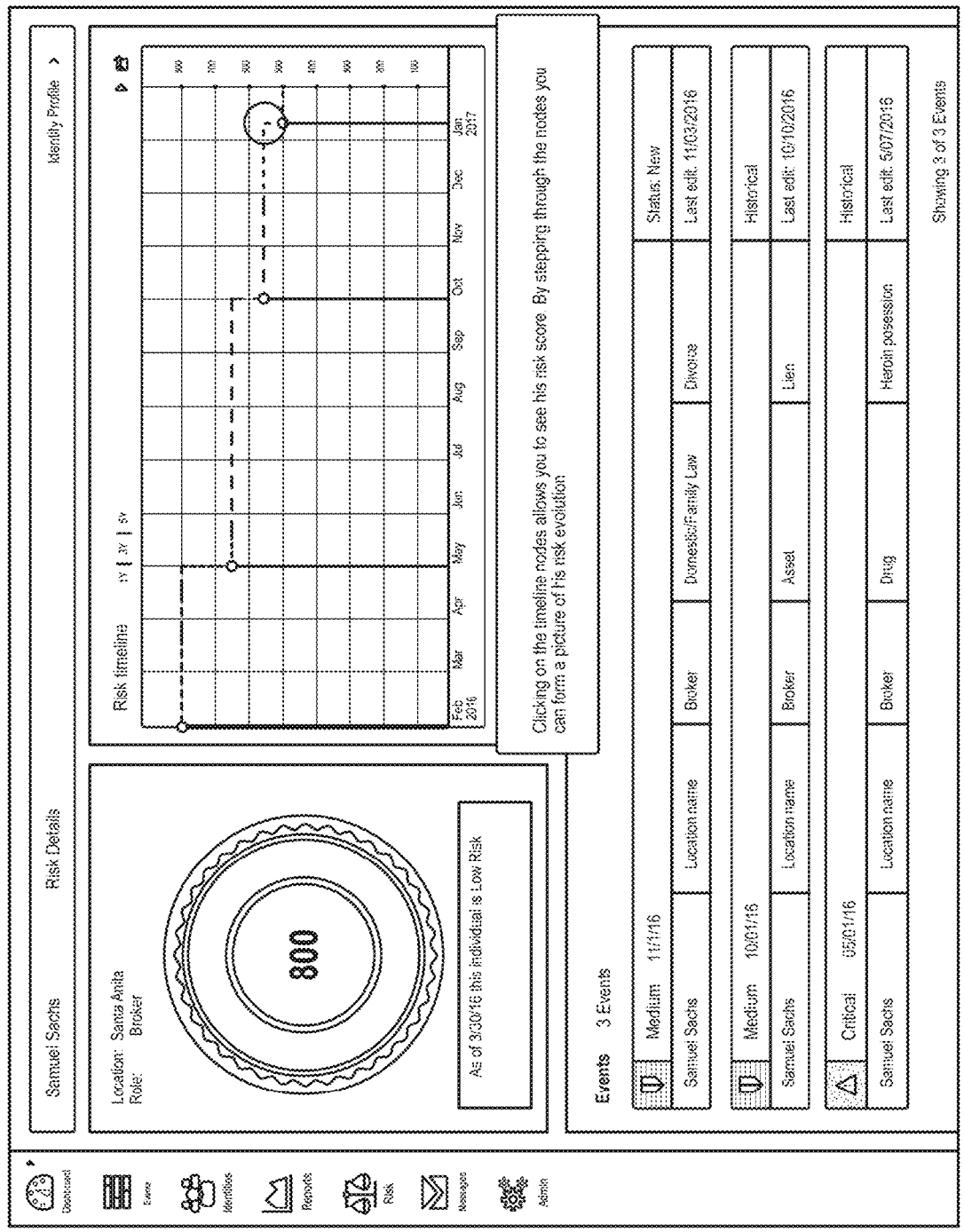
Figure 30C:
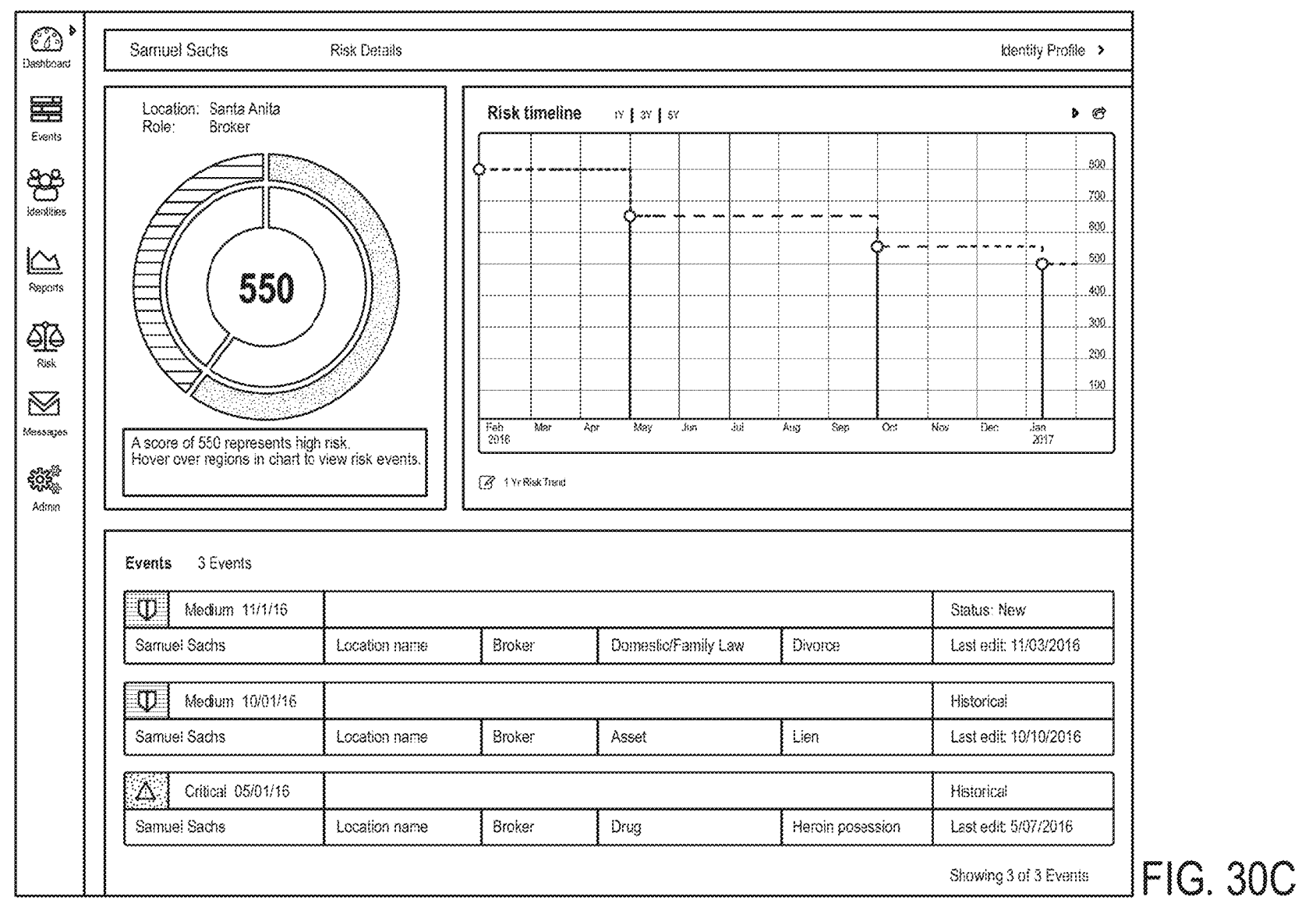
Figure 30D:
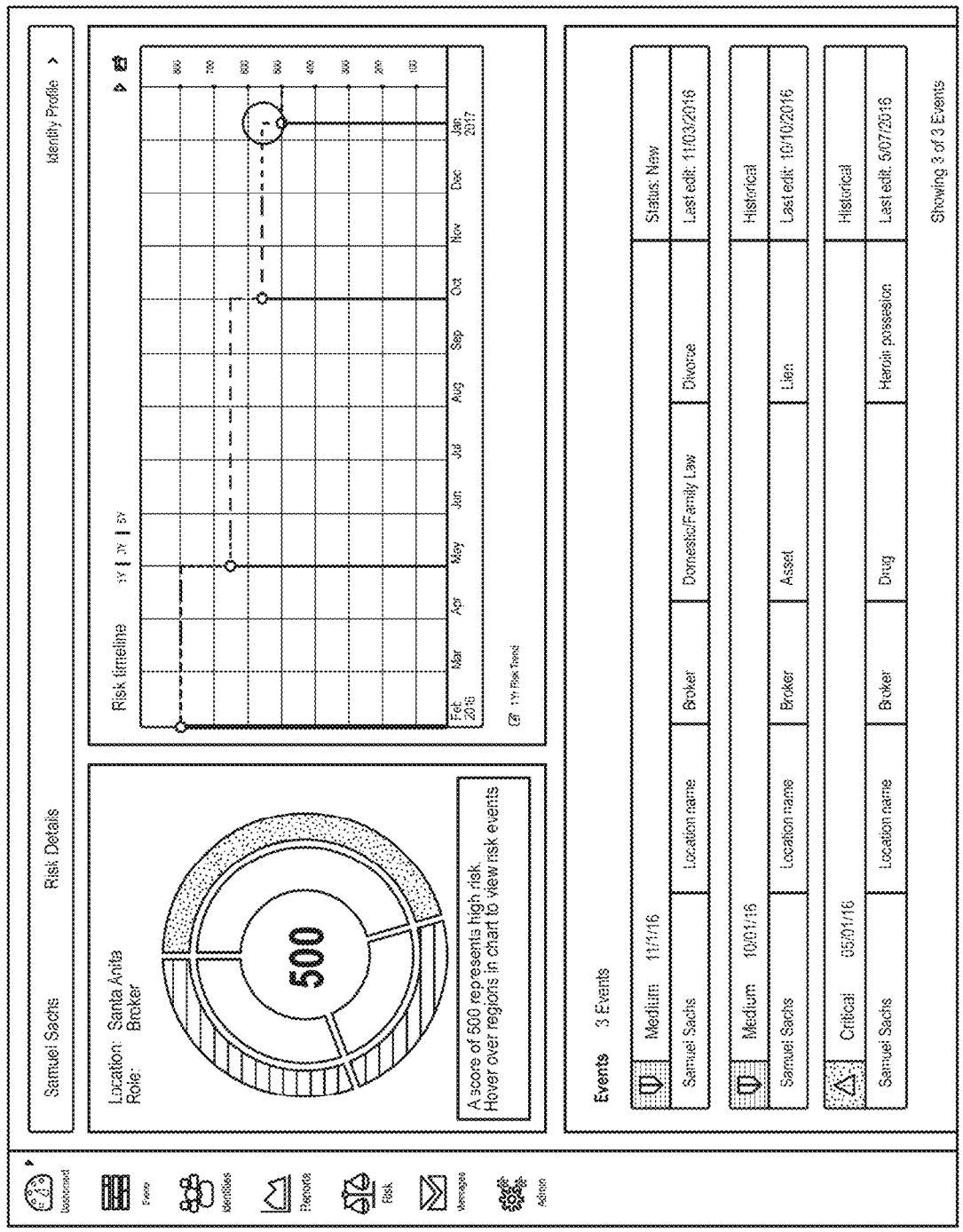
Figure 30E:
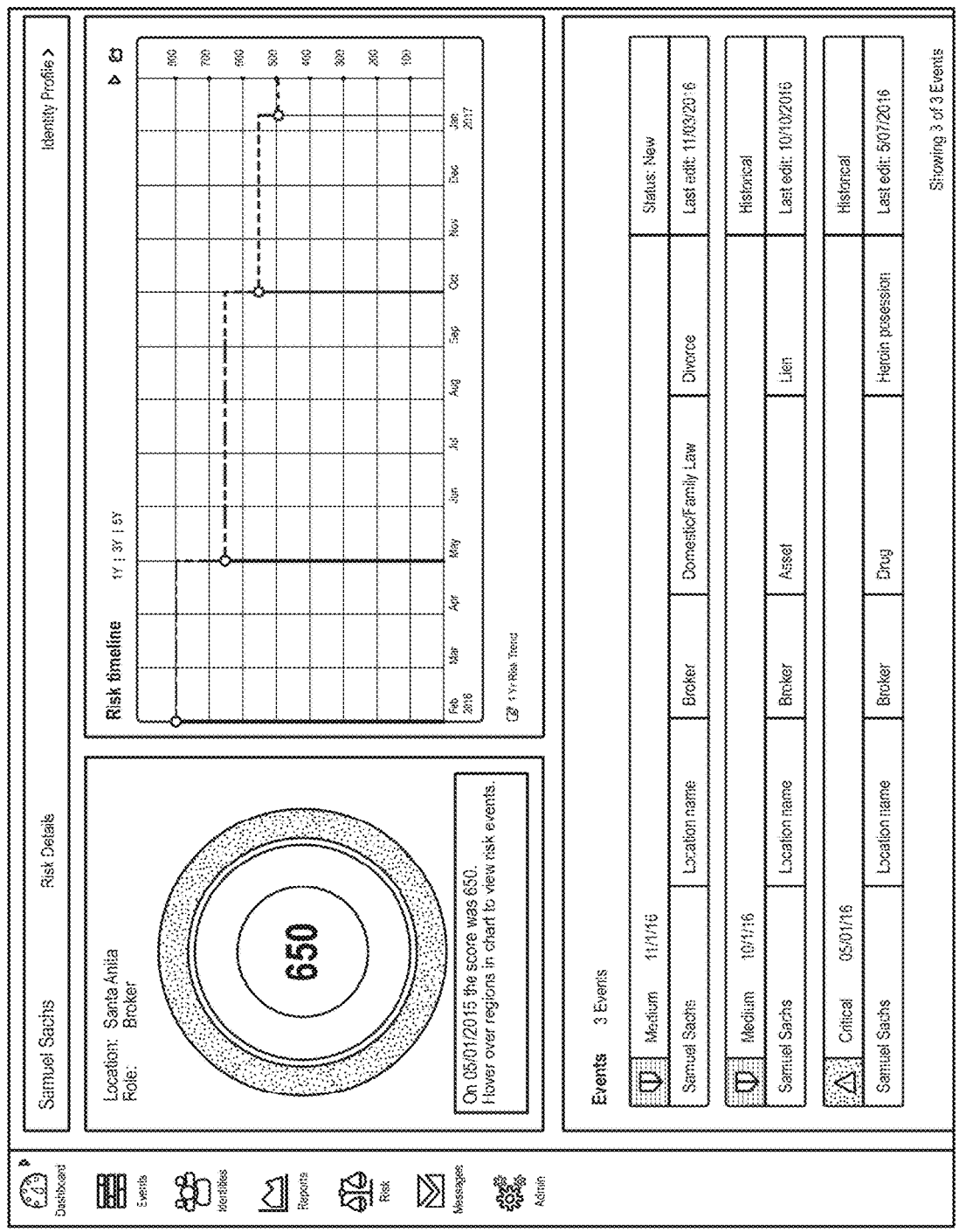

The manager can click the "Hierachy" tab to exit the radial graph and display the information in a hierarchy mode which displays information in a list format such as that shown in FIG. 30A. In another embodiment, the manager has a "drill in" capability such that she can select a specific radial arc to essentially update the image of the radial diagram to the specific category/disqualifying condition selected. To go back up a level, the user can select the center node.

Figure 28:
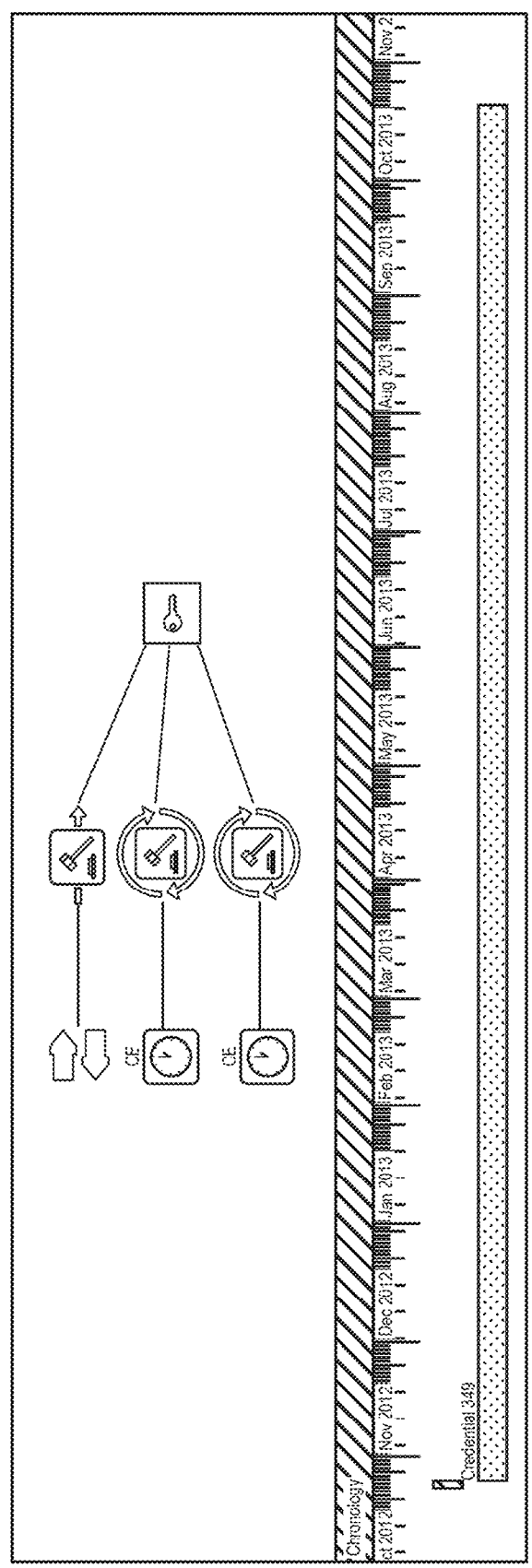

Referring to FIG. 28, a timeline may be illustrated with a chronology of risk evaluation. As the screening manager moves along the timeline he can view the risk scores provided through continuous evaluations.

Figure 29A:
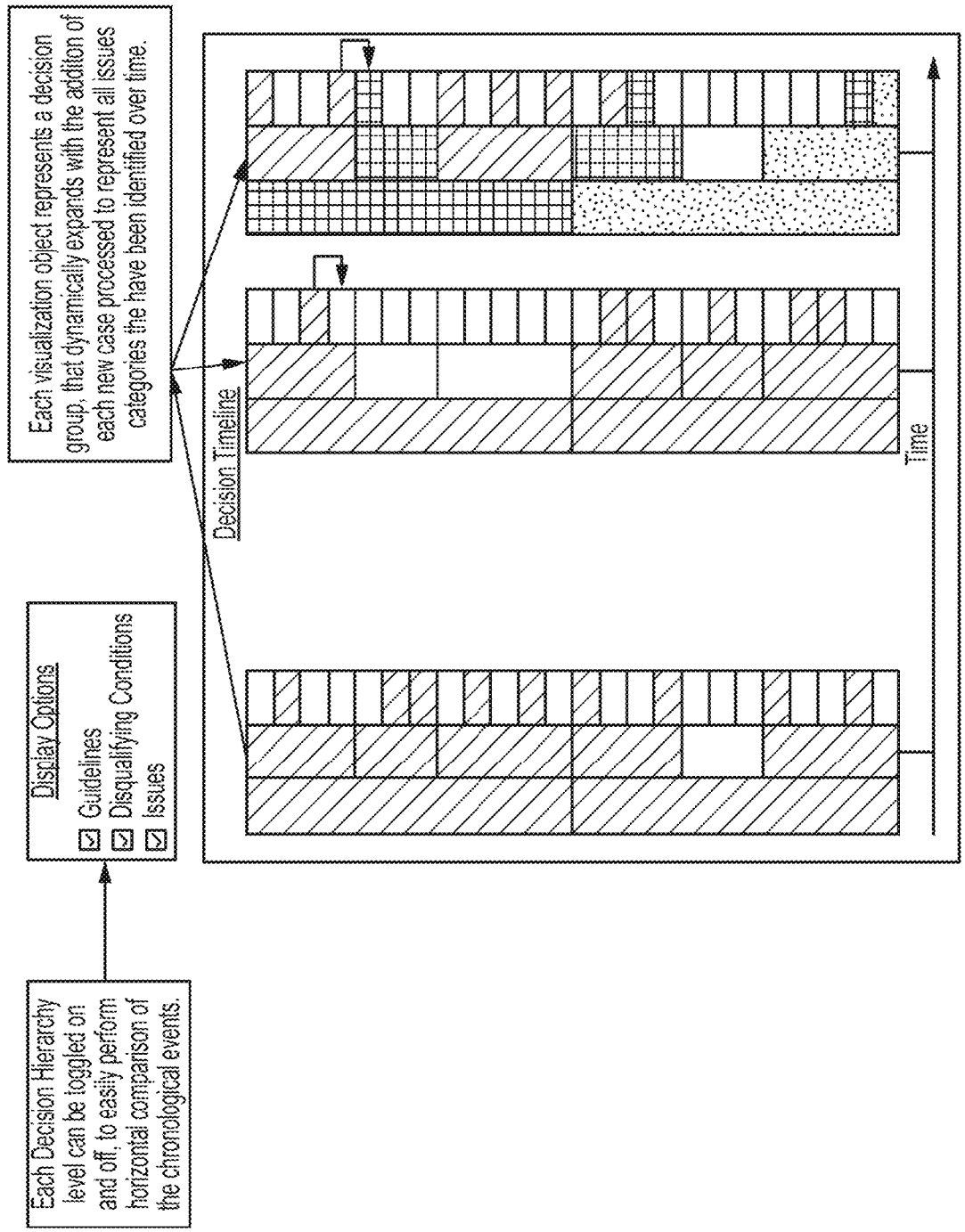
Figure 29B:
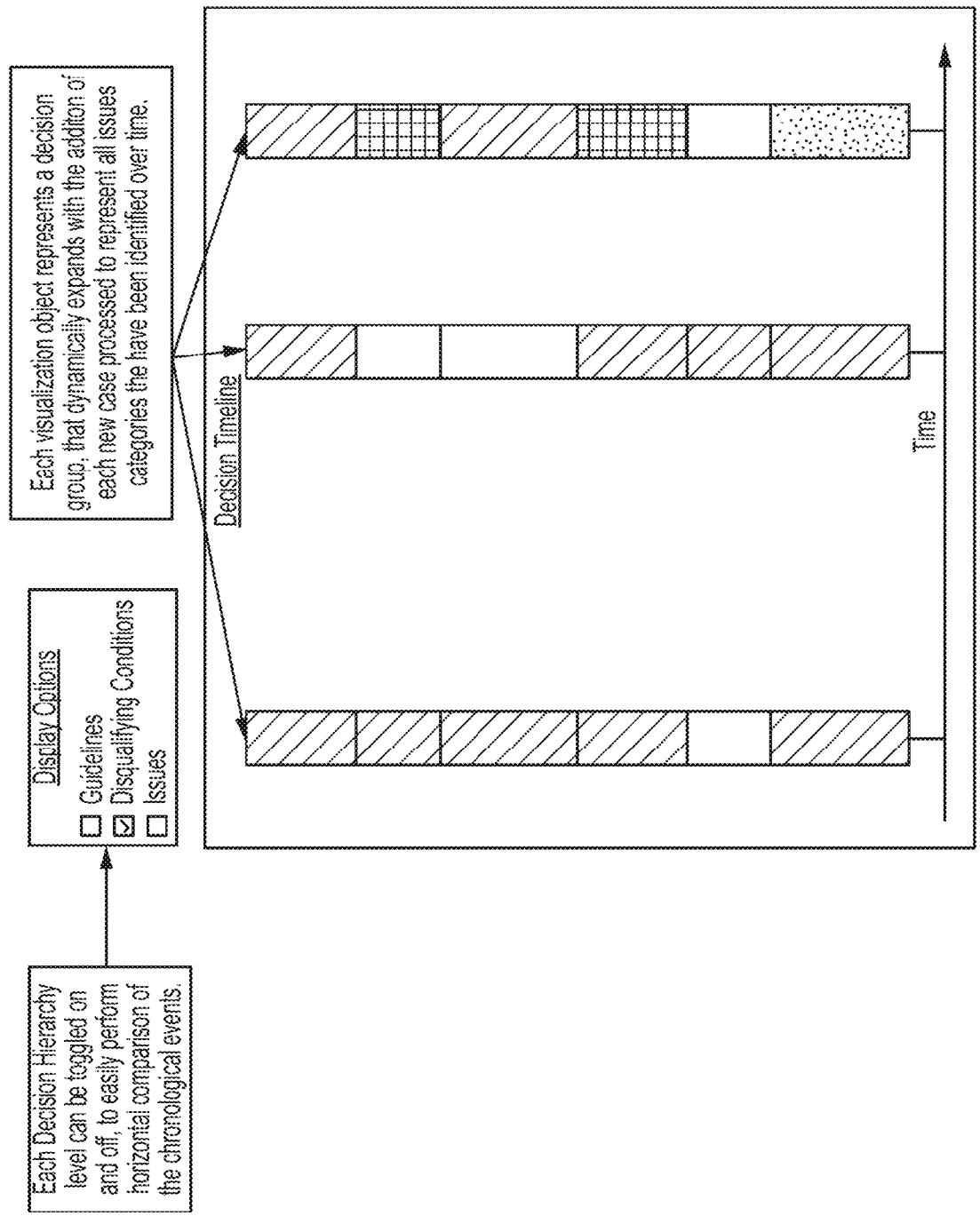

Referring to FIGS. 29A and 29B, a timeline is illustrated with three risk evaluations or decision groups each representing a particular time period. The decision groups are represented by vertical columns with the first vertical column (left side) including vertical segments representing each of the guidelines, the second vertical column (middle) including vertical segments representing each disqualifying condition and the third vertical column (right side) including vertical segments representing each of the issues.

The screening manager has the option to display one or more of the vertical columns. For example, in FIG. 29B the display only shows single vertical columns representing disqualifying conditions during each evaluation time period.

FIGS. 30A-30E illustrate a risk "dashboard" and risk evaluations for a particular subject. FIG. 30A shows a hierarchical view of the subject's complete profile including basic biographic information such as name, photograph, organization name, location, job role, department, business unit and division. It also includes menus for information associated with licenses, education, active events, and historical events. Current risk rating for the subject is also displayed. The dashboard allows the screening manager to access reports and other information about the subject.

FIGS. 30B-30E illustrate a risk timeline with risk level on the Y axis and a timeline on the X axis. The risk level includes a numerical risk score from 800 to 0 with 800 being the lowest risk and 0 being the highest risk. Nodes are displayed on the risk timeline that illustrate the numerical risk level at a particular time period. For example, the nodes illustrate risk levels of 800, 650, 550, and 500 on February 2016, May 2016, October 2016, and January 2017, respectively. A list of risk events is also provided on display under categories of domestic, financial and criminal records.

The screening manager can select one of the nodes to illustrate a detailed evaluation chart. For example, selecting the node on February 2016, the risk evaluation for that date appears next to the timeline in concentric circles with the risk score of 800 at the center. The outer ring represents risk categories and the inner ring represents risk events associated with each category. Selecting the node for October 2016 illustrates the risk evaluation on that date with the risk score of 550 at the center. Selecting the nodes of May 2016 and January 2017 illustrate the risk evaluations for those dates with risk scores of 650 and 500 at the centers, respectively.

Figure 31A:
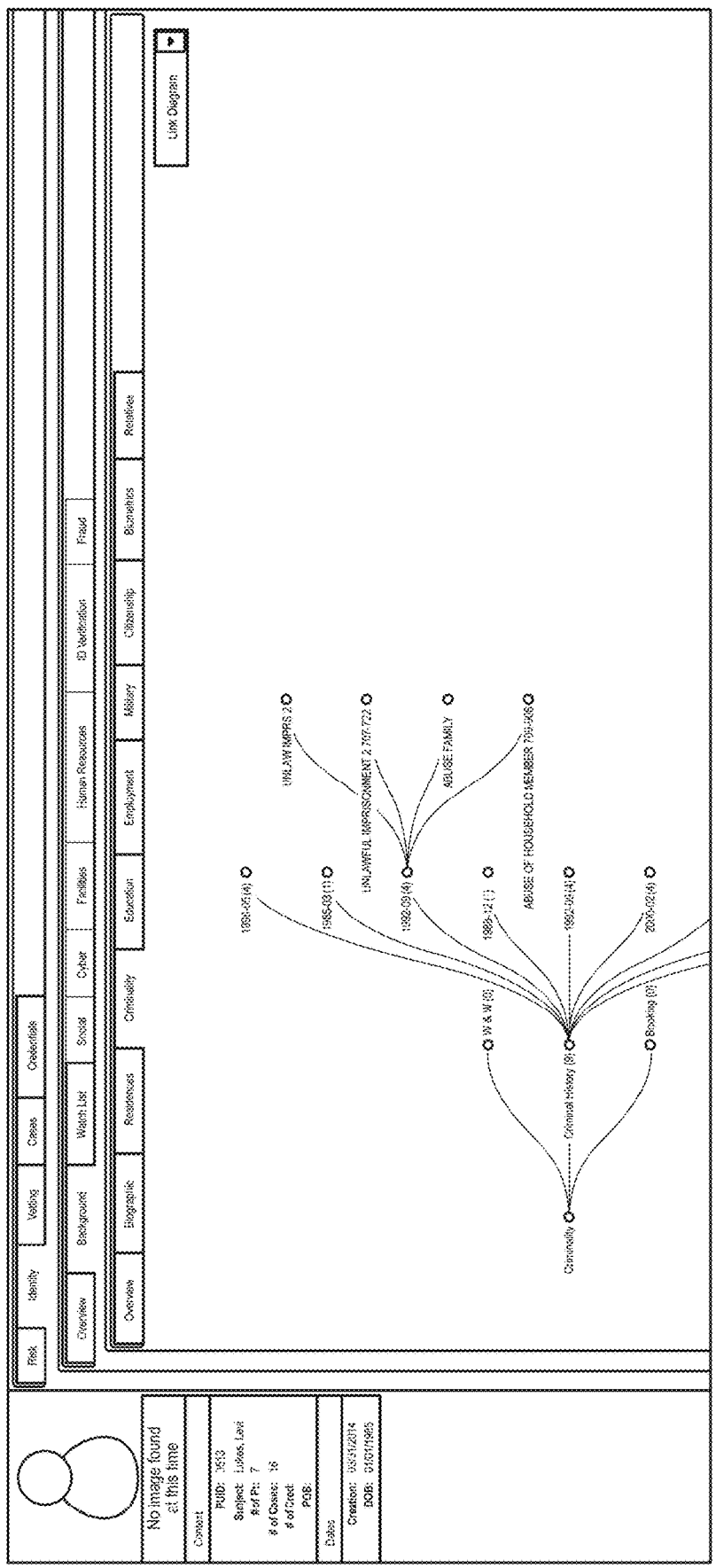
FIGS. 31A-31B illustrate risk assessment visualizations with link and chord diagrams.
Figure 31B:
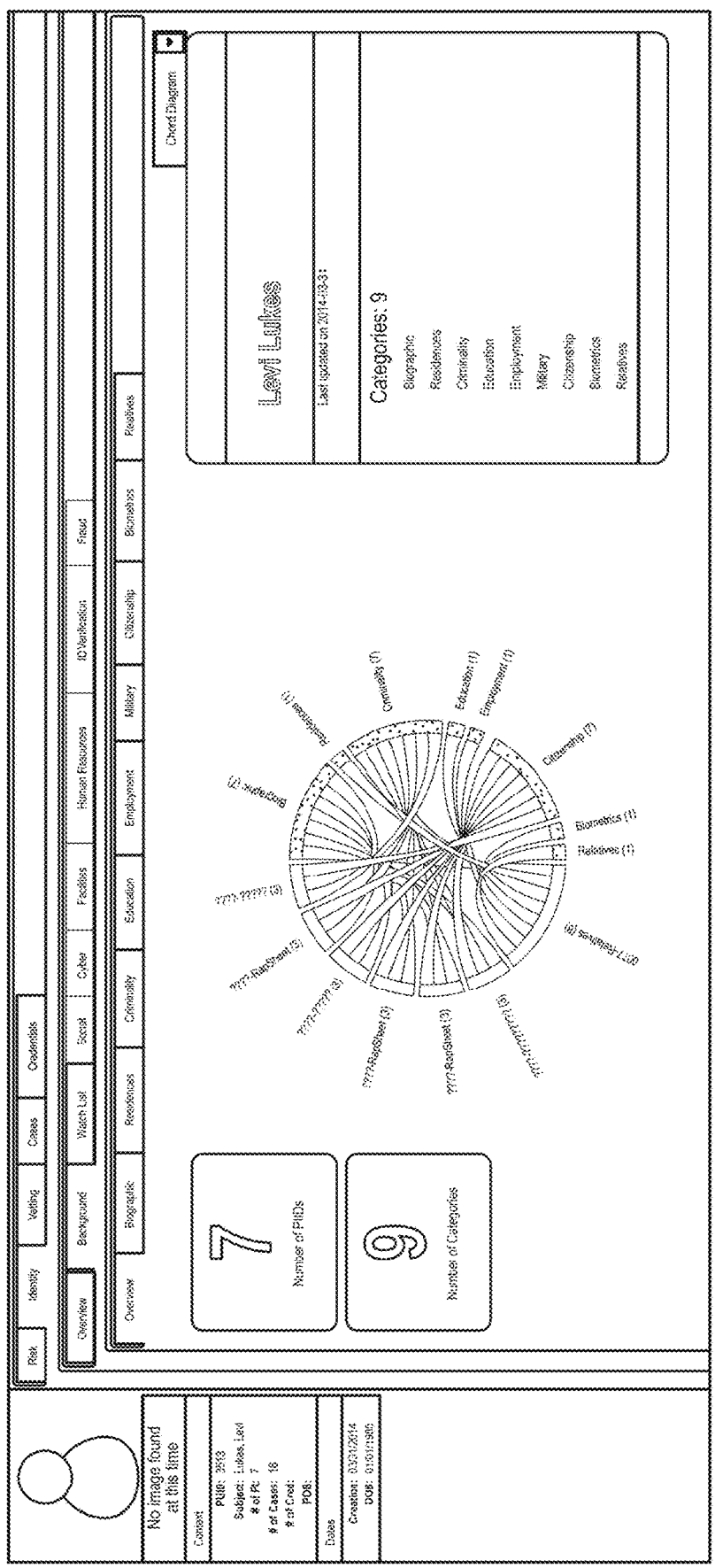

Referring to FIGS. 31A and 31B, risk data may also be visualized in link or chord diagrams. FIG. 31A illustrates a link diagram for criminal information. Criminality data is linked to categories of Wants & Warrants, Criminal History and Booking. The Criminal History is liked to nine criminal records or events. The screening manager can select the node for each of these records which are identified by dates. For the event identified in September 1992, the subject was charged with four counts that are linked to the date for that event. Selecting any of these nodes also displays additional information about the specific criminal count.

FIG. 31B illustrates a chord diagram with nine categories of information for a subject, including biographic, residences, criminality, education, employment, military, citizenship, biometrics and relatives. The diagram shows the records or events as being linked to more than one category. For example, a record for a related person may be linked to categories of residence and relatives and a rap sheet may be linked to categories of criminality and citizenship.

Unless defined otherwise, all technical terms used herein have the same meaning as commonly understood by one of ordinary skill in the art to which this invention belongs. Any methods and materials similar or equivalent to those described herein also can be used in the practice or testing of the present disclosure.

It must be noted that as used herein and in the appended claims, the singular forms "a", "and", and "the" include plural references unless the context clearly dictates otherwise.

While the present disclosure has been described with reference to the specific embodiments thereof, it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the present disclosure. All such modifications are intended to be within the scope of the claims appended hereto.

The invention claimed is:

1. A computer-implemented method for interactive visualization of a risk assessment for an entity on a graphical user interface of a computer system, the method comprising:
   receiving, by the computer system, unstructured risk data associated with the entity from one or more source;
   parsing, by the computer system, the unstructured risk data to produce one or more risk information element during a time period;
   combining, by the computer system, each risk information element that comprises a single event or issue;
   categorizing, by the computer system, each event or issue by a class or category;
   generating, by a computer processor, a risk assessment for the entity from each one or more classified or categorized event or issue for each time period; and
   displaying, on the graphical user interface,
      a risk assessment for each time period on a risk timeline with a risk level on a first axis and a timeline on a second axis, wherein each risk assessment for the time period is represented as a node having a risk score on the risk timeline, and
      a risk report that includes detailed risk information for one time period, wherein displaying the risk report comprises displaying concentric circles with a first ring that represents one or more category or class and a second ring that represents an issue or event related to the category or class.

2. The method of claim 1, wherein displaying the concentric circles with a first ring and a second ring comprise displaying the first ring as an outer ring and the second ring as an inner ring.

3. The method of claim 1, wherein displaying the concentric circles with the first ring and the second ring further comprises displaying a total risk score in a circle inside the concentric circles.

4. The method of claim 1, further comprising:
   receiving input, through the graphical user interface, from a user of the graphical user interface, in response to the displaying of the risk visualization on the graphical user interface, the input corresponding to a cursor or pointer being positioned by the user of the graphical user interface over a circular sector of the first, second or third set of circular sectors of the risk visualization displayed on the graphical user interface; and
   in response to the input received through the graphical user interface from the user of the graphical user interface, displaying one or more source document, data source, or list of sources of information related to the particular class or category, policy or guideline, and/or event or issue.

5. The method of claim 1, wherein displaying the risk report comprises displaying a chronological listing of each event or issue for the time period that includes an entity name, a category or class, a sub-category or sub-class, a record date and a risk severity descriptor.

6. A computer-implemented method for interactive visualization of a risk assessment for an entity on a graphical user interface of a computer system, the method comprising:
   receiving, by the computer system, unstructured risk data associated with the entity from one or more source;
   parsing, by the computer system, the unstructured risk data to produce one or more risk information element during a time period;
   combining, by the computer system, each risk information element that comprises a single event or issue;
   categorizing, by the computer system, each event or issue by a class or category;
   generating, by a computer processor, a risk assessment for the entity from each one or more classified or categorized event or issue for each time period; and
   displaying, on the graphical user interface,
      a risk assessment for each time period on a risk timeline with a risk level on a first axis and a timeline on a second axis, wherein each risk assessment for the time period is represented as a node having a risk score on the risk timeline, and
      a risk report that includes detailed risk information for one time period comprising a first set of one or more circular sectors on a first ring that represents one or more class or category, a second set of one or more circular sectors on a second ring that represents one or more policy or guideline related to the class or category and a third set of one or more circular sectors on a third ring that represents one or more event or issue related to the class or category and/or the policy or guideline.

7. The method of claim 6, wherein the first set of circular sectors, the second set of circular sectors and the third set of circular sectors comprise concentric rings with a common center.

8. The method of claim 7, wherein the common center comprises a status indicator.

9. The method of claim 6, wherein displaying the set of first, second and third circular sectors further comprises:
   changing an appearance of the first, second and third set of circular sectors based on a determination of whether the event or issue satisfies the policy or guideline, and
   changing an appearance of a common center of the first, second and third circular sectors based on an aggregated assessment of each event or issue that must satisfy each policy or guideline.

10. A computer-implemented method for interactive visualization of a risk assessment for an entity on a graphical user interface of a computer system, the method comprising:
    receiving, by the computer system, unstructured risk data associated with the entity from one or more source;
    parsing, by the computer system, the unstructured risk data to produce one or more risk information element during a time period;
    combining, by the computer system, each risk information element that comprises a single event or issue;
    categorizing, by the computer system, each event or issue by a class or category;
    generating, by a computer processor, a risk assessment for the entity from each one or more classified or categorized event or issue for each time period; and
    displaying, on the graphical user interface,
       a risk assessment for each time period on a risk timeline with a risk level on a first axis and a timeline on a second axis, wherein each risk assessment for the time period is represented as a node having a risk score on the risk timeline, and
       a risk report that includes detailed risk information for one time period, wherein displaying the risk report for the one time period, comprises displaying the risk report for the time period selected by a user.

11. A computer-based system for assessing risks, the system comprising:
    a storage device to receive, at a computer, unstructured risk data associated with an entity from one or more source;

a computer system processor to
- parse the unstructured risk data to produce one or more risk information element during a time period,
- combine each risk information element that comprises a single event or issue;
- categorize each event or issue by a class or category;
- generate a risk assessment for the entity from each one or more classified or categorized event or issue for each time period; and a graphical user interface to display
- the risk assessment for each time period on a risk timeline with a risk level on a first axis and a timeline on a second axis, wherein each risk assessment for the time period is represented as a node having a risk score on the risk timeline, and
- detailed risk information that corresponds to a selected node that includes an outer ring that represents one or more category or class, an inner ring that represents one or more issue or event related to the category or class, and a circle inside the inner ring that represents a status indicator.

12. The computer-based system of claim 11, wherein the graphical user interface further displays a chronological listing of each event or issue that includes an entity name, a category or class, a sub-category or sub-class, a record date and a risk severity descriptor.

13. The computer-based system of claim 12, the risk severity descriptor comprises a risk described as low, medium, or high and/or critical.

14. The computer-based system of claim 12, wherein the display of the chronological listing further includes one or more source identifier for the event or issue.

15. The computer-based system of claim 12, wherein the display of the chronological listing of each event or issue comprises each event or issue for the time period of a node selected by a user.

16. The computer-based system of claim 11, further comprising:
toggling, by a user, the display to an identity hierarchy that includes one or more topic view, one or more category related to the topic, one or more sub-category related to the category, and one or more description related to the sub-category.

17. The computer based-system of claim 16, wherein:
a topic view comprises one or more category of identifiers, fraud, relationships, background, social media, utility services, licenses, assets, business affiliations, political affiliations, death records, health records, information technology policy and security, and/or human resources;

the one or more category related to the identifier topic view includes biographic, biometric, residence, and/or communication information, the one or more category related to the relationships topic view includes divorces, associates, neighbor listings, education associates, and/or business associates;

the one or more category related to the background topic view includes criminal, financial history, lawsuits, dockets, employment history, education history and/or military;

the one or more category related to the social media topic view includes networking, communication, publication, sharing tools, on-line commerce, virtual worlds, multiplayer online game, and/or other;

the one or more category related to the assets topic view includes real property, vehicles, and/or other assets;

the one or more category related to the information technology policy and security topic view includes network identification, authorized applications, application usage, Internet usage, e-mail usage, file usage, and/or IP phone usage; and the one or more category related to the human resources topic view includes salary history, review history, and/or incident history.

* * * * *